US012604331B2

(12) United States Patent
Lee et al.

(10) Patent No.: US 12,604,331 B2
(45) Date of Patent: Apr. 14, 2026

(54) METHOD AND APPARATUS FOR RESOURCE RESTRICTION

(71) Applicant: Telefonaktiebolaget LM Ericsson (publ), Stockholm (SE)

(72) Inventors: Sangho Lee, Gwacheon-si (KR); Sungman Jang, Seoul (KR); Seungheon Kim, Seoul (KR)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 585 days.

(21) Appl. No.: 18/016,687

(22) PCT Filed: Jul. 22, 2020

(86) PCT No.: PCT/KR2020/009681
§ 371 (c)(1),
(2) Date: Jan. 18, 2023

(87) PCT Pub. No.: WO2022/019353
PCT Pub. Date: Jan. 27, 2022

(65) Prior Publication Data
US 2023/0292349 A1     Sep. 14, 2023

(51) Int. Cl.
*H04W 72/50*     (2023.01)
*H04W 72/51*     (2023.01)
*H04W 36/14*     (2009.01)

(52) U.S. Cl.
CPC ......... *H04W 72/535* (2023.01); *H04W 72/51* (2023.01); *H04W 36/1443* (2023.05)

(58) Field of Classification Search
CPC ........... H04W 24/10; H04W 36/00698; H04W 36/1443; H04W 72/51; H04W 72/535;
(Continued)

(56) References Cited

U.S. PATENT DOCUMENTS

2017/0215065 A1     7/2017   Vamanan et al.
2018/0219652 A1     8/2018   Chen et al.
(Continued)

OTHER PUBLICATIONS

Author Unknown, "Technical Specification Group Radio Access Network; Evolved Universal Terrestrial Radio Access Network (E-UTRAN); S1 Application Protocol (S1AP) (Release 16)," Technical Specification 36.413, Version 16.1.0, Mar. 2020, 3GPP Organizational Partners, 391 pages.
(Continued)

*Primary Examiner* — Romani Ohri
(74) *Attorney, Agent, or Firm* — Weisberg I.P. Law, P.A.

(57)     ABSTRACT

Various embodiments provide a method for resource restriction. The method performed by a first network node comprises obtaining first information for a terminal device which communicates with the first network node using a first radio access technology. The first information may indicate whether there is a restriction on use of a second radio access technology by the terminal device. The method comprises determining whether the terminal device is allowed to use a first resource set which is provided by a second network node for the second radio access technology, according to the first information and whether the first network node has second information to indicate a second resource set for the second radio access technology. The second resource set is different from the first resource set, and not available for the terminal device when there is the restriction on use of the second radio access technology by the terminal device.

19 Claims, 29 Drawing Sheets

(58) Field of Classification Search
CPC ....... H04W 76/15; H04W 76/16; H04W 8/22;
H04W 88/06
See application file for complete search history.

(56) References Cited

U.S. PATENT DOCUMENTS

| | | | |
|---|---|---|---|
| 2019/0281645 A1 | 9/2019 | Van Der Velde et al. | |
| 2019/0342888 A1* | 11/2019 | Hosseini | H04W 72/30 |
| 2022/0007458 A1* | 1/2022 | Lin | H04W 72/0446 |
| 2022/0182842 A1* | 6/2022 | Baldemair | H04W 16/14 |
| 2022/0264620 A1* | 8/2022 | Teyeb | H04W 72/1215 |
| 2023/0189371 A1* | 6/2023 | Ahmad | H04W 48/18 |
| | | | 370/328 |

OTHER PUBLICATIONS

Author Unknown, "Technical Specification Group Radio Access Network; Evolved Universal Terrestrial Radio Access Network (E-UTRAN); X2 application protocol (X2AP) (Release 16)," Technical Specification 36.423, Version 16.1.0, Mar. 2020, 3GPP Organizational Partners, 438 pages.

Author Unknown, "Technical Specification Group Radio Access Network; Evolved Universal Terrestrial Radio Access Network (E-UTRAN); X2 application protocol (X2AP) (Release 16)," Technical Specification 36.423, Version 16.2.0, Jul. 2020, 3GPP Organizational Partners, 489 pages.

Author Unknown, "Technical Specification Group Radio Access Network; Evolved Universal Terrestrial Radio Access (E-UTRA) and NR; Multi-connectivity; Stage 2 (Release 16)," Technical Specification 37.340, Version 16.1.0, Mar. 2020, 3GPP Organizational Partners, 74 pages.

Author Unknown, "Technical Specification Group Radio Access Network; NR; Radio Resource Control (RRC) protocol specification (Release 16)," Technical Specification 38.331, Version 16.0.0, Mar. 2020, 3GPP Organizational Partners, 835 pages.

Author Unknown, "Technical Specification Group Radio Access Network; NG-RAN; Architecture description (Release 16)," Technical Specification 38.401, Version 16.1.0, Mar. 2020, 3GPP Organizational Partners, 50 pages.

International Search Report and Written Opinion for International Patent Application No. PCT/KR2020/009681, mailed Apr. 19, 2021, 12 pages.

* cited by examiner

[Fig. 1A]
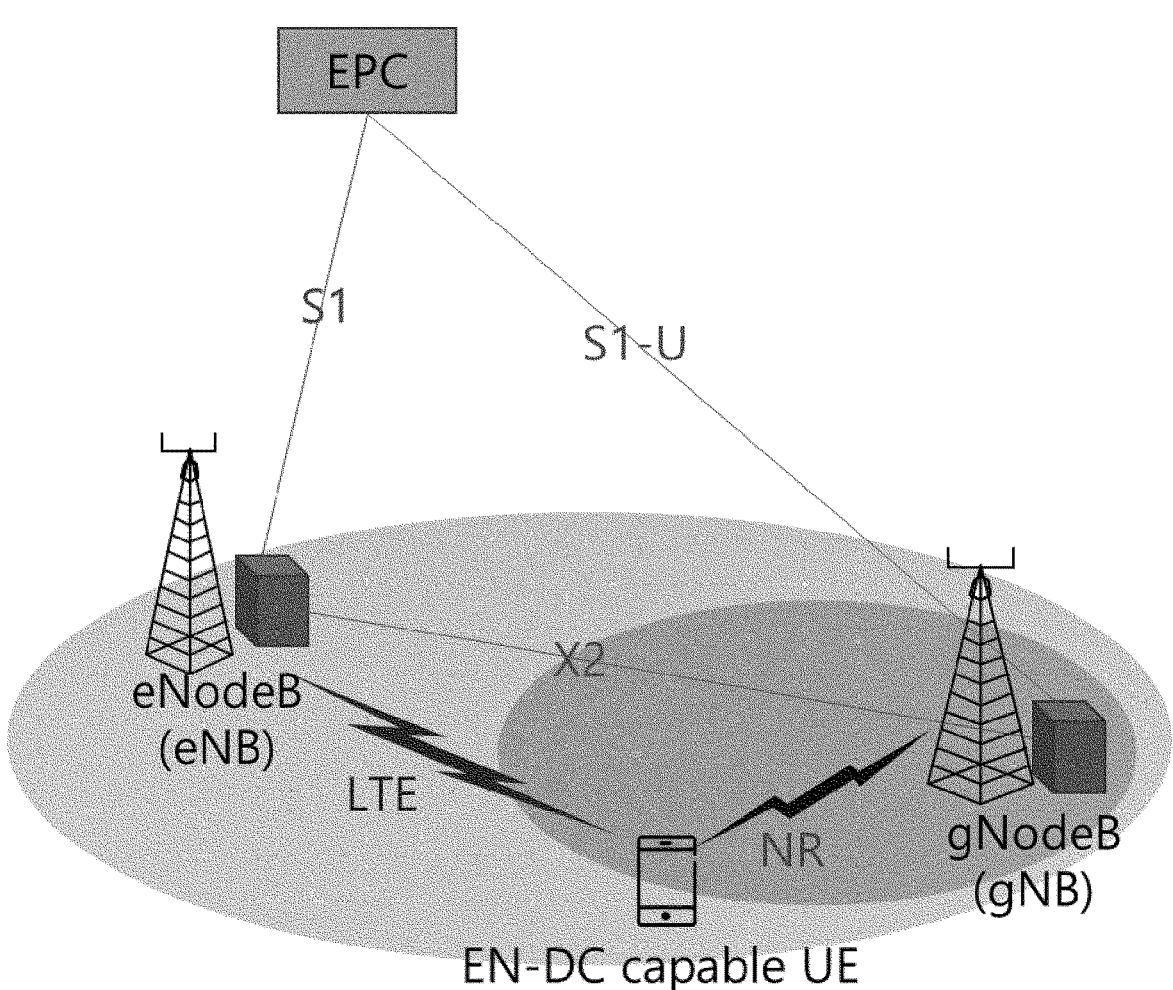

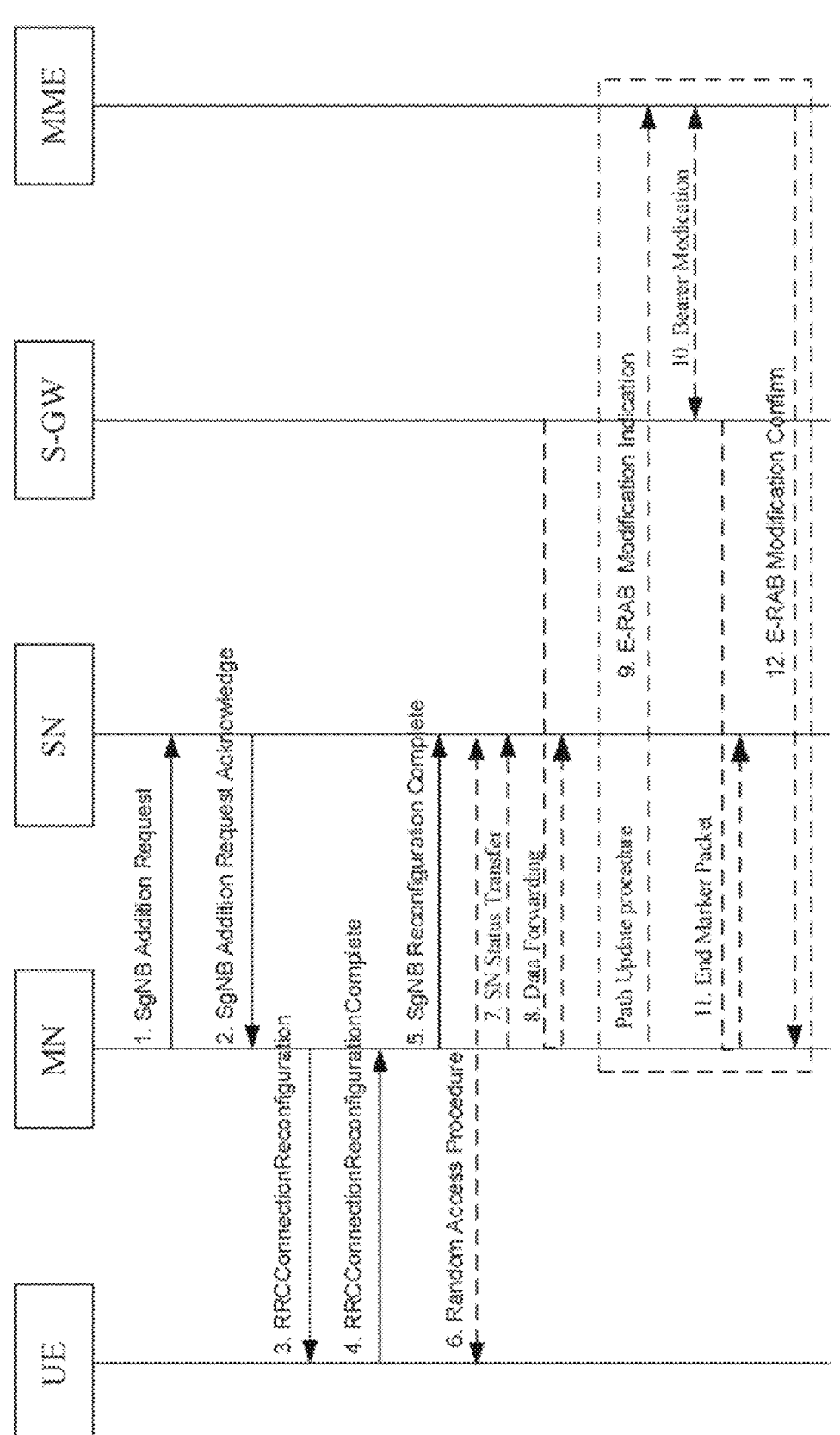
[FIG. 1B]

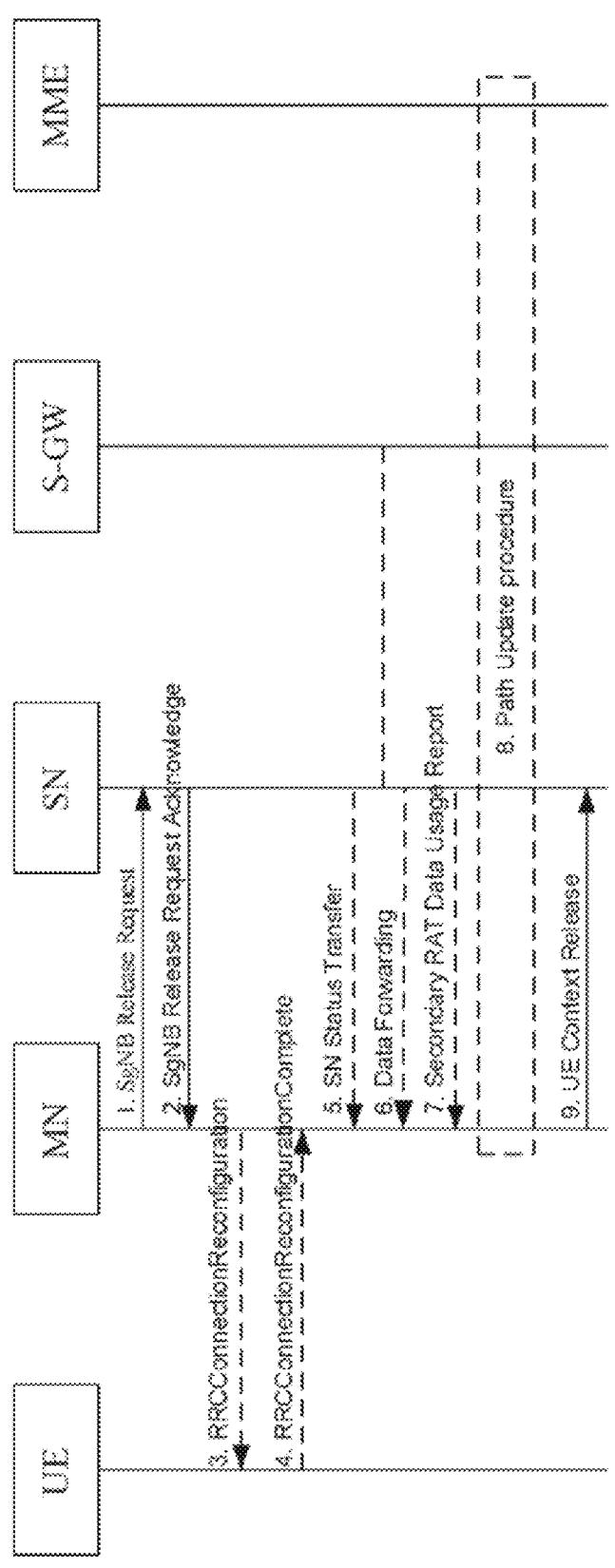
[FIG. 1C]

[Fig. 1D]

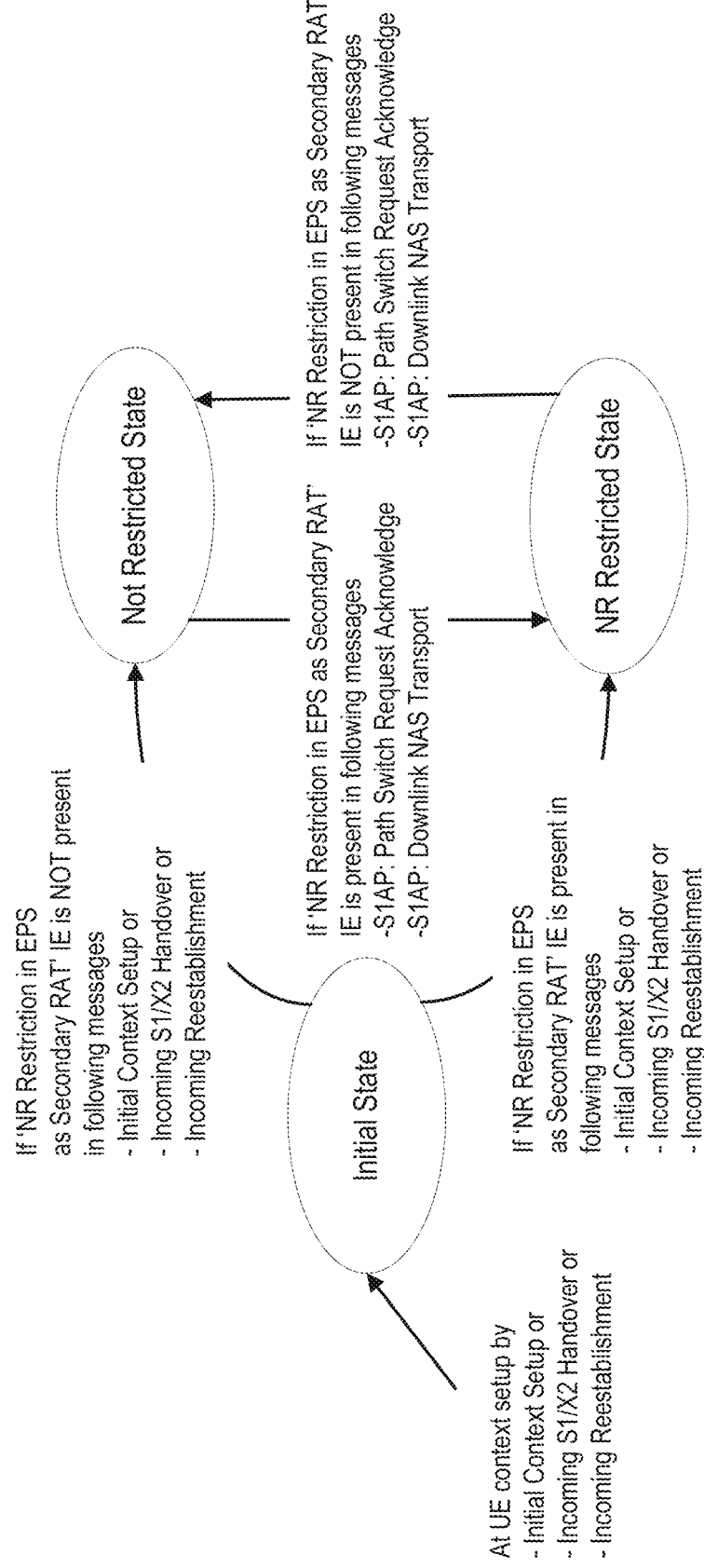
[FIG. 1E]

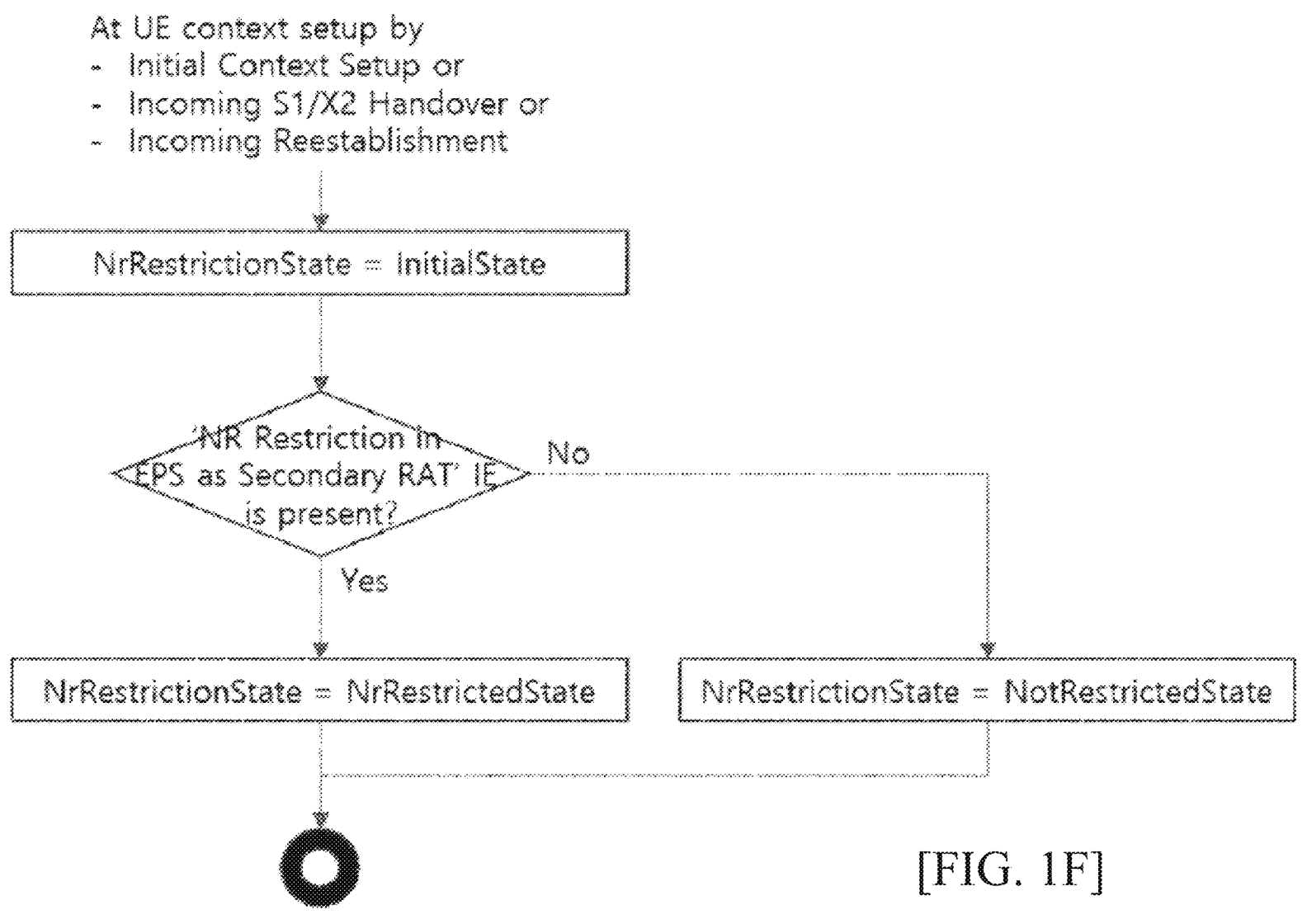

At UE context setup by
- Initial Context Setup or
- Incoming S1/X2 Handover or
- Incoming Reestablishment NrRestrictionState = InitialState 'NR Restriction in EPS as Secondary RAT' IE is present?

No

Yes

NrRestrictionState = NrRestrictedState

NrRestrictionState = NotRestrictedState

[FIG. 1F]

[Fig. 1G]
At reception of following messages,
- S1AP: Path Switch Request Acknowledge
- S1AP: Downlink NAS Transport
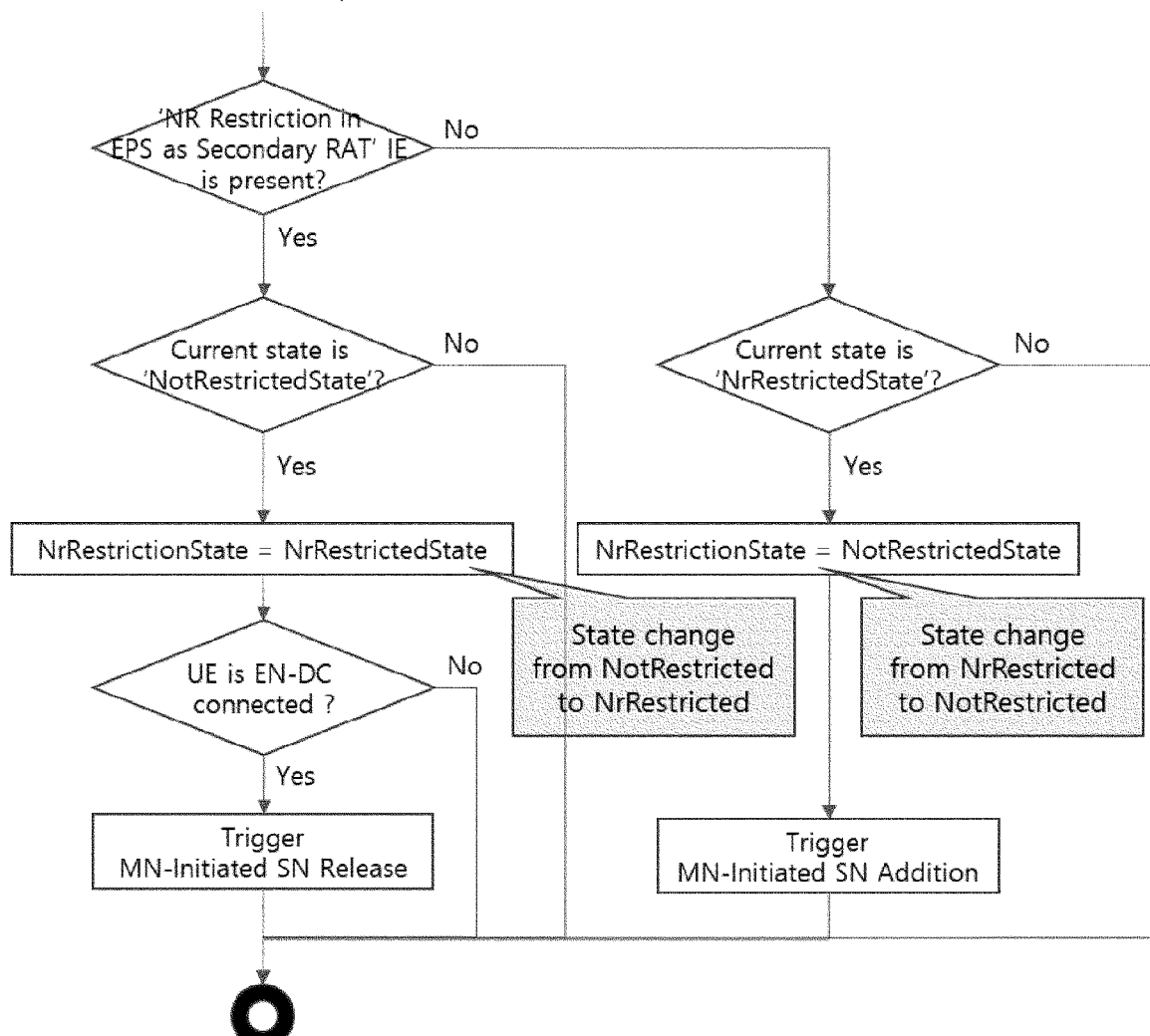

[Fig. 2A]
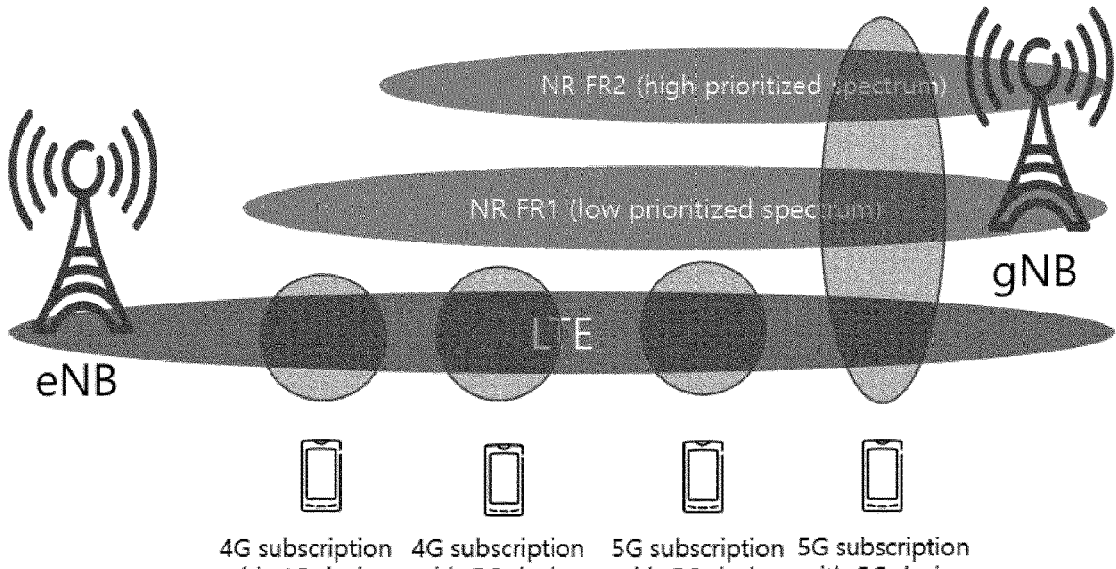
4G subscription with 4G device    4G subscription with 5G device    5G subscription with 5G device but limited    5G subscription with 5G device
[Fig. 2B]
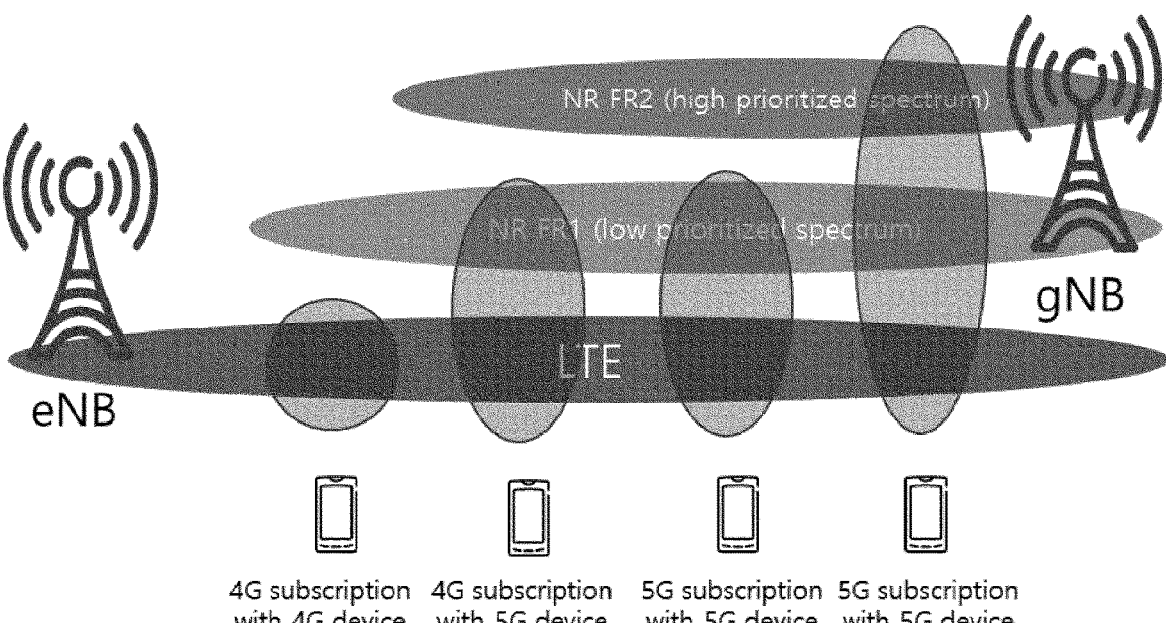
4G subscription with 4G device    4G subscription with 5G device    5G subscription with 5G device but limited    5G subscription with 5G device

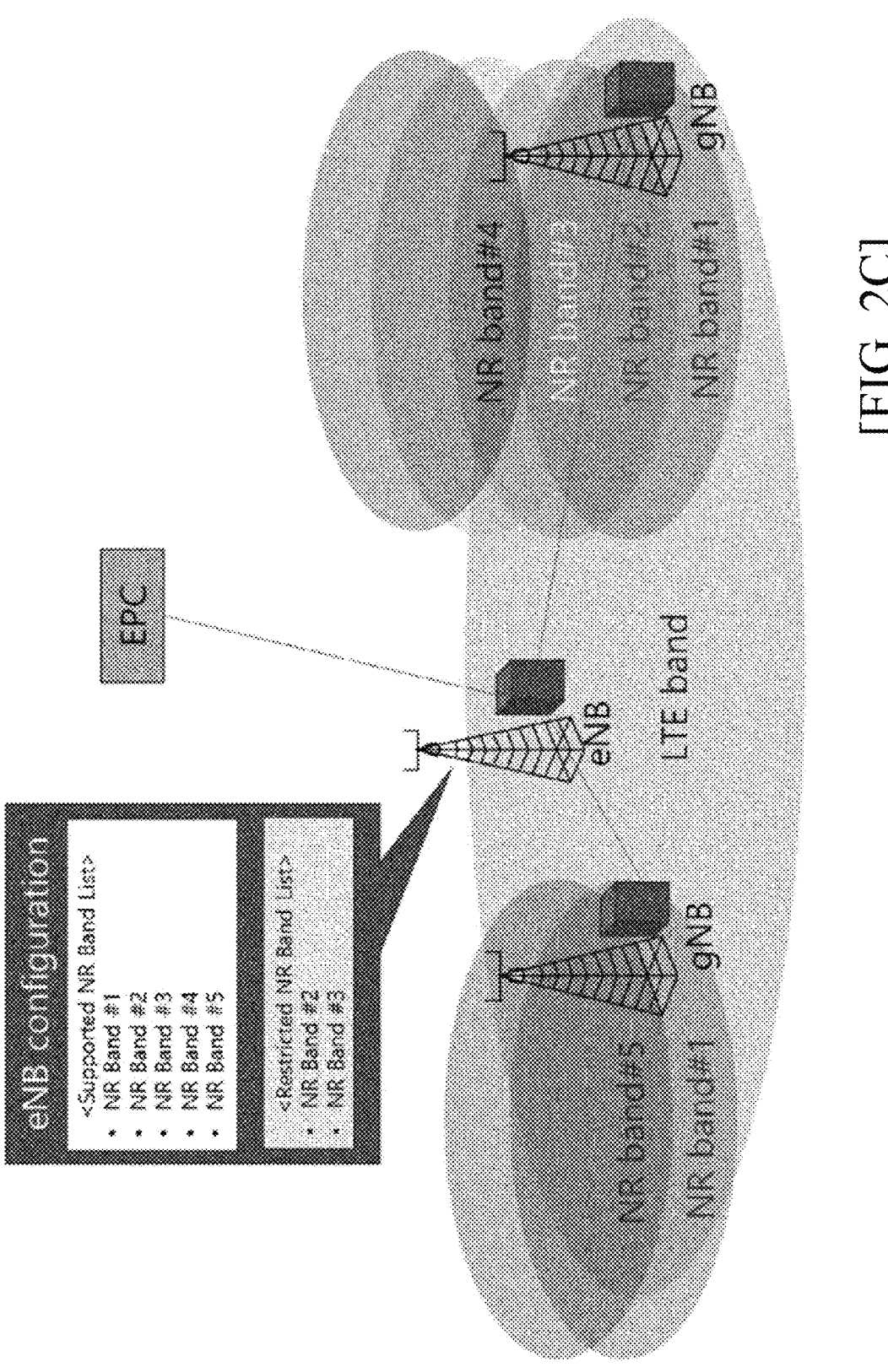
[FIG. 2C]

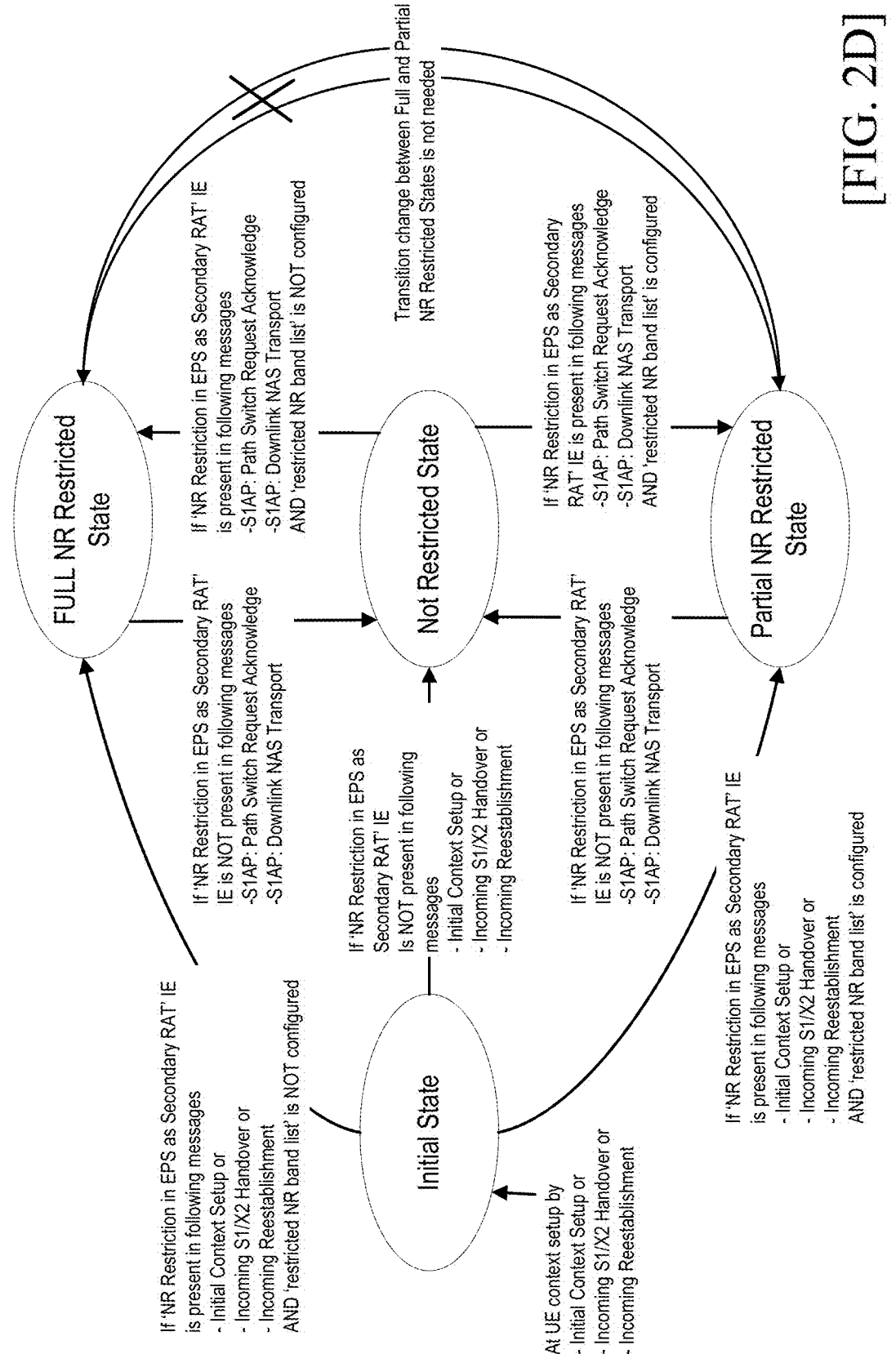
[FIG. 2D]

```
RRC {
    pdu: value DL-DCCH-Message ::= {
        message c1 : ueCapabilityEnquiry : {
            rrc-TransactionIdentifier 0,
            criticalExtensions c1 : ueCapabilityEnquiry_r8 : {
                ue-CapabilityRequest {
                    RAT-Type eutra,
                    RAT-Type eutra-nr,
                    RAT-Type nr
                },
                nonCriticalExtension {
                    nonCriticalExtension {
                        requestedFrequencyBands-r11 {
                            FreqBandIndicator-r11 1,
                            FreqBandIndicator-r11 41,
                            FreqBandIndicator-r11 42,
                            FreqBandIndicator-r11 18,
                            FreqBandIndicator-r11 26,
                            FreqBandIndicator-r11 28,
                            FreqBandIndicator-r11 11,
                            FreqBandIndicator-r11 3
                        },
                        nonCriticalExtension {
                            nonCriticalExtension {
                                nonCriticalExtension {
                                    requestedFreqBandsNR-MRDC-r15 '012000140290220640d80a005013608000'H
                                }
                            }
                        }
                    }
                }
            }
        }
    }
}
NR_RRC {
    pdu: value FreqBandList ::= {
        FreqBandInformation bandInformationEUTRA : {
            bandEUTRA 1
        },
        FreqBandInformation bandInformationEUTRA : {
            bandEUTRA 41
        },
        FreqBandInformation bandInformationEUTRA : {
            bandEUTRA 42
        },
        FreqBandInformation bandInformationEUTRA : {
            bandEUTRA 18
        },
        FreqBandInformation bandInformationEUTRA : {
            bandEUTRA 26
        },
        FreqBandInformation bandInformationEUTRA : {
            bandEUTRA 28
        },
        FreqBandInformation bandInformationEUTRA : {
            bandEUTRA 11
        },
        FreqBandInformation bandInformationEUTRA : {
            bandEUTRA 3
        },
        FreqBandInformation bandInformationNR : {
            bandNR 78
        },
        FreqBandInformation bandInformationNR : {
            bandNR 257
        }
    }
}
```

[Fig. 3C]
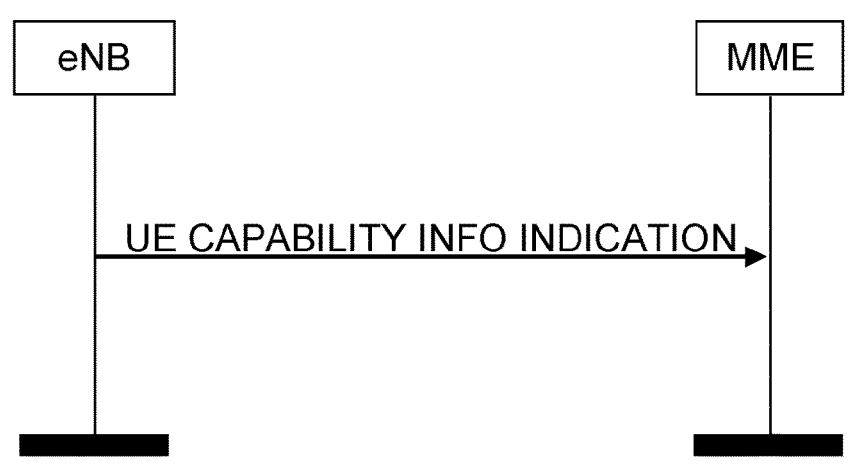
[Fig. 3D]
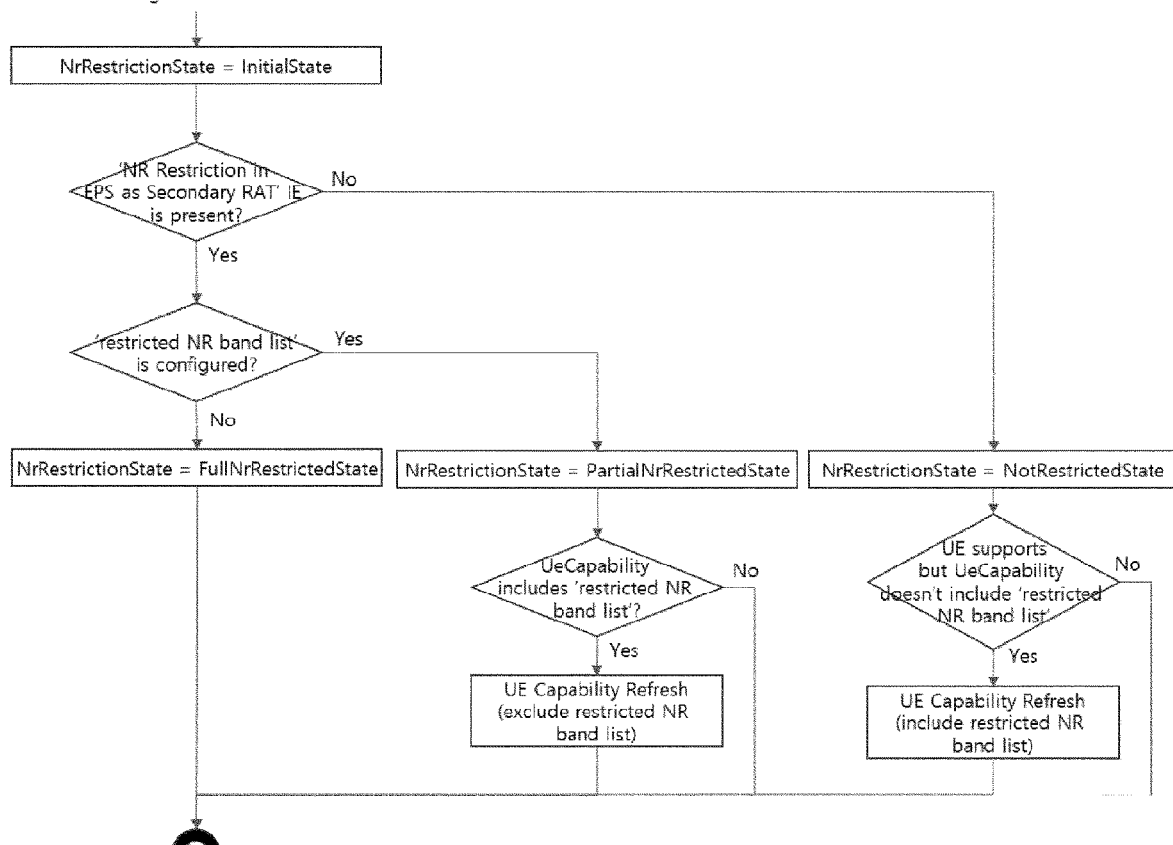

[Fig. 3E]

At reception of following messages,
- S1AP: Path Switch Request Acknowledge
- S1AP: Downlink NAS Transport

[Fig. 3F]

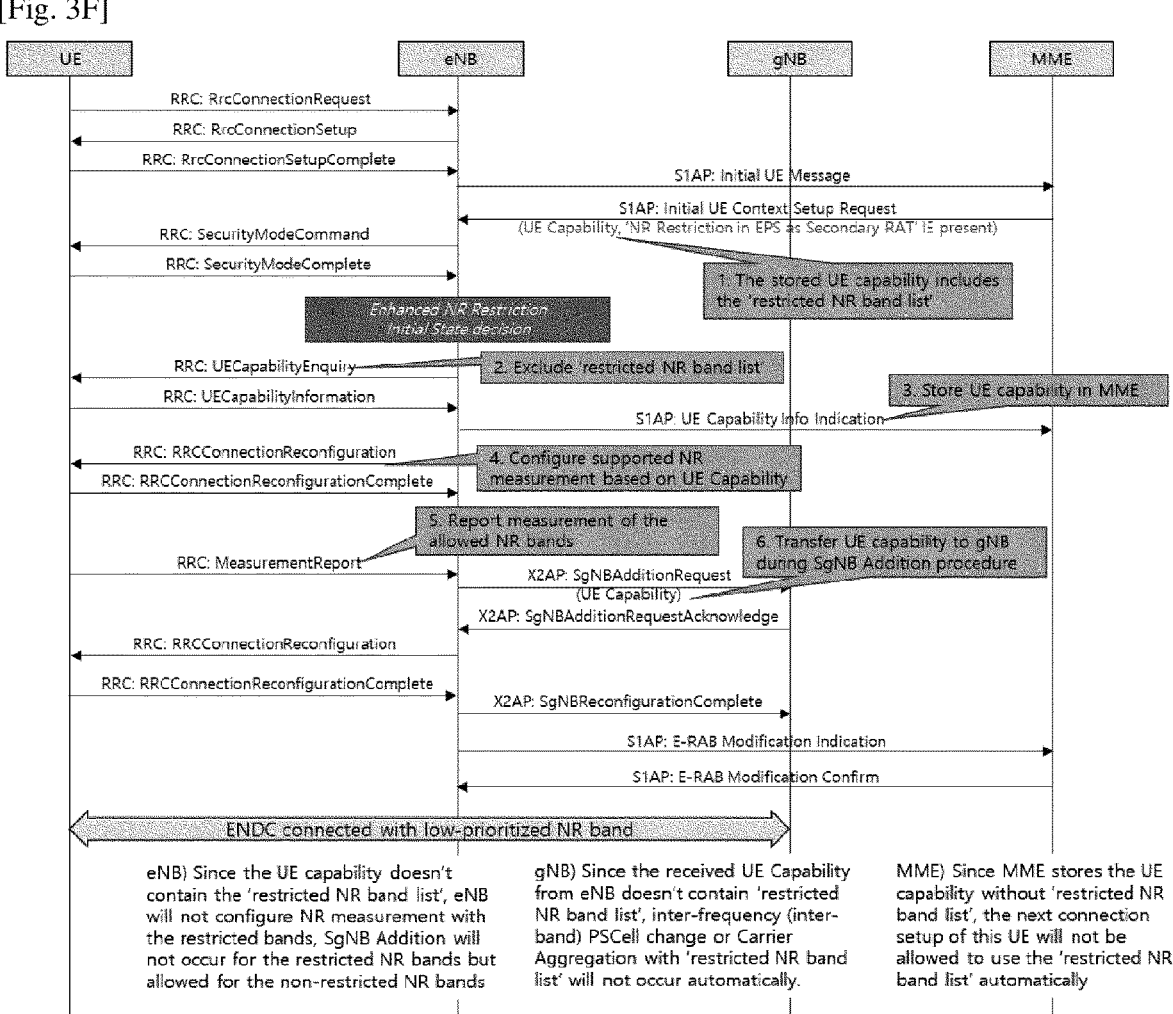

eNB) Since the UE capability doesn't contain the 'restricted NR band list', eNB will not configure NR measurement with the restricted bands, SgNB Addition will not occur for the restricted NR bands but allowed for the non-restricted NR bands gNB) Since the received UE Capability from eNB doesn't contain 'restricted NR band list', inter-frequency (inter-band) PSCell change or Carrier Aggregation with 'restricted NR band list' will not occur automatically.

MME) Since MME stores the UE capability without 'restricted NR band list', the next connection setup of this UE will not be allowed to use the 'restricted NR band list' automatically

```
-- ASN1START
-- TAG-CG-CONFIG-INFO-START

CG-ConfigInfo ::=               SEQUENCE {
    criticalExtensions              CHOICE {
        c1                              CHOICE[
            cg-ConfigInfo                   CG-ConfigInfo-IEs,
            spare3 NULL, spare2 NULL, spare1 NULL
        },
        criticalExtensionsFuture        SEQUENCE {}
    }
}

CG-ConfigInfo-IEs ::=           SEQUENCE {
    ue-CapabilityInfo               OCTET STRING (CONTAINING UE-CapabilityRAT-ContainerList)   OPTIONAL,-- Cond SN-AddMod
    candidateCellInfoListMN         MeasResultList2NR                                          OPTIONAL,
    candidateCellInfoListSN         OCTET STRING (CONTAINING MeasResultList2NR)                OPTIONAL,
    measResultCellListSFTD-NR       MeasResultCellListSFTD-NR                                  OPTIONAL,
    scgFailureInfo                  SEQUENCE {
        failureType                     ENUMERATED { t310-Expiry, randomAccessProblem,
                                                     rlc-MaxNumRetx, synchReconfigFailure-SCG,
                                                     scg-reconfigFailure,
                                                     srb3-IntegrityFailure},
        measResultSCG                   OCTET STRING (CONTAINING MeasResultSCG-Failure)
    }                                                                                          OPTIONAL,
    configRestrictInfo              ConfigRestrictInfoSCG                                       OPTIONAL,
    ...
}

...
ConfigRestrictInfoSCG ::=       SEQUENCE {
    allowedBC-ListMRDC              BandCombinationInfoList                                    OPTIONAL,
    powerCoordination-FR1           SEQUENCE {
        p-maxNR-FR1                     P-Max                                                  OPTIONAL,
        p-maxEUTRA                      P-Max                                                  OPTIONAL,
        p-maxUE-FR1                     P-Max                                                  OPTIONAL
    }                                                                                          OPTIONAL,
    servCellIndexRangeSCG           SEQUENCE {
        lowBound                        ServCellIndex,
        upBound                         ServCellIndex
    }                                                                                          OPTIONAL,    -- Cond SN-AddMod
    maxMeasFreqsSCG                 INTEGER(1..maxMeasFreqsMN)                                 OPTIONAL,
-- TBD Late Drop: If maxMeasIdentitiesSCG is used needs to be decided after RAN1 replies to the LS on measurement requirements for MR-DC.
    maxMeasIdentitiesSCG-NR         INTEGER(1..maxMeasIdentitiesMN)                            OPTIONAL,
    ...,
    [[
    selectedBandEntriesMNList       SEQUENCE (SIZE (1..maxBandComb)) OF SelectedBandEntriesMN  OPTIONAL,
    pdcch-BlindDetectionSCG         INTEGER (1..15)                                            OPTIONAL,
    maxNumberROHC-ContextSessionsSN INTEGER(0.. 16384)                                         OPTIONAL
    ]]
        RestrictedBandList-NR           SEQUENCE (SIZE (1..maxSimultaneousBands)) OF FreqBandIndicatorNR OPTIONAL,
}
:
```

| CG-ConfigInfo field descriptions |
|---|
| allowedBC-ListMRDC |
| A list of indices referring to band combinations in MR-DC capabilities from which SN is allowed to select the SCG band combination. Each entry refers to a band combination numbered according to *supportedBandCombinationList* in the *UE-MRDC-Capability* (in case of (NG)EN-DC or NE-DC) or UE-NR-Capability (in case of NR-DC) and the Feature Sets allowed for each band entry. All MR-DC band combinations indicated by this field comprise the MCG band combination, which is a superset of the MCG band(s) selected by MN. |
| candidateCellInfoListMN, candidateCellInfoListSN |
| Contains information regarding cells that the master node or the source node suggests the target gNB or DU to consider configuring. For (NG)EN-DC, including CSI-RS measurement results in *candidateCellInfoListMN* is not supported in this version of the specification. For NR-DC, including SSB and/or CSI-RS measurement results in *candidateCellInfoListMN* is supported. |
| candidateCellInfoListMN-EUTRA, candidateCellInfoListSN-EUTRA |
| Includes the *MeasResultList3EUTRA* as specified in TS 36.331. Contains information regarding cells that the master node or the source node suggests the target secondary eNB to consider configuring. These fields are only used in NE-DC. |
| configRestrictInfo |
| Includes fields for which SgNB is explictly indicated to observe a configuration restriction. |
| : |
| RestrictedBandList |
| Includes a list of NR bands selected by the MN which are restricted for the UE. SN is not allowed to select SCG for those NR bands. |

[Fig. 3I]
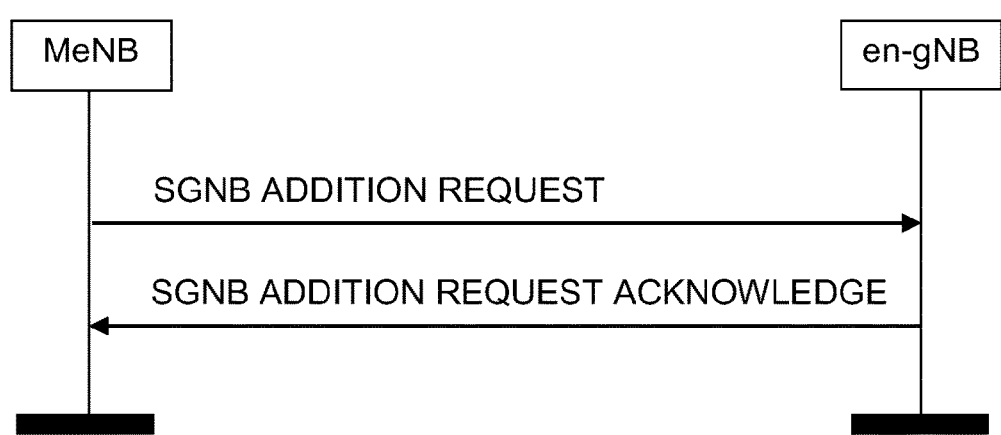
[Fig. 3J]
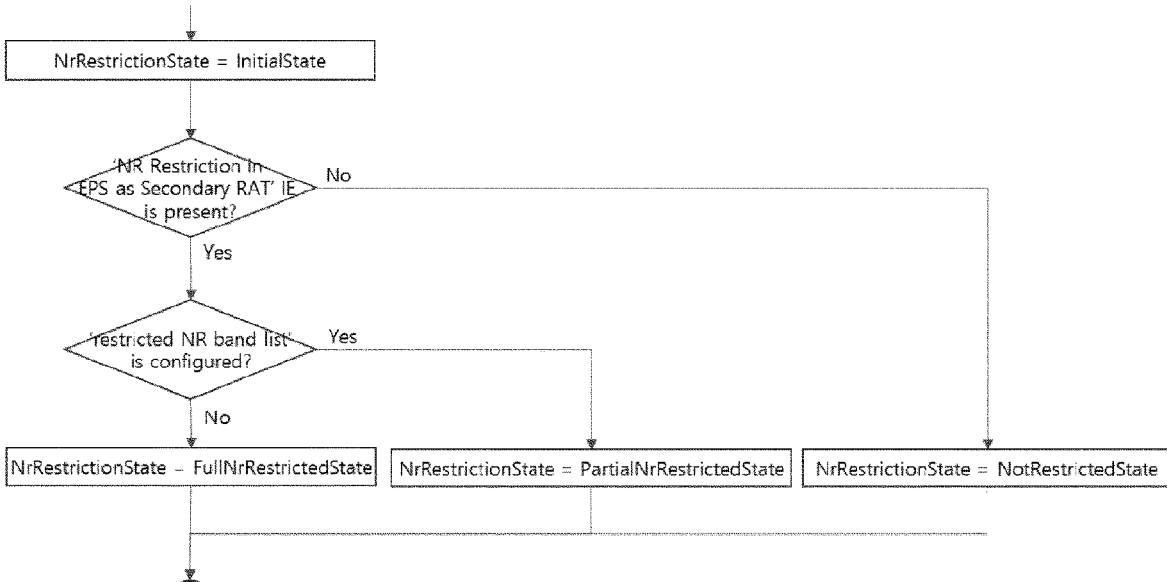

[Fig. 3K]

At reception of following messages,
- S1AP: Path Switch Request Acknowledge
- S1AP: Downlink NAS Transport

[Fig. 3L]
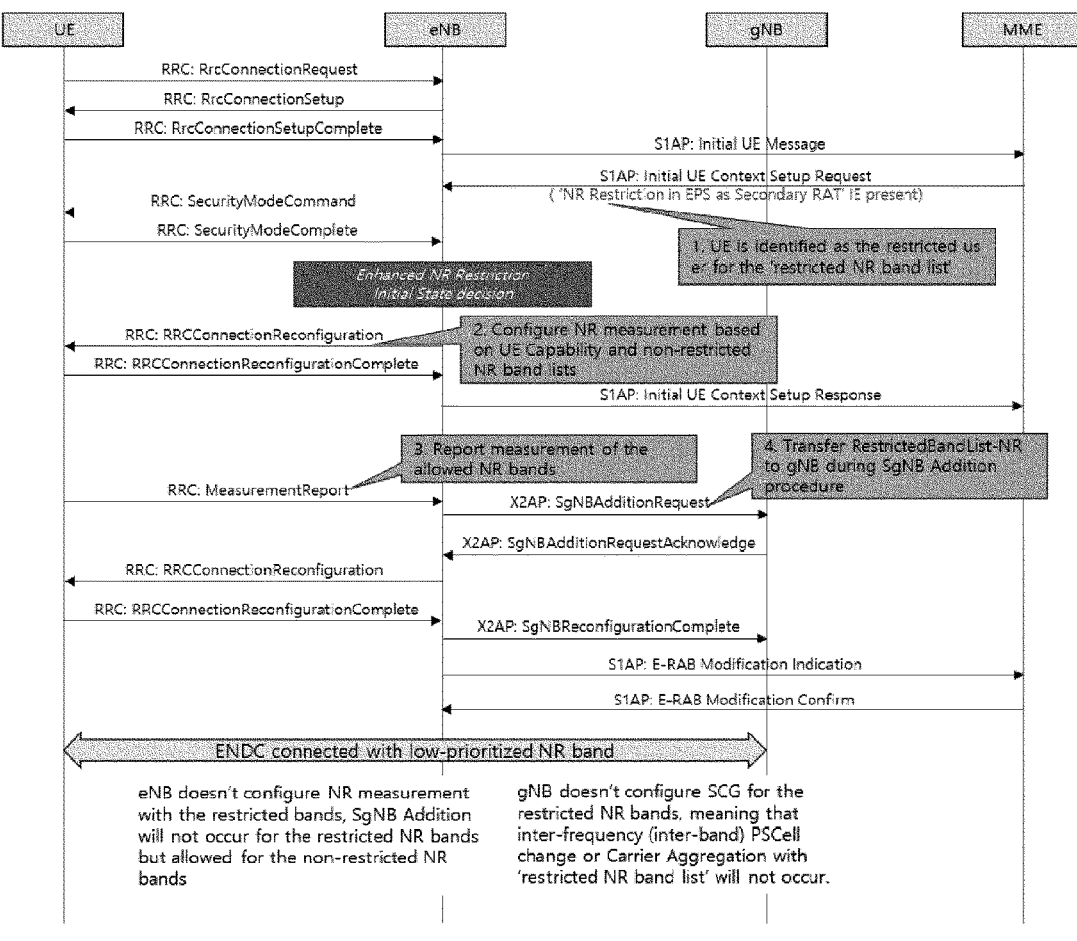
[Fig. 3M]
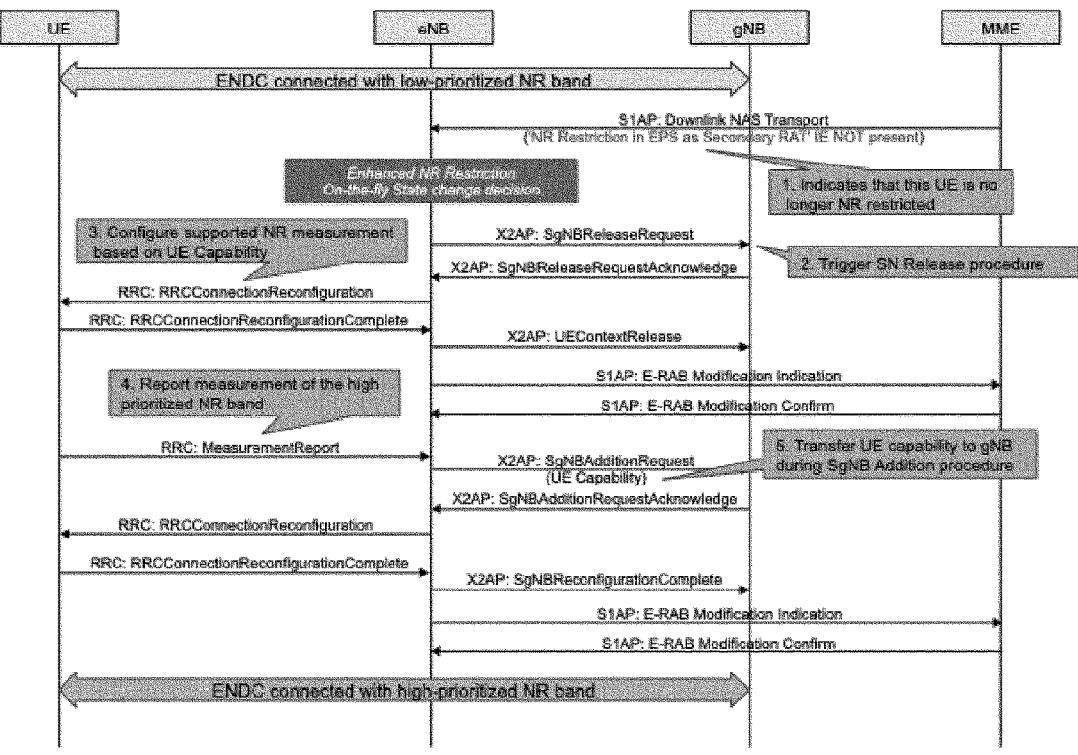

[Fig. 3N]

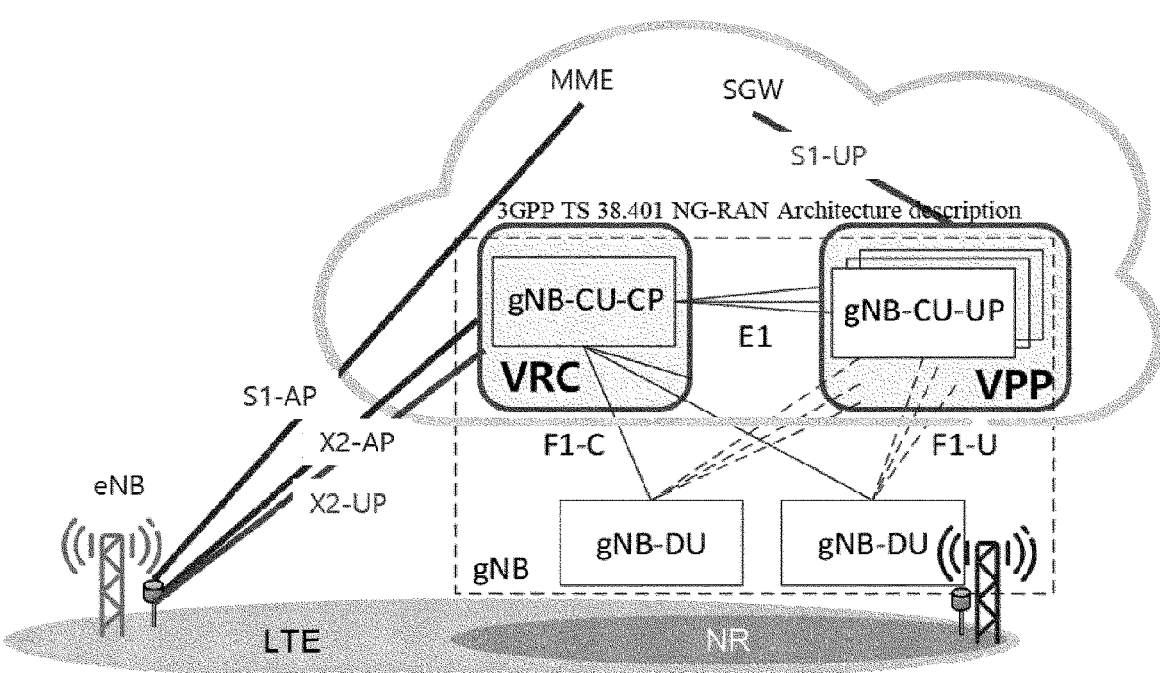

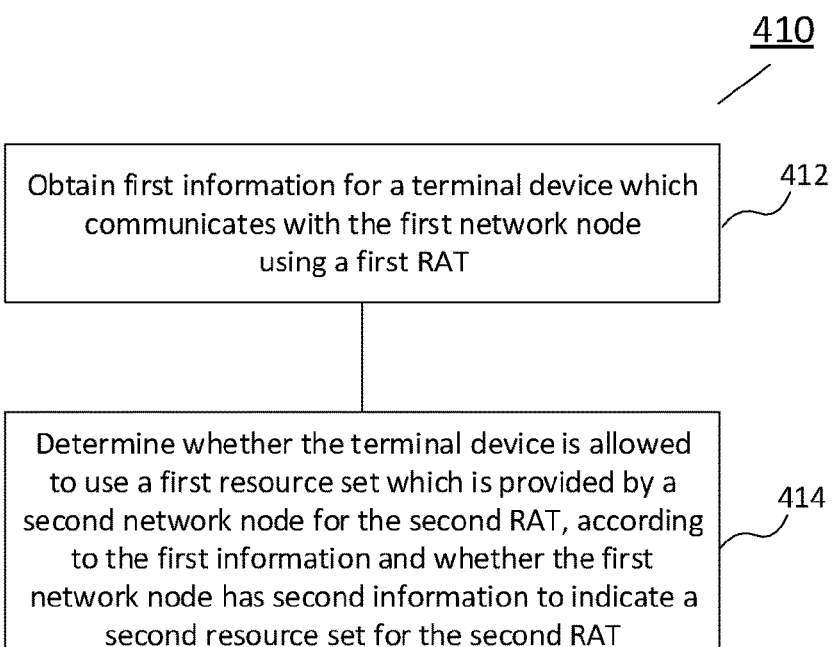

| Obtain first information for a terminal device which communicates with the first network node using a first RAT | 412 |

| Determine whether the terminal device is allowed to use a first resource set which is provided by a second network node for the second RAT, according to the first information and whether the first network node has second information to indicate a second resource set for the second RAT | 414 |

[Fig. 4B]

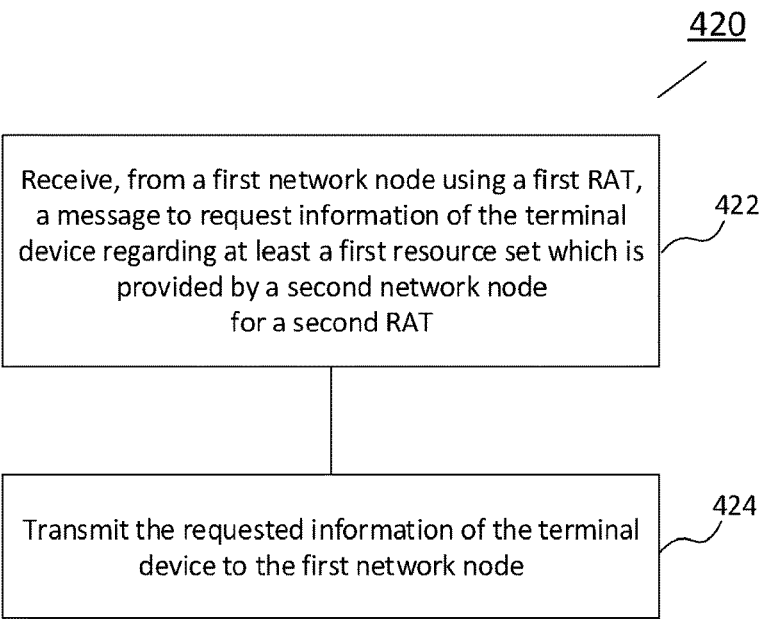

420

Receive, from a first network node using a first RAT, a message to request information of the terminal device regarding at least a first resource set which is provided by a second network node for a second RAT                           422

Transmit the requested information of the terminal device to the first network node                           424

[Fig. 4C]

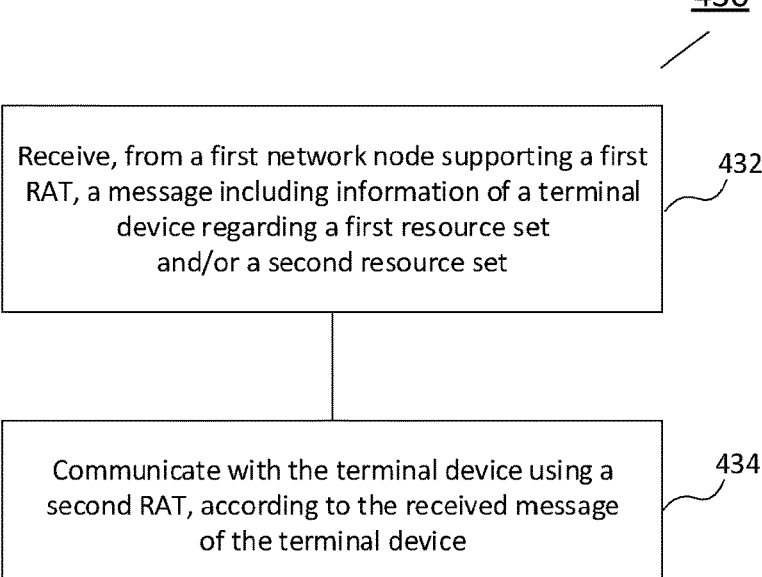

430

Receive, from a first network node supporting a first RAT, a message including information of a terminal device regarding a first resource set and/or a second resource set                           432

Communicate with the terminal device using a second RAT, according to the received message of the terminal device                           434

[Fig. 5]

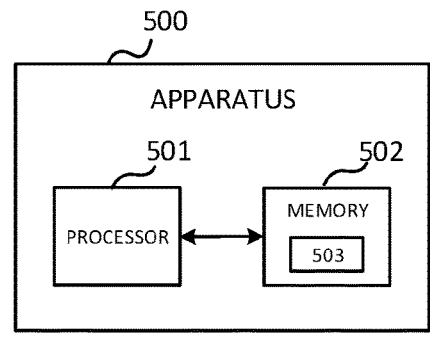

500

APPARATUS 501                    502

PROCESSOR          MEMORY

503

[Fig. 6A]
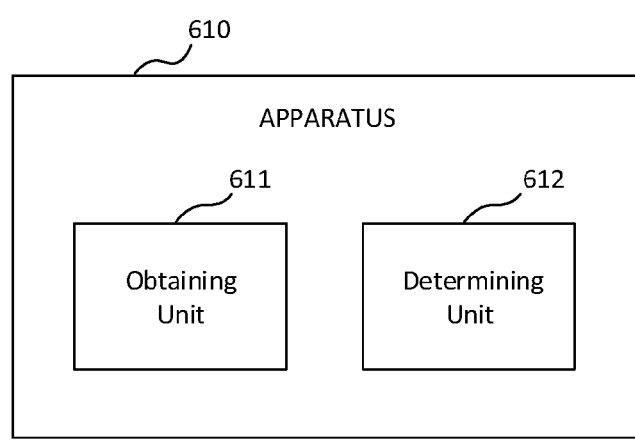
[Fig. 6B]
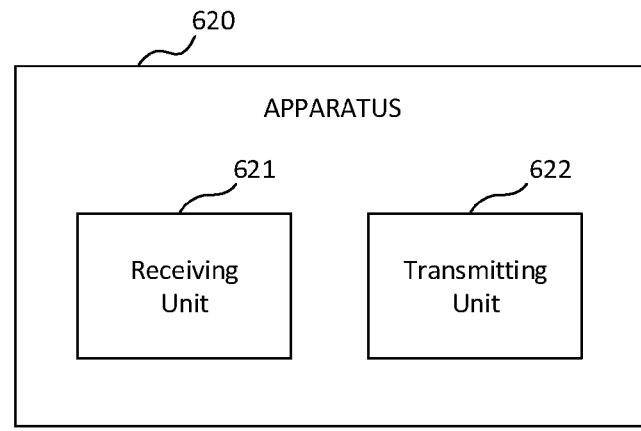
[Fig. 6C]
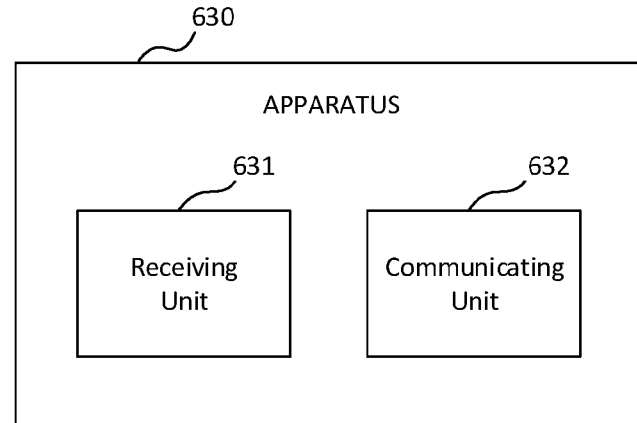

[Fig. 7]
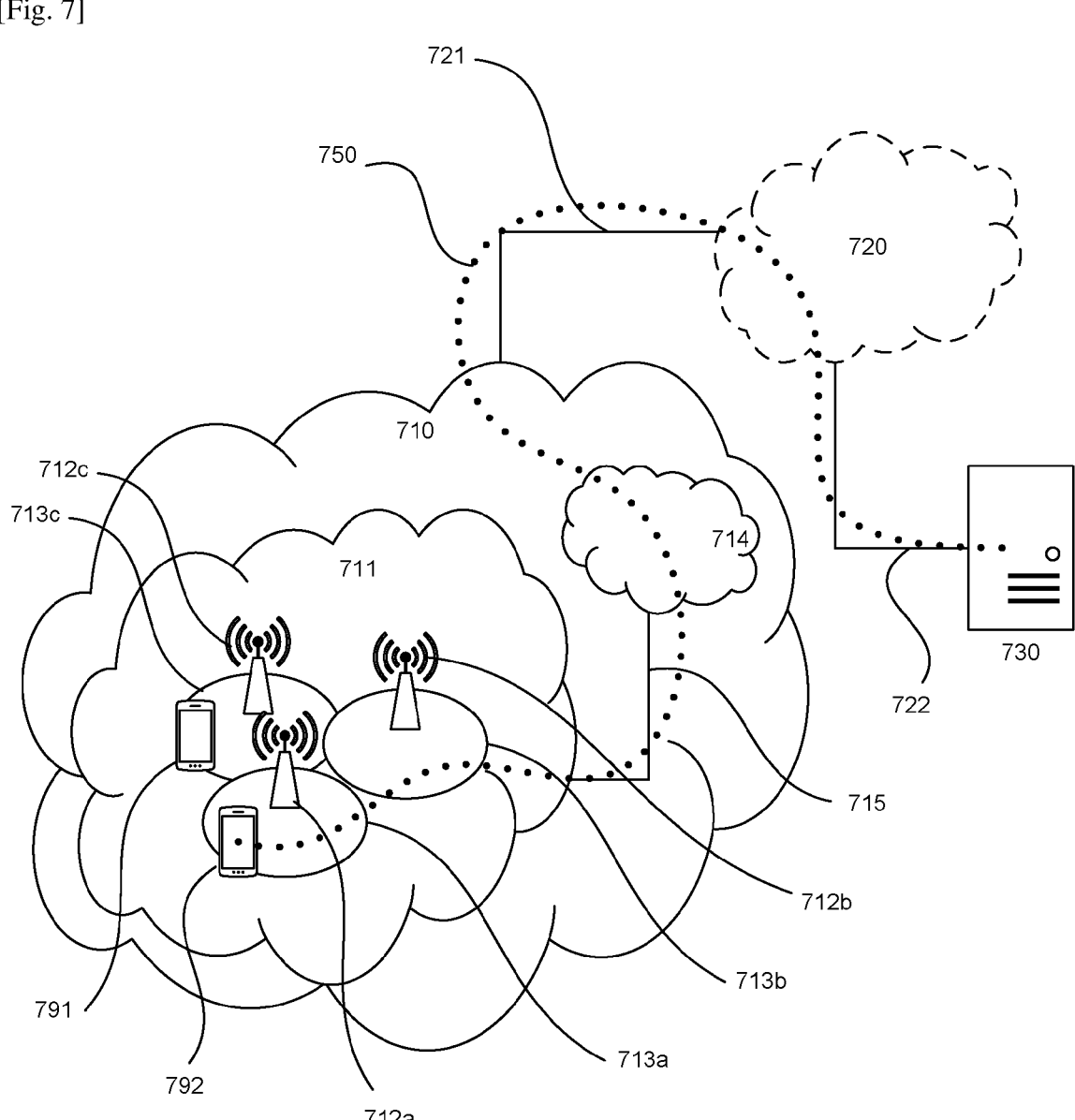

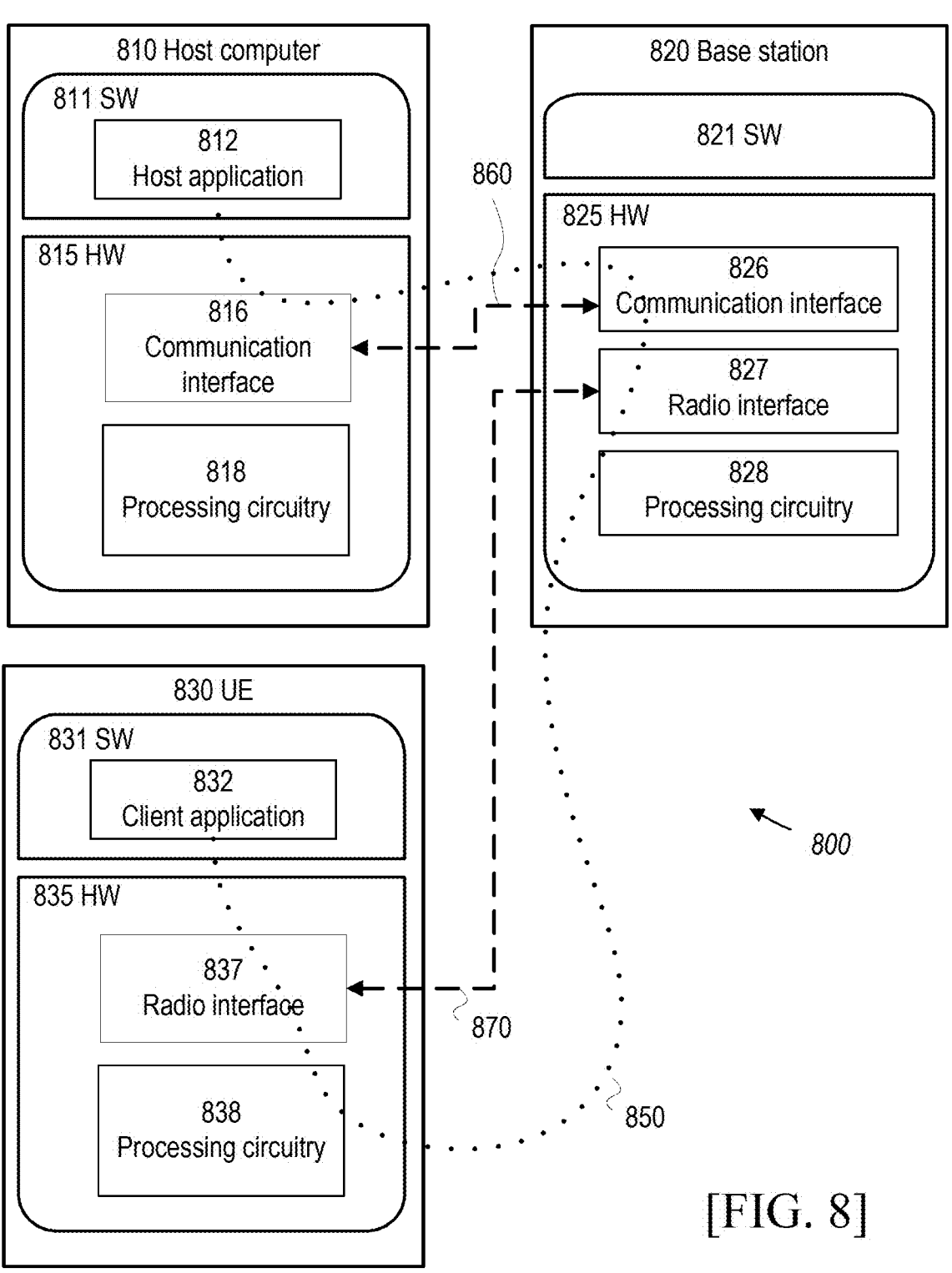
[FIG. 8]

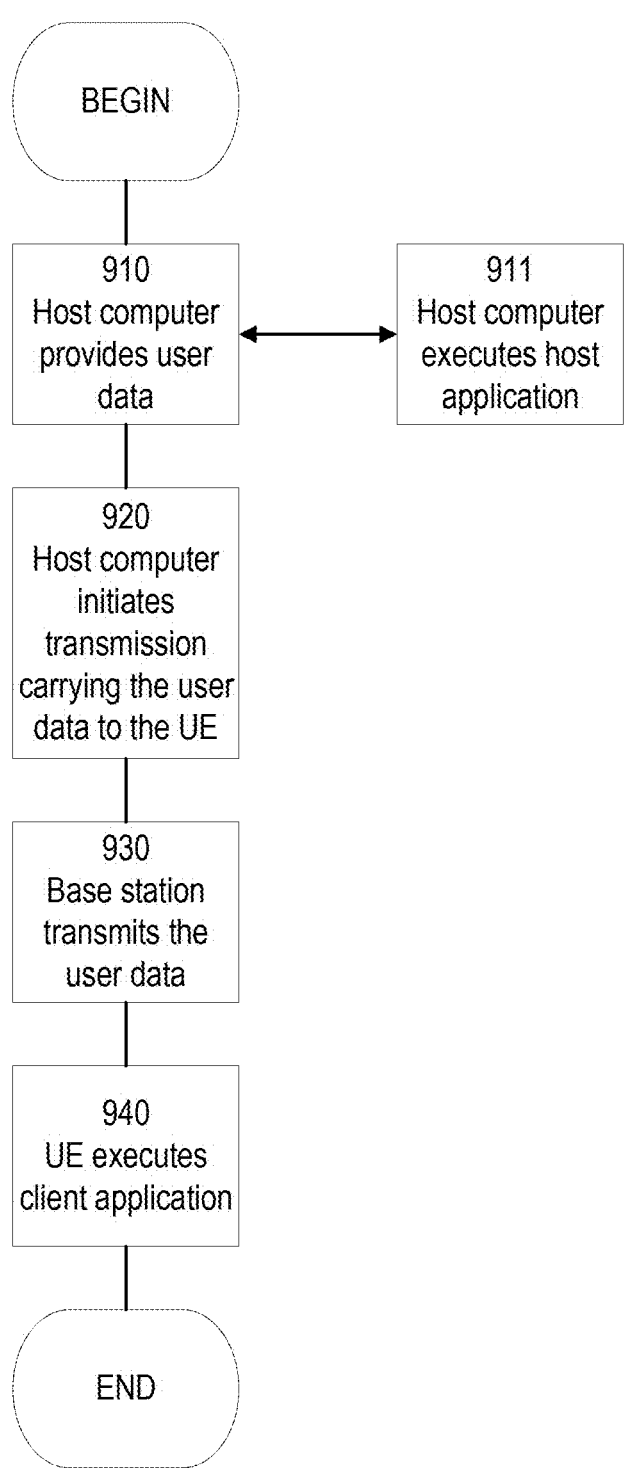
[FIG. 9]

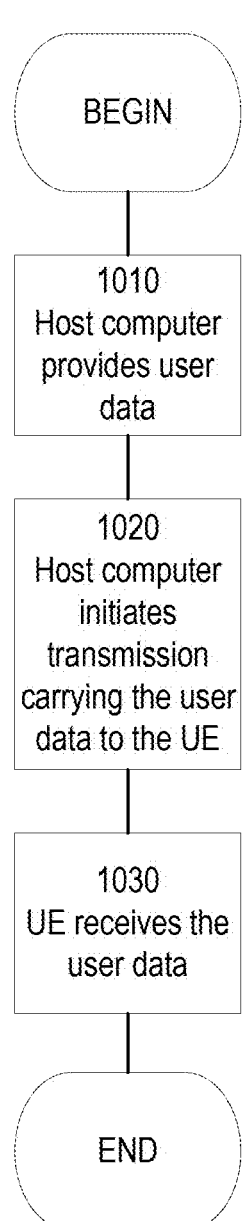
[FIG. 10]

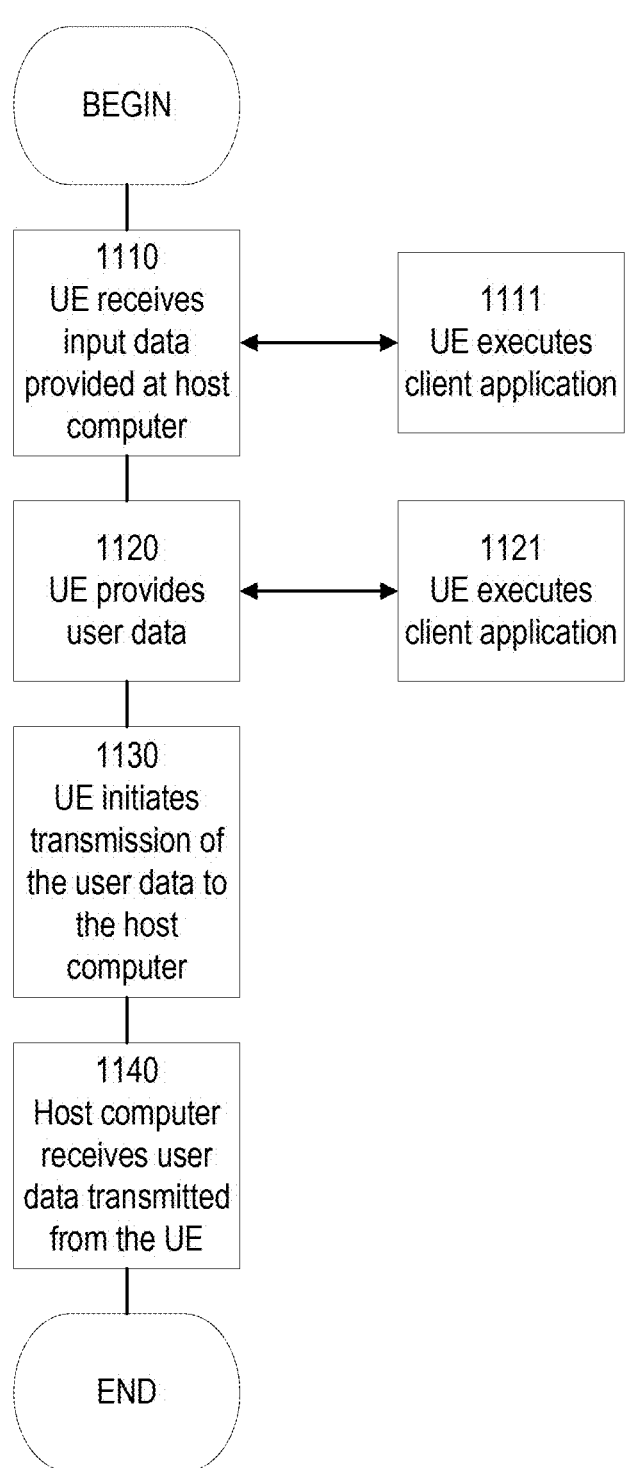
[FIG. 11]

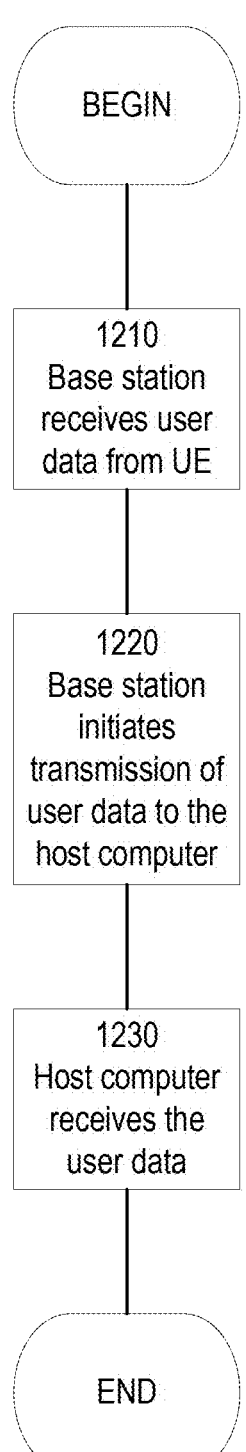
[FIG. 12]

METHOD AND APPARATUS FOR RESOURCE RESTRICTION

This application is a 35 U.S.C. § 371 national phase filing of International Application No. PCT/KR2020/009681, filed Jul. 22, 2020, the disclosure of which is incorporated herein by reference in its entirety.

TECHNICAL FIELD

The present disclosure generally relates to communication networks, and more specifically, to a method and apparatus for resource restriction.

BACKGROUND ART

This section introduces aspects that may facilitate a better understanding of the disclosure. Accordingly, the statements of this section are to be read in this light and are not to be understood as admissions about what is in the prior art or what is not in the prior art.

Communication service providers and network operators have been continually facing challenges to deliver value and convenience to consumers by, for example, providing compelling network services and performance. With the rapid development of networking and communication technologies, wireless communication networks are expected to achieve high traffic capacity and end-user data rate with lower latency. In order to meet dramatically increasing network requirements, one interesting option for communication technique development is to enable a terminal device such as a user equipment (UE) to access communication networks using various radio access technologies (RATs) such as fourth generation (4G)/long term evolution (LTE) and fifth generation (5G)/new radio (NR) access technologies. The communication networks using different RATs may support dual connectivity (DC) for a terminal device, so that the terminal device may be configured to utilize radio resources provided by two distinct schedulers, for example, located in different network nodes connected via an interface cross two communication networks. Considering the diversity of communication technologies and application scenarios, resource utilization of the communication networks supporting DC operations may become more challenging.

DISCLOSURE OF INVENTION

Technical Problem

The present disclosure generally relates to communication networks, and more specifically, to a method and apparatus for resource restriction.

Solution to Problem

This summary is provided to introduce a selection of concepts in a simplified form that are further described below in the detailed description. This summary is not intended to identify key features or essential features of the claimed subject matter, nor is it intended to be used to limit the scope of the claimed subject matter.

Communication networks supporting a DC operation of a terminal device may require coordination of a master network node (also called master node (MN)) and a secondary network node (also called secondary node (SN)) for the terminal device. In an LTE-NR DC scenario, the MN and the SN may partly be autonomously responsible for the control of radio resources. For example, the MN may allocate resources from some 4G/LTE spectrums, while the SN may be responsible for configuring and allocating resources from some 5G/NR spectrums. From the perspective of a service provider, 5G/NR resources may be supposed to be provided only to 5G subscribers. In this case, only 5G subscription with a 5G capable device can use the 5G/NR spectrums, which may cause a network unbalance problem because a 4G/LTE network may become crowded while a 5G/NR network may be less busy. Therefore, it may be desirable to support flexible resource restriction in communication networks to improve network utilization.

Various exemplary embodiments of the present disclosure propose a solution for resource restriction, which may enable a 5G capable device with NR restriction to use some specific NR resources, so as to solve the unbalanced usage of 4G/LTE and 5G/NR network resources while improving network performance with enhanced resource efficiency.

It can be appreciated that the term "resource restriction" described in this document may refer to restricting the use of resources. Similarly, the term "NR restriction" described in this document may refer to restricting the use of 5G/NR network resources, e.g., as specified in the 3rd generation partnership project (3GPP) technical specification (TS) 36.413 V16.1.0, where the entire content of this technical specification is incorporated into the present disclosure by reference.

According to a first aspect of the present disclosure, there is provided a method performed by a first network node such as a base station. The method comprises obtaining first information for a terminal device which may communicate with the first network node using a first RAT. The first information may indicate whether there is a restriction on use of a second RAT by the terminal device. In accordance with an exemplary embodiment, the method further comprises determining whether the terminal device is allowed to use a first resource set which is provided by a second network node for the second RAT, according to the first information and whether the first network node has second information to indicate a second resource set for the second RAT. The second resource set may be different from the first resource set, and may not be available for the terminal device when there is the restriction on use of the second RAT by the terminal device.

In accordance with an exemplary embodiment, the first information may indicate that there is the restriction on use of the second RAT by the terminal device. In this case, the first network node may determine, in response to having the second information for the terminal device, that the terminal device is allowed to use the first resource set.

In accordance with an exemplary embodiment, the terminal device may be using a resource in the second resource set to communicate with the second network node. In this case, the method according to the first aspect of the present disclosure may further comprise: triggering a first procedure to release the use of the resource in the second resource set by the terminal device.

In accordance with an exemplary embodiment, the method according to the first aspect of the present disclosure may further comprise: transmitting a first message to the terminal device to enquire first capability information of the terminal device. The first message may include information about the first resource set.

In accordance with an exemplary embodiment, the method according to the first aspect of the present disclosure may further comprise: receiving the first capability information from the terminal device. The first capability information of the terminal device may include capability information about the first resource set while including no capability information about the second resource set.

In accordance with an exemplary embodiment, the method according to the first aspect of the present disclosure may further comprise: using the first capability information to refresh second capability information of the terminal device at the first network node. The second capability information may include capability information about the second resource set.

In accordance with an exemplary embodiment, the method according to the first aspect of the present disclosure may further comprise: transmitting the first capability information of the terminal device to a mobility management entity (MME).

In accordance with an exemplary embodiment, the method according to the first aspect of the present disclosure may further comprise: transmitting first measurement configuration information to the terminal device, according to the first capability information of the terminal device.

In accordance with an exemplary embodiment, the method according to the first aspect of the present disclosure may further comprise: receiving first measurement information based on the first measurement configuration information from the terminal device. The first measurement information may include measurement information about the first resource set.

In accordance with an exemplary embodiment, the method according to the first aspect of the present disclosure may further comprise: triggering a second procedure according to the first measurement information. The second procedure may enable the terminal device to communicate with the second network node using a resource in the first resource set.

In accordance with an exemplary embodiment, the method according to the first aspect of the present disclosure may further comprise: transmitting the first capability information of the terminal device to the second network node.

In accordance with an exemplary embodiment, the method according to the first aspect of the present disclosure may further comprise: transmitting second measurement configuration information to the terminal device, according to one or more capabilities of the terminal device and the second information for the terminal device.

In accordance with an exemplary embodiment, the method according to the first aspect of the present disclosure may further comprise: receiving second measurement information based on the second measurement configuration information from the terminal device. The second measurement information may include measurement information about the first resource set while including no measurement information about the second resource set.

In accordance with an exemplary embodiment, the method according to the first aspect of the present disclosure may further comprise: triggering a third procedure according to the second measurement information. The third procedure may enable the terminal device to communicate with the second network node using a resource in the first resource set.

In accordance with an exemplary embodiment, the method according to the first aspect of the present disclosure may further comprise: transmitting the second information for the terminal device to the second network node.

In accordance with an exemplary embodiment, the second information for the terminal device may be transmitted from the first network node to the second network node in a CG-ConfigInfo message.

In accordance with an exemplary embodiment, the first information may indicate that there is no restriction on use of the second RAT by the terminal device. In this case, the first network node may determine, e.g., in response to having the second information for the terminal device, that the terminal device is allowed to use the first resource set and the second resource set.

In accordance with an exemplary embodiment, the terminal device may be using a resource in the first resource set to communicate with the second network node. In this case, the method according to the first aspect of the present disclosure may further comprise: triggering a fourth procedure to release the use of the resource in the first resource set by the terminal device.

In accordance with an exemplary embodiment, the method according to the first aspect of the present disclosure may further comprise: transmitting a second message to the terminal device to enquire third capability information of the terminal device. The second message may include information about the first and second resource sets.

In accordance with an exemplary embodiment, the method according to the first aspect of the present disclosure may further comprise: receiving the third capability information from the terminal device. The third capability information of the terminal device may include capability information about the first and second resource sets.

In accordance with an exemplary embodiment, the method according to the first aspect of the present disclosure may further comprise: using the third capability information to refresh fourth capability information of the terminal device at the first network node. The fourth capability information may include no capability information about the second resource set.

In accordance with an exemplary embodiment, the method according to the first aspect of the present disclosure may further comprise: transmitting the third capability information of the terminal device to an MME.

In accordance with an exemplary embodiment, the method according to the first aspect of the present disclosure may further comprise: transmitting third measurement configuration information to the terminal device, according to the third capability information of the terminal device.

In accordance with an exemplary embodiment, the method according to the first aspect of the present disclosure may further comprise: receiving third measurement information based on the third measurement configuration information from the terminal device. The third measurement information may include measurement information about the first and second resource sets.

In accordance with an exemplary embodiment, the method according to the first aspect of the present disclosure may further comprise: triggering a fifth procedure according to the third measurement information. The fifth procedure may enable the terminal device to communicate with the second network node using a resource in the first or second resource set.

In accordance with an exemplary embodiment, the method according to the first aspect of the present disclosure may further comprise: transmitting the third capability information of the terminal device to the second network node.

In accordance with an exemplary embodiment, the method according to the first aspect of the present disclosure may further comprise: transmitting fourth measurement configuration information to the terminal device, according to one or more capabilities of the terminal device and the second information for the terminal device.

In accordance with an exemplary embodiment, the method according to the first aspect of the present disclosure may further comprise: receiving fourth measurement information based on the fourth measurement configuration information from the terminal device. The fourth measurement information may include measurement information about the first and second resource sets.

In accordance with an exemplary embodiment, the method according to the first aspect of the present disclosure may further comprise: triggering a sixth procedure according to the fourth measurement information. The sixth procedure may enable the terminal device to communicate with the second network node using a resource in the first or second resource set.

In accordance with an exemplary embodiment, the first information may indicate that there is the restriction on use of the second RAT by the terminal device. In this case, the first network node may determine, in response to not having the second information for the terminal device, that the terminal device is not allowed to use the first resource set.

In accordance with an exemplary embodiment, the first RAT may be an LTE technology, and the first network node may be an evolved NodeB (eNB).

In accordance with an exemplary embodiment, the second RAT may be a NR technology, and the second network node may be a next generation NodeB (gNB).

In accordance with an exemplary embodiment, the first resource set may include one or more low-band (e.g. below 3 GHz) and/or mid-band (e.g. 3~25 GHz) frequencies, and the second resource set may include one or more high-band (e.g. above 25 GHz) frequencies.

In accordance with an exemplary embodiment, the first resource set may include one or more low-prioritized spectrums (e.g. frequency range 1 (FR1), etc.), and the second resource set may include one or more high-prioritized spectrums (e.g. frequency range 2 (FR2), etc.).

According to a second aspect of the present disclosure, there is provided an apparatus which may be implemented as a first network node. The apparatus may comprise one or more processors and one or more memories storing computer program codes. The one or more memories and the computer program codes may be configured to, with the one or more processors, cause the apparatus at least to perform any step of the method according to the first aspect of the present disclosure.

According to a third aspect of the present disclosure, there is provided a computer-readable medium having computer program codes embodied thereon which, when executed on a computer, cause the computer to perform any step of the method according to the first aspect of the present disclosure.

According to a fourth aspect of the present disclosure, there is provided an apparatus which may be implemented as a first network node. The apparatus may comprise an obtaining unit and a determining unit. In accordance with some exemplary embodiments, the obtaining unit may be operable to carry out at least the obtaining step of the method according to the first aspect of the present disclosure. The determining unit may be operable to carry out at least the determining step of the method according to the first aspect of the present disclosure.

According to a fifth aspect of the present disclosure, there is provided a method performed by a terminal device such as a UE. The method comprises receiving, from a first network node using a first RAT, a message to request information of the terminal device regarding at least a first resource set which is provided by a second network node for a second RAT. In accordance with an exemplary embodiment, the method further comprises transmitting the requested information of the terminal device to the first network node.

In accordance with an exemplary embodiment, the message received from the first network node by the terminal device may be based at least in part on first information and second information for the terminal device. The first information may indicate whether there is a restriction on use of the second RAT by the terminal device. The second information may indicate a second resource set for the second RAT. When there is the restriction on use of the second RAT by the terminal device, the terminal device may be allowed to use the first resource set but not allowed to use the second resource set.

In accordance with some exemplary embodiments, the first resource set and the second resource set according to the fifth aspect of the present disclosure may correspond to the first resource set and the second resource set according to the first aspect of the present disclosure, respectively. Thus, the first resource set according to the first aspect of the present disclosure and the first resource set according to the fifth aspect of the present disclosure may have the same or similar contents and/or feature elements. Similarly, the second resource set according to the first aspect of the present disclosure and the second resource set according to the fifth aspect of the present disclosure may have the same or similar contents and/or feature elements.

In accordance with an exemplary embodiment, the first information may indicate that there is the restriction on use of the second RAT by the terminal device. In this case, the message received from the first network node by the terminal device may include information about the first resource set.

In accordance with an exemplary embodiment, the requested information of the terminal device may include capability information about the first resource set while including no capability information about the second resource set.

In accordance with an exemplary embodiment, the requested information of the terminal device may include measurement information about the first resource set while including no measurement information about the second resource set.

In accordance with an exemplary embodiment, the first information may indicate that there is no restriction on use of the second RAT by the terminal device. In this case, the message received from the first network node by the terminal device may include information about the first and second resource sets which are both available for the terminal device.

In accordance with an exemplary embodiment, the requested information of the terminal device may include capability information about the first and second resource sets.

In accordance with an exemplary embodiment, the requested information of the terminal device may include measurement information about the first and second resource sets.

According to a sixth aspect of the present disclosure, there is provided an apparatus which may be implemented as a terminal device. The apparatus may comprise one or more processors and one or more memories storing computer program codes. The one or more memories and the computer program codes may be configured to, with the one or more processors, cause the apparatus at least to perform any step of the method according to the fifth aspect of the present disclosure.

According to a seventh aspect of the present disclosure, there is provided a computer-readable medium having computer program codes embodied thereon which, when executed on a computer, cause the computer to perform any step of the method according to the fifth aspect of the present disclosure.

According to an eighth aspect of the present disclosure, there is provided an apparatus which may be implemented as a terminal device. The apparatus may comprise a receiving unit and a transmitting unit. In accordance with some exemplary embodiments, the receiving unit may be operable to carry out at least the receiving step of the method according to the fifth aspect of the present disclosure. The transmitting unit may be operable to carry out at least the transmitting step of the method according to the fifth aspect of the present disclosure.

According to a ninth aspect of the present disclosure, there is provided a method performed by a second network node such as a base station. The method comprises receiving, from a first network node supporting a first RAT, a message including information of a terminal device regarding a first resource set and/or a second resource set. In accordance with an exemplary embodiment, the method further comprises communicating with the terminal device using a second RAT, according to the received message of the terminal device.

In accordance with an exemplary embodiment, the message received from the first network node by the second network node may be based at least in part on first information and second information for the terminal device. The first information may indicate whether there is a restriction on use of the second RAT by the terminal device. The second information may indicate the second resource set for the second RAT. When there is the restriction on use of the second RAT by the terminal device, the terminal device may be allowed to use the first resource set which is provided by the second network node for the second RAT, but not allowed to use the second resource set.

In accordance with some exemplary embodiments, the first resource set and the second resource set according to the ninth aspect of the present disclosure may correspond to the first resource set and the second resource set according to the first aspect of the present disclosure, respectively. Thus, the first resource set according to the first aspect of the present disclosure and the first resource set according to the ninth aspect of the present disclosure may have the same or similar contents and/or feature elements. Similarly, the second resource set according to the first aspect of the present disclosure and the second resource set according to the ninth aspect of the present disclosure may have the same or similar contents and/or feature elements.

In accordance with an exemplary embodiment, the first information may indicate that there is the restriction on use of the second RAT by the terminal device.

In accordance with an exemplary embodiment, the message received from the first network node by the second network node may include capability information of the terminal device about the first resource set while including no capability information of the terminal device about the second resource set.

In accordance with an exemplary embodiment, the message received from the first network node by the second network node may include the second information for the terminal device.

In accordance with an exemplary embodiment, the message received from the first network node by the second network node may comprise a CG-ConfigInfo message.

In accordance with an exemplary embodiment, the first information may indicate that there is no restriction on use of the second RAT by the terminal device.

In accordance with an exemplary embodiment, the message received from the first network node by the second network node may include capability information of the terminal device about the first and second resource sets.

According to a tenth aspect of the present disclosure, there is provided an apparatus which may be implemented as a second network node. The apparatus may comprise one or more processors and one or more memories storing computer program codes. The one or more memories and the computer program codes may be configured to, with the one or more processors, cause the apparatus at least to perform any step of the method according to the ninth aspect of the present disclosure.

According to an eleventh aspect of the present disclosure, there is provided a computer-readable medium having computer program codes embodied thereon which, when executed on a computer, cause the computer to perform any step of the method according to the ninth aspect of the present disclosure.

According to a twelfth aspect of the present disclosure, there is provided an apparatus which may be implemented as a second network node. The apparatus may comprise a receiving unit and a communicating unit. In accordance with some exemplary embodiments, the receiving unit may be operable to carry out at least the receiving step of the method according to the ninth aspect of the present disclosure. The communicating unit may be operable to carry out at least the communicating step of the method according to the ninth aspect of the present disclosure.

Advantageous Effects of Invention

Various exemplary embodiments of the present disclosure propose a solution for resource restriction, which may enable a 5G capable device with NR restriction to use some specific NR resources, so as to solve the unbalanced usage of 4G/LTE and 5G/NR network resources while improving network performance with enhanced resource efficiency.

BRIEF DESCRIPTION OF DRAWINGS

The disclosure itself, the preferable mode of use and further objectives are best understood by reference to the following detailed description of the embodiments when read in conjunction with the accompanying drawings, in which:

FIG. 1A is a diagram illustrating an exemplary network architecture according to an embodiment of the present disclosure;

FIG. 1B is a diagram illustrating an exemplary SN addition procedure according to an embodiment of the present disclosure;

FIG. 1C is a diagram illustrating an exemplary SN release procedure according to an embodiment of the present disclosure;

FIG. 1D is a diagram illustrating an exemplary initial context setup procedure according to an embodiment of the present disclosure;

FIG. 1E is a diagram illustrating exemplary NR restriction state machine transition according to an embodiment of the present disclosure;

FIG. 1F is a diagram illustrating exemplary NR restriction initial state decision according to an embodiment of the present disclosure;

FIG. 1G is a diagram illustrating exemplary NR restriction on-the-fly state change according to an embodiment of the present disclosure;

FIGS. 2A-2B are diagrams illustrating exemplary NR spectrum usage according to some embodiments of the present disclosure;

FIG. 2C is a diagram illustrating exemplary activation of enhanced NR restriction according to an embodiment of the present disclosure;

FIG. 2D is a diagram illustrating exemplary enhanced NR restriction state machine transition according to an embodiment of the present disclosure;

FIG. 3A is a diagram illustrating an exemplary UE capability enquiry procedure according to an embodiment of the present disclosure;

FIG. 3B is a diagram illustrating an exemplary UE capability enquiry message according to an embodiment of the present disclosure;

FIG. 3C is a diagram illustrating an exemplary UE capability information indication procedure according to an embodiment of the present disclosure;

FIG. 3D is a diagram illustrating exemplary enhanced NR restriction initial state decision according to an embodiment of the present disclosure;

FIG. 3E is a diagram illustrating exemplary enhanced NR restriction on-the-fly state change according to an embodiment of the present disclosure;

FIG. 3F is a diagram illustrating a first use case of enhanced NR restriction according to an embodiment of the present disclosure;

FIG. 3G is a diagram illustrating a second use case of enhanced NR restriction according to an embodiment of the present disclosure;

FIG. 3H is a diagram illustrating an exemplary CG-ConfigInfo message according to an embodiment of the present disclosure;

FIG. 3I is a diagram illustrating exemplary node addition preparation according to an embodiment of the present disclosure;

FIG. 3J is a diagram illustrating exemplary enhanced NR restriction initial state decision according to another embodiment of the present disclosure;

FIG. 3K is a diagram illustrating exemplary enhanced NR restriction on-the-fly state change according to another embodiment of the present disclosure;

FIG. 3L is a diagram illustrating a third use case of enhanced NR restriction according to an embodiment of the present disclosure;

FIG. 3M is a diagram illustrating a fourth use case of enhanced NR restriction according to an embodiment of the present disclosure;

FIG. 3N is a diagram illustrating an exemplary network deployment according to an embodiment of the present disclosure;

FIG. 4A is a flowchart illustrating a method according to an embodiment of the present disclosure;

FIG. 4B is a flowchart illustrating another method according to an embodiment of the present disclosure;

FIG. 4C is a flowchart illustrating a further method according to an embodiment of the present disclosure;

FIG. 5 is a block diagram illustrating an apparatus according to an embodiment of the present disclosure;

FIGS. 6A-6C are block diagrams illustrating apparatuses according to some embodiments of the present disclosure;

FIG. 7 is a block diagram illustrating a telecommunication network connected via an intermediate network to a host computer in accordance with some embodiments of the present disclosure;

FIG. 8 is a block diagram illustrating a host computer communicating via a base station with a UE over a partially wireless connection in accordance with some embodiments of the present disclosure;

FIG. 9 is a flowchart illustrating a method implemented in a communication system, in accordance with an embodiment of the present disclosure;

FIG. 10 is a flowchart illustrating a method implemented in a communication system, in accordance with an embodiment of the present disclosure;

FIG. 11 is a flowchart illustrating a method implemented in a communication system, in accordance with an embodiment of the present disclosure; and FIG. 12 is a flowchart illustrating a method implemented in a communication system, in accordance with an embodiment of the present disclosure.

MODE FOR THE INVENTION

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "communication network" refers to a network following any suitable communication standards, such as new radio (NR), long term evolution (LTE), LTE-Advanced, wideband code division multiple access (WCDMA), high-speed packet access (HSPA), and so on. Furthermore, the communications between a terminal device and a network node in the communication network may be performed according to any suitable generation communication protocols, including, but not limited to, the first generation (1G), the second generation (2G), 2.5G, 2.75G, the third generation (3G), 4G, 4.5G, 5G communication protocols, and/or any other protocols either currently known or to be developed in the future.

The term "network node" refers to a network device in a communication network via which a terminal device accesses to the network and receives services therefrom. The network node may refer to a base station (BS), an access point (AP), a multicell/multicast coordination entity (MCE), a controller or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

Yet further examples of the network node comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network node may represent any suitable device (or group of devices) capable, configured, arranged, and/or operable to enable and/or provide a terminal device access to a wireless communication network or to provide some service to a terminal device that has accessed to the wireless communication network.

The term "terminal device" refers to any end device that can access a communication network and receive services therefrom. By way of example and not limitation, the terminal device may refer to a mobile terminal, a user equipment (UE), or other suitable devices. The UE may be, for example, a subscriber station, a portable subscriber station, a mobile station (MS) or an access terminal (AT). The terminal device may include, but not limited to, portable computers, image capture terminal devices such as digital cameras, gaming terminal devices, music storage and play-back appliances, a mobile phone, a cellular phone, a smart phone, a tablet, a wearable device, a personal digital assistant (PDA), a vehicle, and the like.

As yet another specific example, in an Internet of things (IoT) scenario, a terminal device may also be called an IoT device and represent a machine or other device that performs monitoring, sensing and/or measurements etc., and transmits the results of such monitoring, sensing and/or measurements etc. to another terminal device and/or a network equipment. The terminal device may in this case be a machine-to-machine (M2M) device, which may in a 3rd generation partnership project (3GPP) context be referred to as a machine-type communication (MTC) device.

As one particular example, the terminal device may be a UE implementing the 3GPP narrow band Internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment, for example, a medical instrument that is capable of monitoring, sensing and/or reporting etc. on its operational status or other functions associated with its operation.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

Wireless communication networks are widely deployed to provide various telecommunication services such as voice, video, data, messaging and broadcasts. 5G/NR technology may be used for the 5th generation cellular mobile systems that can provide improved performance related to data rate, coverage and capacity compared to legacy 4G/LTE systems. Today 5G/NR services may be mostly provided as non-stand-alone (NSA) mode, e.g., as specified in 3GPP option 3x where 5G subscription users may connect to a 4G/LTE node first then LTE may connect to NR by using dual-connectivity (DC) technology, which is called as evolved universal mobile telecommunications system (UMTS) terrestrial radio access-NR dual connectivity (also called Eutra-NR DC, or EN-DC for short).

Figure 1D:
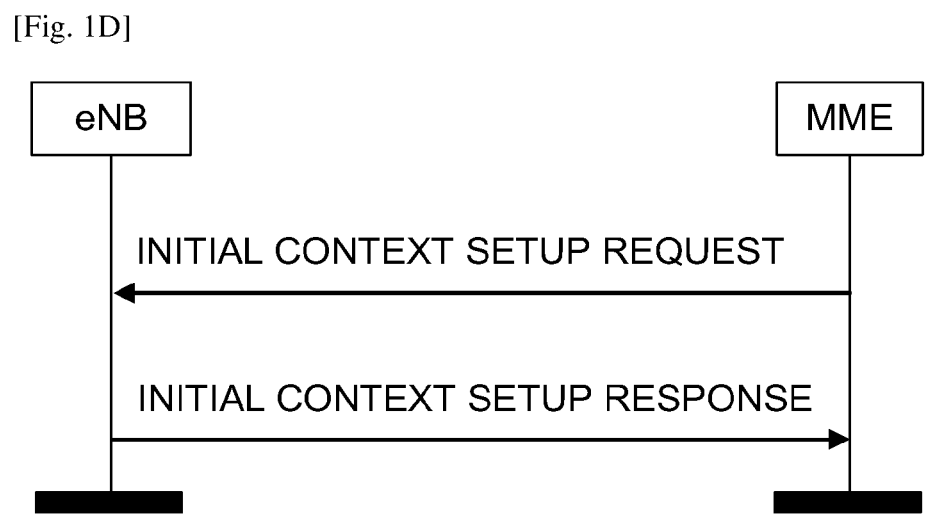

FIG. 1A is a diagram illustrating an exemplary network architecture according to an embodiment of the present disclosure. For simplicity, FIG. 1A only schematically shows an EN-DC overall architecture with some exemplary network elements, such as an ENDC capable UE, an eNo-deB (eNB), a gNodeB (gNB) and an evolved packet system (EPS). The network elements may communicate with each other via various interfaces such as S1, S1-U, X2, etc. As shown in FIG. 1A, the eNB may provide LTE control plane and LTE user plane termination towards the UE and act as an MN, and the gNB may provide NR user plane termination towards the UE and act as SN in EN-DC, also known as NR NSA or 3GPP option 3x.

As specified, for example, in 3GPP TS 37.340 V16.1.0 (where the entire content of this technical specification is incorporated into the present disclosure by reference), an SN addition procedure may be initiated by the MN, and used to establish a UE context at the SN to provide resources from the SN to the UE. For bearers requiring secondary cell group (SCG) radio resources, this procedure may be used to add at least the first cell of the SCG.

FIG. 1B is a diagram illustrating an exemplary SN addition procedure according to an embodiment of the present disclosure. It can be appreciated that network elements and signaling messages shown in FIG. 1B are just as examples, and more or less alternative network elements and signaling messages may be involved in the SN addition procedure according to various embodiments of the present disclosure. As shown in FIG. 1B, the exemplary SN addition procedure may be implemented by the following steps:

1. An MN may decide to request an SN to allocate resources for a specific evolved UMTS terrestrial radio access network (E-UTRAN) radio access bearer (E-RAB), indicating E-RAB characteristics (e.g., E-RAB parameters, transport network layer (TNL) address information corresponding to bearer type, etc.). In addition, for bearers requiring SCG radio resources, the MN may indicate the requested SCG configuration information, including the entire UE capabilities and the UE capability coordination result. In this case, the MN may also provide the latest measurement results for the SN to choose and configure the SCG cell(s). The MN may request the SN to allocate radio resources for split signaling radio bearer (SRB) operation. The MN may always provide all the needed security information to the SN (even if no SN terminated bearers are setup) to enable SRB3 to be setup based on SN decision. In case of bearer options that require X2-U resources between the MN and the SN, the MN may provide X2-U TNL address information for the respective E-RAB, X2-U downlink (DL) TNL address information for SN terminated bearers, X2-U uplink (UL) TNL address information for MN terminated bearers. In case of SN terminated split bearers, the MN may provide the maximum quality of service (QoS) level that it can support. The SN may reject the request.

NOTE 1B-1: For split bearers, master cell group (MCG) and SCG resources may be requested of such an amount that the QoS for the respective E-RAB is guaranteed by the exact sum of resources provided by the MCG and the SCG together, or even more. For MN terminated split bearers, the MN's decision may be reflected in step 1 of FIG. 1B by the E-RAB parameters signaled to the SN, which may differ from E-RAB parameters received over S1.

NOTE 1B-2: For a specific E-RAB, the MN may request the direct establishment of an SCG or a split bearer, i.e., without first having to establish an MCG bearer. It is also allowed that all E-RABs can be configured as SN terminated bearers, i.e. there is no ERAB established as an MN terminated bearer.

2. If the radio resource management (RRM) entity in the SN is able to admit the resource request, it may allocate respective radio resources and, depending on the bearer option, respective transport network resources. For bearers requiring SCG radio resources, the SN may trigger random access (RA) so that synchronization of the SN radio resource configuration can be performed. The SN may decide the primary secondary cell (PS-Cell) and other SCG secondary cells (SCells) and provide the new SCG radio resource configuration to the MN in a NR radio resource control (RRC) configuration message contained in the secondary gNB (SgNB) Addition Request Acknowledge message. In case of bearer options that require X2-U resources between the MN and the SN, the SN may provide X2-U TNL address information for the respective E-RAB, X2-U UL TNL address information for SN terminated bearers, X2-U DL TNL address information for MN terminated bearers. For SN terminated bearers, the SN may provide the S1-U DL TNL address information for the respective E-RAB and security algorithm. If SCG radio resources have been requested, the SCG radio resource configuration may be provided.

NOTE 1B-3: For the SN terminated split bearer option, the SN may either decide to request resources from the MN of such an amount that the QoS for the respective ERAB is guaranteed by the exact sum of resources provided by the MN and the SN together, or even more. The SN's decision may be reflected in step 2 of FIG. 1B by the E-RAB parameters signaled to the MN, which may differ from E-RAB parameters received in step 1 of FIG. 1B. The QoS level requested from the MN does not exceed the level that the MN offered when setting up the split bearer in step 1 of FIG. 1B.

NOTE 1B-4: In case of MN terminated bearers, transmission of user plane data may take place after step 2 of FIG. 1B.

NOTE 1B-5: In case of SN terminated bearers, data forwarding and the SN status transfer may take place after step 2 of FIG. 1B.

3. The MN may send to the UE the RRCConnectionReconfiguration message including the NR RRC configuration message, without modifying it.

4. The UE may apply the new configuration and reply to the MN with RRCConnectionReconfigurationComplete message, including a NR RRC response message, if needed. In the case that the UE is unable to comply with (part of) the configuration included in the RRC- ConnectionReconfiguration message, it may perform the reconfiguration failure procedure.

5. The MN may inform the SN that the UE has completed the reconfiguration procedure successfully via the SgNB ReconfigurationComplete message, including the encoded NR RRC response message, if received from the UE.

6. If configured with bearers requiring SCG radio resources, the UE may perform synchronization towards the PSCell of the SN. The order the UE sends the RRCConnectionReconfigurationComplete message and performs the RA procedure towards the SCG is not defined. The successful RA procedure towards the SCG may not be required for a successful completion of the RRC connection reconfiguration procedure.

7. If packet data convergence protocol (PDCP) termination point is changed to the SN for bearers using radio link control (RLC) acknowledged mode (AM), and when RRC full configuration is not used, the MN may send the SN Status Transfer message.

8. For SN terminated bearers moved from the MN, depending on the bearer characteristics of the respective E-RAB, the MN may take actions to minimize service interruption due to activation of EN-DC (data forwarding).

9. If applicable, the update of the user plane (UP) path towards the EPC may be performed. The MN may send an E-RAB modification indication to a mobility management entity (MME).

10. The bearer modification may be performed between the serving gateway (S-GW) and the MME.

11. The end marker packet may be transmitted among the S-GW, the MN and the SN.

12. The MME may send the E-RAB modification confirm message to the MN.

FIG. 1C is a diagram illustrating an exemplary SN release procedure according to an embodiment of the present disclosure. The SN release procedure may be initiated by an MN, and used to release a UE context at an SN to release resources from the SN to a UE, e.g. as specified in 3GPP TS 37.340 V16.1.0. As shown in FIG. 1C, the exemplary SN release procedure may be implemented by the following steps:

1. The MN may initiate the SN release procedure by sending the SgNB Release Request message. If applicable, the MN may provide data forwarding addresses to the SN.

2. The SN may confirm SN release by sending the SgNB Release Request Acknowledge message. If appropriate, the SN may reject SN release, e.g. if the SN change procedure is triggered by the SN.

3. If required, the MN may indicate in the RRCConnectionReconfiguration message towards the UE that the UE may need to release the entire SCG configuration.

4. The UE may reply to the MN with RRCConnectionReconfigurationComplete message, if needed. In the case that the UE is unable to comply with (part of) the configuration included in the RRCConnectionReconfiguration message, it may perform the reconfiguration failure procedure NOTE 1C-1: If data forwarding is applied, timely coordination between steps 1 and 2 of FIG. 1C may minimize gaps in service provision, this is however regarded to be an implementation matter.

5. For bearers using RLC AM, the SN may send the SN Status Transfer message.

6. Data forwarding from the SN to the MN may start.

7. The SN may send the Secondary RAT Data Usage Report message to the MN and include the data volumes delivered to and received from the UE over the NR radio for the related E-RABs.

NOTE 1C-2: If data forwarding is applied, the order the SN sends the Secondary RAT Data Usage Report message and starts data forwarding with MN is not defined i.e., step 7 of FIG. 1C can take place before step 6 of FIG. 1C. The SN may not need to wait for the end of data forwarding to send the Secondary RAT Data Usage Report message.

8. If applicable, the path update procedure may be initiated.

9. Upon reception of the UE Context Release message, the SN may release radio and C-plane related resources associated to the UE context. Any ongoing data forwarding may continue.

From mobile service providers perspective, 5G/NR services may be supposed to be provided only to the users having valid 5G subscriptions with 5G mobile devices, hence it may be needed to ensure that an LTE eNB can verify that a specific user is a valid 5G subscriber (who is using a 5G capable device with 5G subscription), or a 4G subscriber (who is using a 5G capable device while keeping data plan in 4G subscription), or possibly a 'limited' 5G subscriber (who is using a 5G capable device with 5G subscription but the 5G data service amount is limited according to the monthly data plan). There may be four types of user subscriptions as below:

5G subscription with a 5G device: a 5G/NR service is possible and allowed;

5G subscription with a 5G device, but limited: a 5G/NR service is possible but restricted because of the limited 5G service monthly data plan (e.g., a user has already consumed the contracted monthly data amount, for instance 100 GBytes/month);

4G subscription with a 5G device: a 5G/NR service is possible but restricted because of no subscription of 5G data plan; and 4G subscription with a 4G device: a 5G/NR service is not possible.

FIG. 1D is a diagram illustrating an exemplary initial context setup procedure according to an embodiment of the present disclosure. As shown in FIG. 1D, an LTE eNB may receive subscription information within the S1AP: Initial Context Setup Request from an MME. This message may include an 'NR Restriction in EPS as Secondary RAT' flag and also a subscriber profile identity (SPID). The EPC may allocate specific SPID values to 5G subscribers allowing the eNB to differentiate those subscribers. Then the eNB may send an Initial Context Setup Response message to the MME.

It can be appreciated that the 'NR Restriction in EPS as Secondary RAT' flag or information element (IE) may not only be included in 'S1AP: Initial Context Setup Request', but may also be included in other S1AP or X2AP messages, such as 'S1AP: Handover Request', 'S1AP: Path Switch Request Acknowledge', 'S1AP: Downlink Non-Access Stratum (NAS) Transport', 'X2AP: Handover Request', 'X2AP: Retrieve UE Context Response', 'X2AP: SgNB Addition Request', 'X2AP: SgNB Modification Request', etc.

In accordance with an exemplary embodiment, the 'NR restriction' may be implemented in the LTE eNB as follows:

When a new UE context is setup in the eNB by 'S1AP: Initial Context Setup Request', 'S1AP: Handover Request', 'X2AP: Handover Request' or 'X2AP:

Retrieve UE Context Response', the eNB may change the NR Restriction state to 'NR Restricted State' or 'Not Restricted State' depending on whether the 'NR Restriction in EPS as Secondary RAT' IE is present or not.

Afterwards, if 'S1AP: Path Switch Request Acknowledge' or 'S1AP: Downlink NAS Transport' message has different 'NR Restriction in EPS as Secondary RAT' IE presence, the NR Restriction State may be changed.

FIG. 1E is a diagram illustrating exemplary NR restriction state machine transition according to an embodiment of the present disclosure. As shown in FIG. 1E, there may be three states for a UE, including 'Initial State', 'Not Restricted State' and 'NR Restricted State'. Depending on whether the 'NR Restriction in EPS as Secondary RAT' IE is present or not, the state of the UE may be set or changed as below:

The 'Initial State' may be set when a first UE connection is setup in an eNB, and goes to either 'Not Restricted state' or 'NR Restricted State' depending on whether the 'NR Restriction in EPS as Secondary RAT' IE is present or not in a UE connection setup message such as 'S1AP: Initial Context Setup Request', 'S1AP: Handover Request', 'X2AP: Handover Request' or 'X2AP: Retrieve UE Context Response', etc.

The 'Not Restricted State' means that the UE is identified as a 5G subscriber that can use the full 5G NR service. The state can be changed from 'Not Restricted State' to 'NR Restricted State' when 'S1AP: Path Switch Request Acknowledge' or 'S1AP: Downlink NAS Transport' message carries the 'NR Restriction in EPS as Secondary RAT' IE. If the state is changed to 'NR Restricted State' and the UE is already using a NR service, then the MN-Initiated SN Release procedure may be immediately performed as described with respect to FIG. 1C.

The 'NR Restricted State' means that the UE needs to be restricted to use a 5G/NR service. The state can be changed from 'NR Restricted State' to 'Not Restricted State' when 'S1AP: Path Switch Request Acknowledge' or 'S1AP: Downlink NAS Transport' message does not contain the 'NR Restriction in EPS as Secondary RAT' IE. If the state is changed to 'Not Restricted State' and the UE is not EN-DC connected, the MN-Initiated SN Addition procedure may be performed as described with respect to FIG. 1B.

FIG. 1F is a diagram illustrating exemplary NR restriction initial state decision according to an embodiment of the present disclosure. As shown in FIG. 1F, the NR restriction state of a UE may be set as 'InitialState' (i.e. 'Initial State' as described with respect to FIG. 1E) in response to the UE context setup. If the 'NR Restriction in EPS as Secondary RAT' IE is present, the NR restriction state of the UE may be decided to change from 'InitialState' to 'NrRestrictedState' (i.e. 'NR Restricted State' as described with respect to FIG. 1E). If the 'NR Restriction in EPS as Secondary RAT' IE is not present, the NR restriction state of the UE may be decided to change from 'InitialState' to 'NotRestrictedState' (i.e. 'Not Restricted State' as described with respect to FIG. 1E).

FIG. 1G is a diagram illustrating exemplary NR restriction on-the-fly state change according to an embodiment of the present disclosure. The on-the-fly state change may be triggered by a core network when user subscription is changed to 'restricted to use NR service' or 'unrestricted to use NR service' whenever needed. Mostly, changing to 'restricted to use NR service' may happen for a user having 5G subscription with a 5G device but limited, i.e., a 5G/NR service is possible but restricted because the user has a limited 5G service monthly data plan and the user consumed the contracted monthly data amount. On the other hand, changing to 'unrestricted to use NR service' may happen for a user who is restricted before, but the contracted data amount is restored at the beginning of the next month.

As shown in FIG. 1G, when 'NrRestrictionState' of a UE is changed from 'NotRestrictedState' to 'NrRestrictedState', the connected EN-DC may be released by force, and the UE may be prohibited to use EN-DC with any NR bands. When 'NrRestrictionState' of the UE is changed from 'NrRestrictedState' to 'NotRestrictedState', the UE may be allowed to use EN-DC with any NR bands. In this case, the eNB connected with the UE may trigger the SN Addition procedure.

NR restriction may be a very important functionality in the network as there are many 4G subscriptions having 5G capable devices. Many network operators may deploy the NR networks more widely not only from the coverage perspective but also spectrum perspective, so that the NR services may be much more available to 5G subscription users. However, the 5G subscription users may not be so much increased today and the 4G/LTE network may become more crowd or sometimes overloaded but still the 5G/NR network may not be much busy, resulting unbalanced network utilization.

Also, there may be many NR frequency spectrums which may be provisioned by the network operators, where the frequency spectrums may be specified as Low-band (e.g., below 3 GHz), Mid-band (e.g., 3~25 GHz) and High-band (e.g., above 25 GHz) frequencies. Due to frequency characteristics, High-band frequencies may give much higher user throughput than Mid-band and Low-band frequencies. Therefore, there may be a strong need for 'more differentiation' in 'NR Restriction' functionality in a frequency level, such as '5G subscription' users are not restricted to use all frequency bands, while '5G subscription but limited' or '4G subscription with 5G capable device' users are only allowed to use lower prioritized frequency bands such as Mid-band or Low-band frequencies but restricted to use High-band frequencies at all. This also may resolve the unbalanced network utilization.

FIGS. 2A-2B are diagrams illustrating exemplary NR spectrum usage according to some embodiments of the present disclosure. FIG. 2A shows the current NR spectrum usage with legacy "NR Restriction", where only 5G subscription with a 5G capable device can use the full NR spectrums (including LTE frequency spectrums and NR frequency spectrums), while 4G subscription with a 4G device, 4G subscription with a 5G device, and 5G subscription with a 5G device but limited, are not allowed to use any NR spectrums. As shown in FIG. 2A, the NR frequency spectrums may include NR frequency range 1 (FR1) with low-prioritized spectrums and NR frequency range 2 (FR2) with high-prioritized spectrums. The NR spectrum usage with legacy "NR Restriction" may cause a network unbalance problem. A possible way to avoid this network unbalance problem may be introducing a functionality to exclude FR1 from NR restriction. One of the purposes may be to allow the usage of FR1 for a 4G subscriber with an EN-DC capable device. FIG. 2B shows exemplary NR spectrum usage with "Enhanced NR Restriction", where any users with 5G capable devices can use the low-prioritized NR spectrums (e.g. NR FR1), and 5G subscription with a 5G capable device can use both low-prioritized and high-prioritized NR spectrums (e.g. NR FR1 and NR FR2).

Various exemplary embodiments of the present disclosure propose a solution for supporting flexible resource restriction, which can enable selective use of specific radio resources such as some NR bands even for the NR-restricted users who have 5G capable devices, so as to maximize NR spectrum utilization. The proposed solution may be achieved by "enhanced NR restriction" as described with respect to various embodiments. In accordance with an exemplary embodiment, the "enhanced NR restriction" may be based on one or more standardized "NR restriction" features as specified in 3GPP standards, but give more flexibility to utilize the NR spectrums by providing a configurable 'restricted NR band list' to be used to determine whether to allow using NR spectrums for a 4G/5G subscriber.

In accordance with an exemplary embodiment, the proposed solution may enable the RAN (e.g., an eNB and/or a gNB, etc.) to restrict or allow a specific NR band to specific users technically. There may be two schemes as below:

Scheme I: using UE capability refresh

This scheme may be performed on eNB side only and can be implemented with current 3GPP standard. The network operators can configure a 'restricted NR band list' in the eNB with one or more prioritized policies, for example, High-band frequencies may be included in the 'restricted NR band list', and Low-band and/or Mid-band frequencies may be excluded from the 'restricted NR band list'.

Once the 'restricted NR band list' is configured, which means the 'enhanced NR restriction' is activated, the eNB may remove the 'restricted NR band list' from the UE capability by performing 'UE capability refresh' for the specific users who need to be restricted to use the 'restricted NR band list' via the 'NR restriction information', so that these users may not be allowed to use the NR band(s) in the 'restricted NR band list'.

'UE capability refresh' is a procedure that the eNB may enquire UE capability information from the UE, e.g. by excluding the 'restricted NR band list', so that the UE capability information may not include the restricted NR bands. This looks like that the UE does not support EN-DC with those restricted bands/frequencies, so that the ENDC may be only allowed to non-restricted frequencies. Since the entire UE capability may be transferred to the gNB during the SN Addition procedure, the gNB may not need to restrict a specific NR band for that UE by the filtered UE capability.

Scheme II: transferring the 'restricted NR band list' configuration from the eNB to the gNB This scheme may be performed on both eNB and gNB sides and possibly require a change of 3GPP standard. Similar to scheme I, the network operators using scheme II can configure a 'restricted NR band list' in the eNB with one or more prioritized policies, for example, High-band frequencies may be included in the 'restricted NR band list', and Low-band and/or Mid-band frequencies may be excluded from the 'restricted NR band list'.

Once the 'restricted NR band list' is configured, which means the 'enhanced NR restriction' is activated, the eNB may not trigger the SN Addition procedure for the band(s) in the 'restricted NR band list', but may allow the SN Addition procedure for the non-restricted bands. During the SN Addition procedure with the non-restricted NR band, the eNB may transfer the 'restricted NR band list' and/or the 'restricted NR band list' configuration to the gNB, e.g. via 'X2AP: SgNB Addition Request' message, etc. Afterwards the gNB may not trigger to change the PSCell band to a band in the 'restricted NR band list', and also may not add a band in the 'restricted NR band list' as the NR SCell (Supplementary Cell).

It is noted that some embodiments of the present disclosure are mainly described in relation to 4G/LTE or 5G/NR specifications being used as non-limiting examples for certain exemplary network configurations and system deployments. As such, the description of exemplary embodiments given herein specifically refers to terminology which is directly related thereto. Such terminology is only used in the context of the presented non-limiting examples and embodiments, and does naturally not limit the present disclosure in any way. Rather, any other system configuration or radio technologies may equally be utilized as long as exemplary embodiments described herein are applicable.

FIG. 2C is a diagram illustrating exemplary activation of enhanced NR restriction according to an embodiment of the present disclosure. In a communication network supporting DC operations, an eNB may be connected with one or more neighbor gNBs that provide one or multiple NR bands. Those NR bands may be listed up as <Supported NR Band List>, e.g., including NR band #1, NR band #2, NR band #3, NR band #4 and NR band #5. The network operator can choose one or multiple NR bands from the <Supported NR Band List> and configure into <Restricted NR Band List>, e.g., including NR band #2 and NR band #3. In an exemplary embodiment, once the <Restricted NR Band List> is configured, the enhanced NR restriction may be activated. In FIG. 2C, the eNB may configure 2 NR bands as <Restricted NR Band List> from 5 supported NR Bands, where the eNB is connected with two gNBs that provide 2 NR bands (e.g., NR band #1 and NR band #5) and 4 NR bands (e.g., NR band #1, NR band #2, NR band #3 and NR band #4), respectively.

In accordance with an exemplary embodiment, "NR restriction" and/or "enhanced NR restriction" may be performed per individual UE level. The NR restriction information may be indicated by the EPC for a specific UE when the RRC connection is established in the eNB via a message such as S1AP: INITIAL CONTEXT SETUP, S1AP: HANDOVER REQUEST, etc. The received NR restriction information may also be transferred to another eNB (e.g. a neighbor eNB, etc.) at mobility, e.g., via the X2AP: HANDOVER REQUEST message or X2AP: Retrieve UE Context Response message, etc.

FIG. 2D is a diagram illustrating exemplary enhanced NR restriction state machine transition according to an embodiment of the present disclosure. In this embodiment, the "NR Restricted State" may be separated into two states, i.e. "Partial NR Restricted State" and "Full NR Restricted State", depending on whether the enhanced NR restriction is activated or not. As shown in FIG. 2D, there may be four states for a UE, including the 'Initial State', the 'Full NR Restricted State', the 'Not Restricted State' and the 'Partial NR Restricted State'. Depending on whether the 'NR Restriction in EPS as Secondary RAT' IE is present or not and whether the 'restricted NR band list' is configured or not, the state of the UE may be set or changed as below:

The 'Initial State' may be set when a first UE connection is setup in an eNB and goes to either 'Not Restricted state' or 'NR Restricted State' depending on whether 'NR Restriction in EPS as Secondary RAT' IE is present or not in a UE connection setup message such as 'S1AP: Initial Context Setup Request', 'S1AP: Handover Request', 'X2AP: Handover Request' or 'X2AP: Retrieve UE Context Response', etc.

The 'Not Restricted State' means that the UE is identified as a 5G subscriber that can use the full 5G NR service. When 'S1AP: Path Switch Request Acknowledge' or 'S1AP: Downlink NAS Transport' message carries the 'NR Restriction in EPS as Secondary RAT' IE, the state may be changed from 'Not Restricted State' to 'Full NR Restricted State' or 'Partial NR Restricted State' depending on whether there is 'restricted NR band list' configuration. If the 'restricted NR band list' is configured, the state may be changed from 'Not Restricted State' to 'Partial NR Restricted State'. If the 'restricted NR band list' is not configured, the state may be changed from 'Not Restricted State' to 'Full NR Restricted State'. In other words, if the 'restricted NR band list' is not configured, the enhanced NR restriction state machine transition diagram shown in FIG. 2D may be the same as the NR restriction state machine transition diagram shown in FIG. 1E.

If the state is changed to 'Full NR Restricted State' and the UE is already using a NR service, then the SN Release procedure may be immediately performed as described with respect to FIG. 1C.

If the state is changed to 'Partial NR Restricted State' and the UE is already using a NR service which is configured in the 'restricted NR band list', then the UE may be requested to change current NR band to one among the unrestricted band list. If there is no available unrestricted band, then the SN Release procedure may be immediately performed.

The 'Full NR Restricted State' means that the UE may need to be restricted to use (i.e. not allowed to use) any 5G/NR service.

The state may be changed from 'Full NR Restricted State' to 'Not Restricted State' when 'S1AP: Path Switch Request Acknowledge' or 'S1AP: Downlink NAS Transport' message does not contain the 'NR Restriction in EPS as Secondary RAT' IE. If the state is changed to 'Not Restricted State', the SN Addition procedure may be performed as described with respect to FIG. 1B.

The 'Full NR Restricted State' may not be changed to 'Partial NR Restricted State' because there may exit only two groups of states as below depending on whether the 'restricted NR band list' is configured or not.

'Initial State'->'Full NR Restricted State'<->'Not Restricted State'; or

'Initial State'->'Partial NR Restricted State'<->'Not Restricted State'.

The 'Partial NR Restricted State' means that the UE may only be allowed to use the partial 5G/NR service or band which is not specified in the 'restricted NR band list'.

The state may be changed from 'Partial NR Restricted State' to 'Not Restricted State' when 'S1AP: Path Switch Request Acknowledge' or 'S1AP: Downlink NAS Transport' message does not contain the 'NR Restriction in EPS as Secondary RAT' IE. If the state is changed to 'Not Restricted State', the SN Addition procedure may be performed as described with respect to FIG. 1B.

The 'Partial NR Restricted State' may not be changed to 'Full NR Restricted State' because there may exit only two groups of states as below depending on whether the 'restricted NR band list' is configured or not.

'Initial State'->'Full NR Restricted State'<->'Not Restricted State'; or

'Initial State'->'Partial NR Restricted State'<->'Not Restricted State'.

Compared with the legacy NR restriction as shown in FIG. 2A, where all NR bands are restricted for the 'restricted' users and there is no support for the network operators to select which bands are to be restricted, the enhanced NR restriction as shown in FIG. 2B may partially restrict the 'restricted' users by using the specifically configured NR band list. The enhanced NR restriction may give advantage to the network operators to resolve the unbalanced usage of 4G and 5G spectrums as well as promote the 4G subscription users to migrate to 5G subscription to provide better services in 5G spectrum.

The existing solutions for NR restriction may not provide the network operators the ability to choose the targeted band frequencies which are to be restricted, while the enhanced NR restriction according to exemplary embodiments may provide more flexible control for the network operators. On the other hand, any UEs with the legacy NR restriction may always be restricted to use EN-DC due to the limitation from the service policy. However, the enhanced NR restriction may provide enhanced connectivity to the subscribers, because it is possible to provide EN-DC resources to NR restricted subscribers while restricting specific bands from using them.

It is noted that exemplary embodiments are described in this document as simple as possible at configuring the restricted NR bands and at exchanging the restricted NR band information between an eNB and a gNB by using X2AP interface. However, there may be several ways to configure the restricted NR band list per eNB, or per cell, or per public land mobile network (PLMN), or per network operator in a shared radio access node/network (RAN), or per user by using SPID, PLMN, allocation retention priority (ARP), etc. In addition, the approach of exchanging the configuration information between two nodes may be differently implemented by using different X2AP messages, or it may also be possible to configure each node independently.

In accordance with an exemplary embodiment, the enhanced restriction of NR resources may be controlled by using the previously mentioned scheme I and scheme II, so that the RAN (e.g., an eNB and/or a gNB) can restrict or allow one or more specific NR bands to specific users selectively.

In accordance with an exemplary embodiment, it may be possible to restrict FR2 (High-band frequencies) only for 4G subscribers and allow FR1 (Low-band and Midband frequencies) for all subscribers. It can be appreciated that although some embodiments are described with respect to specific NR bands, various embodiments according to the present disclosure may provide more flexible and general approaches to restrict/allow any radio resource (e.g. time, frequency and/or code, etc.) for the selected subscribers.

Figure 3A:
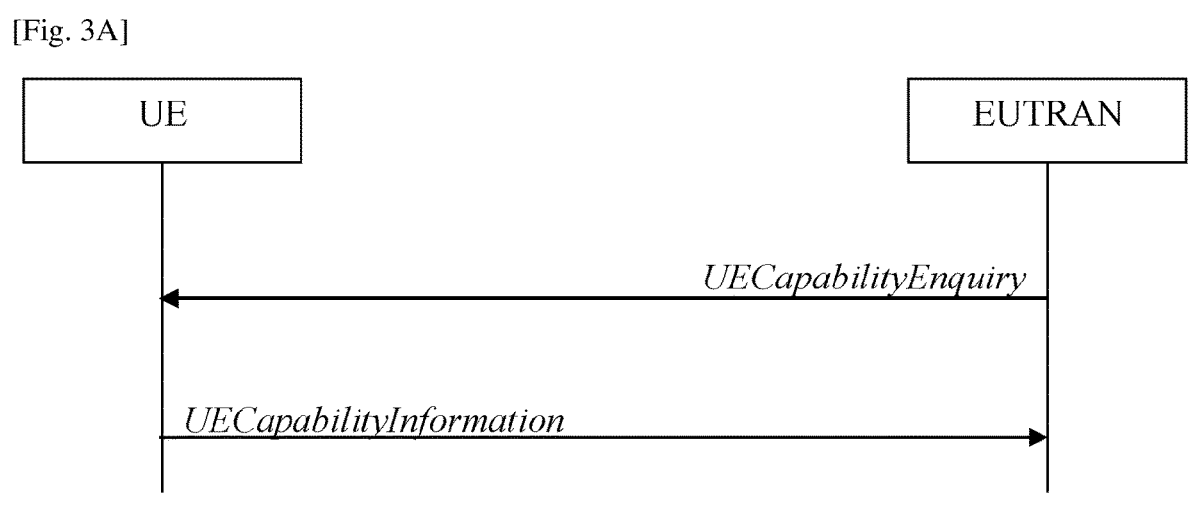

FIG. 3A is a diagram illustrating an exemplary UE capability enquiry procedure according to an embodiment of the present disclosure. Before an eNB may configure a UE with EN-DC, it may need to know which EN-DC band combination(s) the UE can support. The eNB may obtain this kind of information from an MME if available. If not, or if the information received from the MME does not cover the bands of interest, then the eNB may send a UE capability enquiry message to the UE, as shown in FIG. 3A. This capability enquiry message may include a list of NR bands and a list of LTE bands. The UE may respond with the band combination(s) it supports, e.g. by sending UE capability information to the eNB.

In accordance with an exemplary embodiment, the UE capability refresh procedure may be the same as the UE capability enquiry procedure, but to be used to exclude or include some specific NR bands which may be defined in 'restricted NR band list' configuration for 'Enhanced NR Restriction'. For example, the eNB may send a 'UECapabilityEnquiry' message to the UE with a 'requestedFreqBandsNR-MRDC-r15' IE which may carry a 'FreqBandList' consisting of lists of bandInformationEUTRA and bandInformationNR.

FIG. 3B is a diagram illustrating an exemplary UE capability enquiry message according to an embodiment of the present disclosure. In the exemplary UE capability enquiry message, both n78 and n257 NR bands are requested by the eNB, e.g. via including bandInformationNR of bandNR 78 and bandNR 257. In order to exclude the 'restricted NR band list' from the UE capability, the 'UECapabilityEnquiry' message may only contain bandInformationNRs that are not configured in the 'restricted NR band list'. Alternatively or additionally, in order to include the 'restricted NR band list' into the UE capability, the 'UECapabilityEnquiry' message may contain all available bandInformationNRs that are configured at the eNB.

FIG. 3C is a diagram illustrating an exemplary UE capability information indication procedure according to an embodiment of the present disclosure. By using the UE capability information indication procedure, the eNB may send a UE capability information indication to the MME, so that the UE capability information reported by the UE may also be stored in the MME.

FIG. 3D is a diagram illustrating exemplary enhanced NR restriction initial state decision according to an embodiment of the present disclosure. The enhanced NR restriction initial state decision may be performed to decide the NR restriction state during UE connection and/or UE context setup. As shown in FIG. 3D, when the UE context is set up at an eNB, the UE's NR restriction state may be set to 'InitialState' (i.e. 'Initial State' as described with respect to FIG. 2D). If the UE is identified as the 'restricted' user (e.g., in the case that the 'NR Restriction in EPS as Secondary RAT' IE is present, etc.) but the enhanced NR restriction is deactivated (e.g., in the case that the 'restricted NR band list' is not configured, etc.), then the UE's NR restriction state may be set to 'FullNrRestrictedState' (i.e. 'Full NR Restricted State' as described with respect to FIG. 2D). At 'FullNrRestrictedState', there may be no further action required since the eNB may always prohibit setting up EN-DC towards the UE.

If the UE is identified as the 'restricted' user and the enhanced NR restriction is activated (e.g., the 'restricted NR band list' is configured, etc.), then the UE's NR restriction state may be set to 'PartialNrRestrictedState' (i.e. 'Partial NR Restricted State' as described with respect to FIG. 2D). At 'PartialNrRestrictedState', the UE Capability Refresh procedure may be performed to exclude the 'restricted NR band list', so that the UE may be restricted to setup EN-DC for the restricted NR bands but allowed to setup EN-DC for other bands than the restricted NR bands.

If the UE is not identified as the 'restricted' user (e.g., in the case that the 'NR Restriction in EPS as Secondary RAT' IE is not present, etc.), then the UE's NR restriction state may be set to 'NotRestrictedState' (i.e. 'Not Restricted State' as described with respect to FIG. 2D). In this state, the eNB may check the UE capability. If the UE is previously restricted, the UE Capability Refresh procedure may be performed to include the 'restricted NR band list', so that the UE may be allowed to setup EN-DC for all supported NR bands.

Figure 3E:
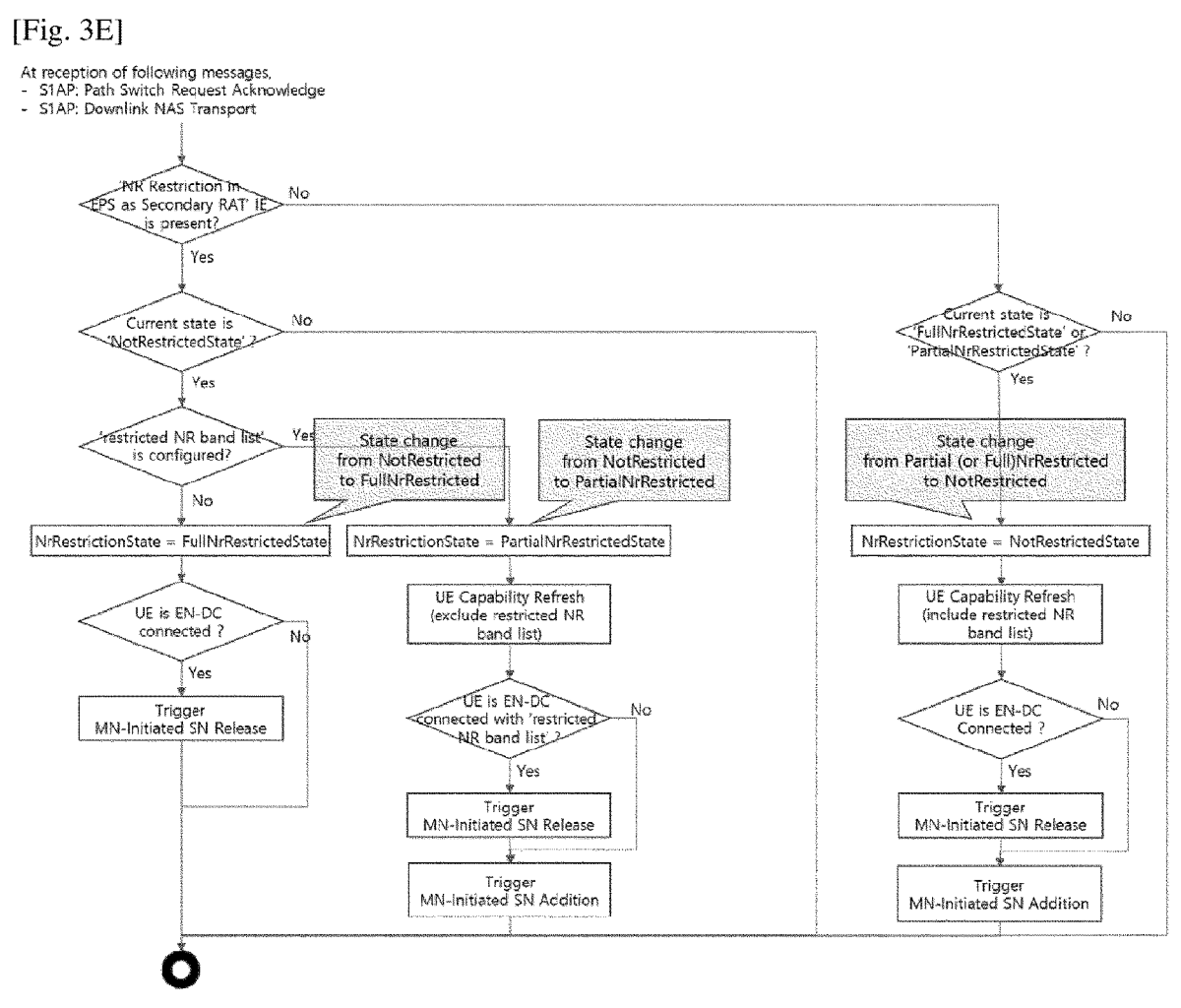

FIG. 3E is a diagram illustrating exemplary enhanced NR restriction on-the-fly state change according to an embodiment of the present disclosure. The enhanced NR restriction on-the-fly state change may occur after UE connection and/or UE context setup. As shown in FIG. 3E, after setting up the UE context, the UE may be changed to the 'restricted user' or 'non-restricted user' according to an indication from the EPC, e.g. via 'S1AP: Path Switch Request Acknowledge' or 'S1AP: Downlink NAS Transport' message, etc. The indication may be based on whether the 'NR Restriction in EPS as Secondary RAT' IE is present or not.

In accordance with an exemplary embodiment, the enhanced NR restriction on-the-fly state change may be triggered by a core network, e.g. when user subscription is changed to 'restricted to use NR service' or 'unrestricted to use NR service' whenever needed. For example, if a user having 5G subscription with 5G device has a limited 5G/NR service monthly data plan and consumes the contracted monthly data amount, then the user subscription may be changed to 'restricted to use NR service'. On the other hand, if a user is restricted before but the contracted data amount is restored at the beginning of the next month, then the user subscription may be changed to 'unrestricted to use NR service'.

As shown in FIG. 3E, when 'NrRestrictionState' is changed from 'NotRestrictedState' to 'FullNrRestricted-State' in the case that the 'restricted NR band list' is not configured, the connected EN-DC may be released by force, and the UE may be prohibited to use EN-DC with any NR bands. This state change may occur in the case that there is no configured 'restricted NR band list', which may be the same as that described with respect to FIG. 1F.

When 'NrRestrictionState' is changed from 'NotRestrictedState' to 'PartialNrRestrictedState' in the case that the 'restricted NR band list' is configured, the UE may be prohibited to use EN-DC with the configured 'restricted NR band list' but allowed to use other NR bands which are not in the 'restricted NR band list'. If the UE is currently using the restricted NR band(s), the eNB may release the EN-DC and the UE Capability Refresh procedure may be performed to exclude the 'restricted NR band list' from the UE capability. Then the eNB may trigger the SN Addition procedure. Afterwards, the UE is supposed to only use the allowed NR bands.

When 'NrRestrictionState' is changed from 'FullNr-RestrictedState' or 'PartialNrRestrictedState' to 'NotRestrictedState', the UE may be allowed to use any NR bands. If the UE is EN-DC connected (which means that the previous state of the UE is 'PartialNrRestrictedState'), the eNB may release the EN-DC and the UE Capability Refresh procedure may be performed in order to include the 'restricted NR band list' into the UE capability. Then the SN Addition procedure may be performed with the refreshed UE capability.

FIG. 3F is a diagram illustrating a first use case of enhanced NR restriction according to an embodiment of the present disclosure. In the first use case, the UE is identified as the 'restricted user' and the enhanced NR restriction is activated. According to an embodiment, the restricted user may be identified as the partially restricted user at initial context setup. For ease of illustration, the first use case of enhanced NR restriction is described only with respect to the following six steps of FIG. 3F:

1. At initial context setup, the UE may be identified as the 'restricted user' but the UE capability includes the 'restricted NR band list';
 2. During the UE Capability Refresh procedure, the 'restricted NR band list' may be excluded from the UE capability;
 3. The changed/refreshed UE capability may be transferred to the core network (e.g., to be stored at the MME), so that the next UE context setup may not require UE capability refresh again;
 4. The eNB may configure the supported NR measurement based on the UE capability, where the supported NR measurement may not include the 'restricted NR band list' since the UE capability may not include the 'restricted NR band list';
 5. The UE may report a measurement report to the eNB for the requested NR band (e.g., the allowed NR bands, etc.); and
 6. The eNB may set up EN-DC towards the gNB with the received measurement report and transfer the UE capability to the gNB (e.g. during the SgNB addition procedure, etc.).

According to the first use case of enhanced NR restriction, since the eNB may not configure the NR measurement with the restricted bands, the SgNB addition may not occur for the restricted NR bands but may be allowed for the non-restricted NR bands. For the gNB, since the received UE capability from the eNB may not contain the 'restricted NR band list', the inter-frequency (inter-band) PSCell change or carrier aggregation with the 'restricted NR band list' may not occur. For the MME, the next connection setup of the UE may not be allowed to use the 'restricted NR band list', because the MME may store the UE capability without the 'restricted NR band list'.

Figure 3G:
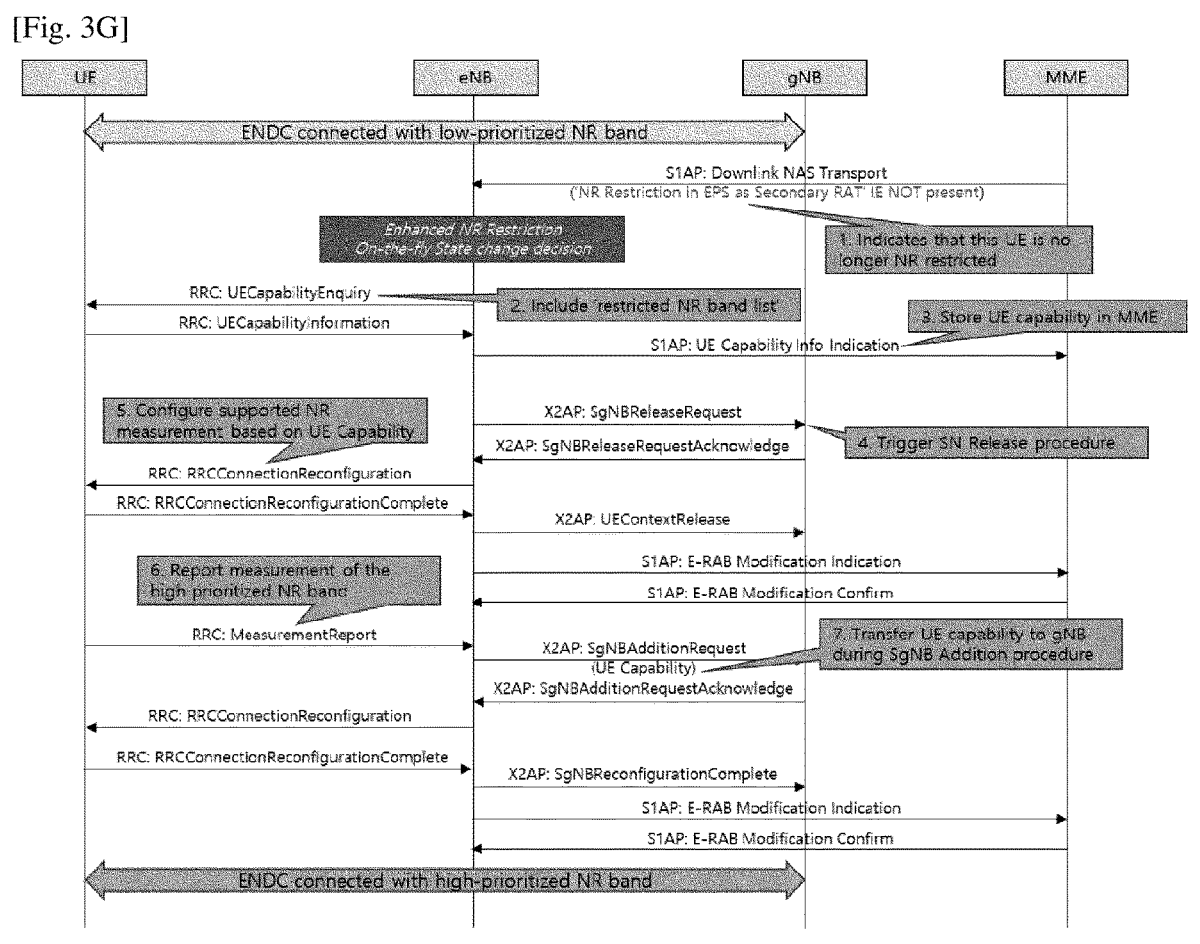

FIG. 3G is a diagram illustrating a second use case of enhanced NR restriction according to an embodiment of the present disclosure. In the second use case, the core network changes the user from the 'restricted user' to the 'non-restricted user' after the UE connection is established. According to an embodiment, the partially restricted user may be changed to the not-restricted user during RRC active. For ease of illustration, the second use case of enhanced NR restriction is described only with respect to the following seven steps of FIG. 3G:

1. The UE is identified as the 'restricted user' but changed to the 'non-restricted user' by the core network;
 2. During the UE Capability Refresh procedure, the 'restricted NR band list' may be included into the UE capability;
 3. The changed/refreshed UE capability may be transferred to the core network (e.g., to be stored at the MME), so that the next UE context setup may not require UE capability refresh again;
 4. If the UE is already provided with the EN-DC service, it may be required to release the EN-DC (e.g. by triggering the SN Release procedure) in order to allow use of the 'restricted NR band list';
 5. The eNB may configure the supported NR measurement based on the UE capability, where the supported NR measurement may include the 'restricted NR band list' since the UE capability may include the 'restricted NR band list';
 6. The UE may send a measurement report to the eNB for the requested NR band (e.g., including the high-prioritized NR band, etc.); and
 7. The eNB may set up EN-DC towards the gNB with the received measurement report (e.g. based on the high-prioritized NR band) and transfer the UE capability to the gNB (e.g. during the SgNB addition procedure, etc.).

In addition or alternative to scheme I, the proposed solution may also be implemented according to scheme II. In accordance with an exemplary embodiment for scheme II, when the enhanced NR restriction is activated (e.g., in the case that the 'restricted NR band list' is configured, etc.), the eNB may transfer the 'restricted NR band list' and/or the 'restricted NR band list' configuration to the gNB at the EN-DC setup procedure for a specific user who may need to be restricted via the NR restriction information. According to an embodiment, during the SN Addition procedure, the X2AP: SGNB ADDITION REQUEST message may be sent from the eNB to the gNB to set up EN-DC for the UE. Table 1 shows an exemplary X2AP: SGNB ADDITION REQUEST message which may have the similar message structure as defined, for example, in 3GPP TS 36.423 V16.1.0, where the entire content of this technical specification is incorporated into the present disclosure by reference.

TABLE 1

| IE/Group Name | Presence | Description |
|---|---|---|
| Message Type | M | |
| MeNB UE X2AP ID | M | |
| NR UE Security Capabilities | M | |
| SgNB Security Key | M | |
| SgNB UE Aggregate Maximum Bit Rate | M | |
| Selected PLMN | O | |
| Handover Restriction List | O | |
| E-RABs To Be Added List | | |
| >E-RABs To Be Added Item | | |
| . | | |
| . | | |
| . | | |
| MeNB to SgNB Container | O | Includes the CG-ConfigInfo message, e.g. as defined in 3GPP TS 38.331 V16.0.0. |
| SgNB UE X2AP ID | M | |
| | O | |

In accordance with an exemplary embodiment, the X2AP: SGNB ADDITION

REQUEST message may contain the 'MeNB to SgNB Container' IE, as shown in Table 1. The 'MeNB to SgNB Container' IE may include a 'CG-ConfigInfo' message, which may have the similar message structure as defined, for example, in 3GPP TS 38.331 V16.0.0, where the entire content of this technical specification is incorporated into the present disclosure by reference.

FIG. 3H is a diagram illustrating an exemplary CG-ConfigInfo message according to an embodiment of the present disclosure. As shown in FIG. 3H, the CG-ConfigInfo message may optionally have an additional 'RestrictedBandList-NR' IE, which is newly included to transfer the 'restricted NR band list', e.g. by using a field or parameter 'RestrictedBandList'. In an embodiment, the field/parameter 'RestrictedBandList' may include information about a list of NR bands selected by an MN which are restricted for a UE, and an SN may not be allowed to select SCG for the list of NR bands.

FIG. 3I is a diagram illustrating exemplary node addition preparation according to an embodiment of the present disclosure. The embodiment of FIG. 3I may be used to transfer the 'restricted NR band list' from an eNB acting as an MN (also called MeNB) to a gNB acting as an SN (also called SgNB). As shown in FIG. 3I, if the enhanced NR restriction is activated, e.g. when the 'restricted NR band list' is configured, the eNB may transfer the 'restricted NR band list' to the gNB (or en-gNB) via the X2AP: SGNB ADDITION REQUEST message for a user who may be indicated by the 'NR Restriction in EPS as Secondary RAT'

IE. Then the gNB may send the SGNB ADDITION REQUEST ACKNOWLEDGE message back to the eNB.

FIG. 3J is a diagram illustrating exemplary enhanced NR restriction initial state decision according to another embodiment of the present disclosure. Similar to FIG. 3D, the enhanced NR restriction initial state decision may be performed to decide the NR restriction state during UE connection and/or UE context setup. As shown in FIG. 3J, when the UE context is set up at an eNB, the UE's NR restriction state may be set to 'InitialState'. If the UE is identified as the 'restricted user' (e.g., when the 'NR Restriction in EPS as Secondary RAT' IE is present, etc.) but the enhanced NR restriction is deactivated (e.g., in the case that the 'restricted NR band list' is not configured, etc.), then the UE's NR restriction state may be set to 'FullNrRestrictedState'. At 'FullNrRestrictedState', the eNB may always prohibit setting up EN-DC towards the UE.

If the UE is identified as the 'restricted user' and the enhanced NR restriction is activated (e.g., the 'restricted NR band list' is configured, etc.), then the UE's NR restriction state may be set to 'PartialNrRestrictedState'. At 'PartialNrRestrictedState', the eNB may prohibit setting up EN-DC for the restricted NR bands but allow setting up EN-DC for the non-restricted NR bands. If the EN-DC is set up for the non-restricted NR bands, the 'restricted NR band list' configuration may be transferred to the gNB, e.g. via 'RestrictedBandList-NR' IE of the CG-ConfigInfo IE/message, so that the gNB may also prohibit changing PSCell or adding SCells to the restricted NR bands.

If the UE is not identified as the 'restricted user' (e.g., in the case that the 'NR Restriction in EPS as Secondary RAT' IE is not present, etc.), then the UE's NR restriction state may be set to 'NotRestrictedState'. In this state, the UE may be allowed to set up EN-DC for all supported NR bands during the EN-DC setup procedure, where the CG-ConfigInfo IE/message may not contain the 'RestrictedBandList-NR' IE.

Figure 3K:
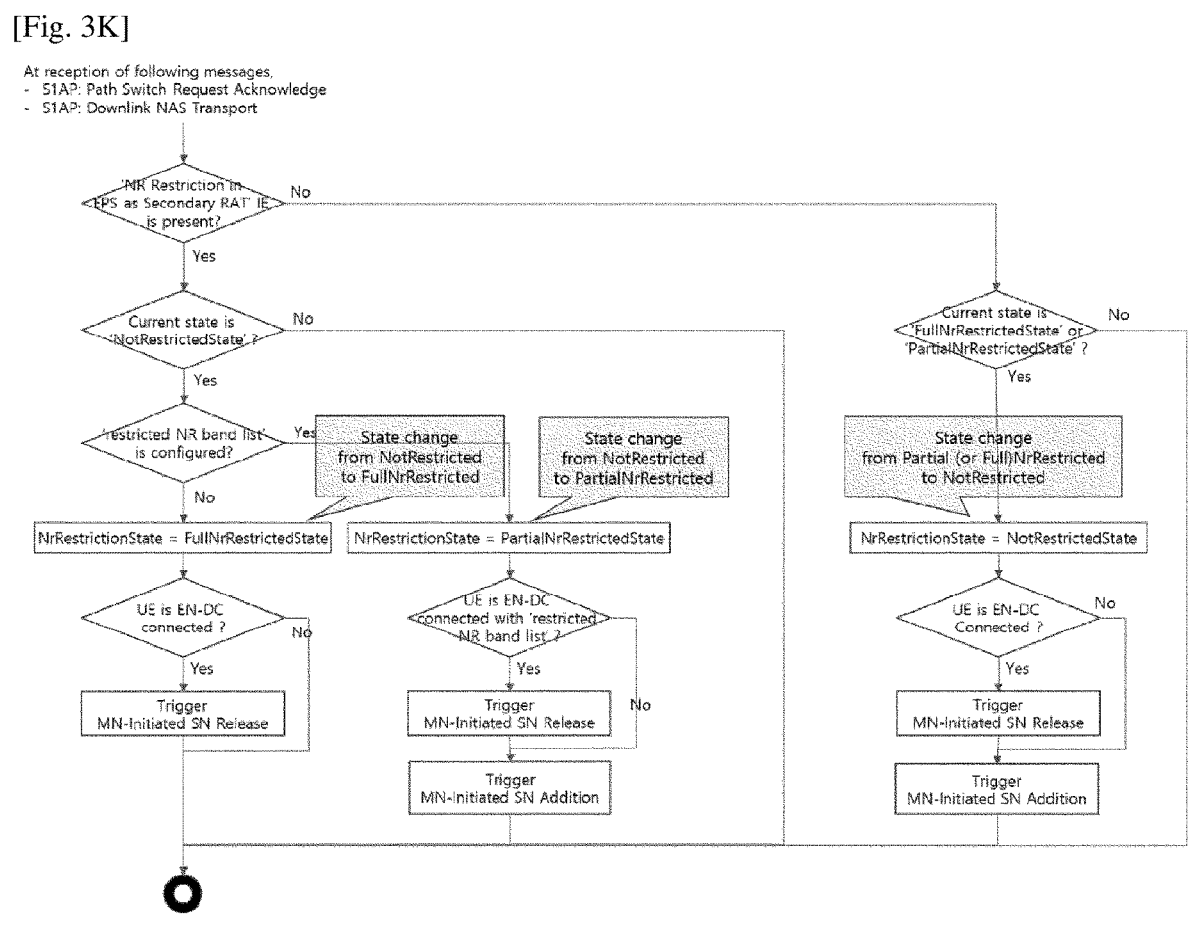

FIG. 3K is a diagram illustrating exemplary enhanced NR restriction on-the-fly state change according to another embodiment of the present disclosure. As shown in FIG. 3K, after setting up the UE context and/or UE connection, the UE may be changed to the 'restricted user' or 'non-restricted user' according to an indication from the EPC, e.g. via 'S1AP: Path Switch Request Acknowledge' or 'S1AP: Downlink NAS Transport' message. The indication may be based on whether the 'NR Restriction in EPS as Secondary RAT' IE is present or not.

Similar to FIG. 3E, the enhanced NR restriction on-the-fly state change may be triggered by a core network, e.g. when user subscription is changed to 'restricted to use NR service' or 'unrestricted to use NR service' whenever needed. The state change to 'restricted to use NR service' may happen for user who has 5G subscription with a 5G device while the limited 5G/NR service is possible but restricted, because the user has a limited 5G/NR service monthly data plan and consumes the contracted monthly data amount. On the other hand, the state change to 'unrestricted to use NR service' may happen for a user who is restricted before, but the contracted data amount is restored at the beginning of the next month.

As shown in FIG. 3K, when 'NrRestrictionState' is changed from 'NotRestrictedState' to 'FullNrRestrictedState', the connected EN-DC may be released by force, and the UE may be prohibited to use EN-DC with any NR bands. This state change may occur in the case that there is no configured 'restricted NR band list'.

When 'NrRestrictionState' is changed from 'NotRestrictedState' to 'PartialNrRestrictedState' in the case that the 'restricted NR band list' is configured, the UE may be prohibited to use EN-DC with the configured 'restricted NR band list' but allowed to use other NR bands which are not in the 'restricted NR band list'. If the UE is currently using the restricted NR band(s), the eNB may release the EN-DC and trigger the SN Addition procedure again with the non-restricted NR bands. During the SN Addition procedure, the 'restricted NR band list' may be transferred from the eNB to the gNB.

When 'NrRestrictionState' is changed from 'FullNrRestrictedState' or 'PartialNrRestrictedState' to 'NotRestrictedState', the UE may be allowed to use any NR bands. If the UE is EN-DC connected (which means that the previous state of the UE is 'PartialNrRestrictedState'), the eNB may release the EN-DC and trigger the SN Addition procedure again with any NR bands. During the SN Addition procedure, the 'restricted NR band list' may not be transferred from the eNB to the gNB.

FIG. 3L is a diagram illustrating a third use case of enhanced NR restriction according to an embodiment of the present disclosure. In the third use case, the UE is identified as the 'restricted user' and the enhanced NR restriction is activated. According to an embodiment, the restricted user may be identified as the partially restricted user at initial context setup. For ease of illustration, the third use case of enhanced NR restriction is described only with respect to the following four steps of FIG. 3L:

1. At initial context setup, the UE may be identified as the 'restricted user', and if the 'restricted NR band list' is configured, then the UE's state is 'Partial NR Restricted State';

2. The eNB may configure the NR measurement based on the UE capability together with the 'restricted NR band list', where the NR measurement may not include the 'restricted NR band list';

3. The UE may send a measurement report to the eNB for the requested NR band (e.g., the allowed NR bands, etc.); and 4. The eNB may set up EN-DC towards the gNB with the received measurement report and transfer the 'restricted NR band list' to the gNB (e.g. during the SgNB addition procedure, etc.).

According to the third use case of enhanced NR restriction, since the eNB may not configure the NR measurement with the restricted bands, the SgNB Addition may not occur for the restricted NR bands but may be allowed for the non-restricted NR bands. In addition, the gNB may not configure SCG for the restricted NR bands, meaning that the inter-frequency (inter-band) PSCell change or carrier aggregation with the 'restricted NR band list' may not occur.

FIG. 3M is a diagram illustrating a fourth use case of enhanced NR restriction according to an embodiment of the present disclosure. In the fourth use case, the core network changes the user from the 'restricted user' to the 'non-restricted user' after the UE connection is established. According to an embodiment, the partially restricted user may be changed to the not-restricted user during RRC active. For ease of illustration, the fourth use case of enhanced NR restriction will be described only with respect to the following five steps of FIG. 3M:

1. The UE is identified as the 'restricted user' but changed to the 'non-restricted user' by the core network;

2. If the UE is already provided with the EN-DC service, it may be required to release the EN-DC (e.g. by triggering the SN Release procedure) in order to allow use of the 'restricted NR band list';

3. The eNB may configure the NR measurement based on the UE capability together with the 'restricted NR band list', where the NR measurement may include the 'restricted NR band list';

4. The UE may send a measurement report to the eNB for the requested NR band (e.g., including the high-prioritized NR band, etc.); and 5. The eNB may set up EN-DC towards the gNB with the received measurement report and the 'restricted NR band list' may not be transferred to the gNB.

Various use cases of the enhanced NR restriction may allow access to EN-DC to be controlled per NR frequency range. In other words, the "enhanced NR restriction" feature can support EN-DC restriction at the frequency range level. According to an embodiment, an eNB may handle the "NR Restriction in EPS as Secondary RAT" IE, e.g. in a handover restriction list (HRL), as follows:

If the feature "enhanced NR restriction" is not active, UEs which have the NR restriction in the HRL may be completely prevented from using EN-DC; and If the feature "enhanced NR restriction" is active, UEs which have the NR restriction may access EN-DC on FR1 (e.g. Low-band and Mid-band) NR frequencies, but may be prevented from accessing EN-DC on FR2 (High-band) NR frequencies. This may allow a network operator who has both FR1 and FR2 to reserve the FR2 spectrum for the "prioritized" users only (e.g., users who do not have the NR restriction, etc.). To achieve this outcome, an eNB configured with the feature "enhanced NR restriction" may remove the FR2 bands from the capability enquiry message sent to a UE (which may make the UE appear incapable of FR2), and/or transfer the information about FR2 bands to a gNB, so that the SN addition may be performed for the UE using specific NR band(s).

In accordance with an exemplary embodiment, the feature for implementing SN addition may be activated for an EN-DC capable UE (i.e. UE capability IE en-DC-r15 is set to "supported"). If the "NR Restriction in EPS as Secondary RAT" IE is present in the received HRL and the feature "enhanced NR restriction" is activated, the SN addition may be allowed on FR1 (low-band and mid-band NR carriers) but not on FR2 (high-band NR carrier); if the "NR Restriction in EPS as Secondary RAT" IE is present in the received HRL but the feature "enhanced NR restriction" is not activated, the SN addition may be not allowed on both FR1 and FR2; and if the "NR Restriction in EPS as Secondary RAT" IE is not present in the received HRL, the SN addition may be allowed on both FR1 and FR2.

FIG. 3N is a diagram illustrating an exemplary network deployment according to an embodiment of the present disclosure. For simplicity, FIG. 3N only shows some exemplary network elements such as an eNB, a gNB, an MME and a serving gateway (SGW). In different application scenarios, there may be more or less alternative/additional network elements deployed in the network. The network deployment shown in FIG. 3N may be based at least in part on the gNB split deployment. It can be appreciated that exemplary embodiments according to the present disclosure are more about the message and interface between 3GPP network entities, e.g. a UE, an eNB, a gNB, etc., which may be independent of how the RAN such as eNB and gNB may be deployed. Thus, various embodiments according to the present disclosure may be implemented regardless of network deployment type—embedded deployment or split deployment in cloud. In case of split deployment, one of (or both) the eNB and the gNB may be deployed in cloud as virtualized RAN, and in case of embedded deployment, the eNB and the gNB may be deployed in the radio node in site.

In accordance with an exemplary embodiment, the conceptual next generation radio access network (NG-RAN) architecture as described, for example, in 3GPP TS 38.401 V16.1.0 (where the entire content of this technical specification is incorporated into the present disclosure by reference) may be implemented in the network deployment shown in FIG. 3N. In the conceptual NG-RAN architecture, the gNB may be configured with a central unit control plane (CU-CP), a central unit user plane (CU-UP) and the corresponding distributed units (DUs). As an example, the gNBCU-CP may be instantiated to the virtualized radio control (VRC), and the gNBCU-UP may be instantiated to the virtualized packet processing (VPP). In an embodiment, the enhanced NR restriction feature or behavior may be implemented on the gNB CU-CP (VRC) in a cloud environment.

FIG. 4A is a flowchart illustrating a method 410 according to an embodiment of the present disclosure. The method 410 illustrated in FIG. 4A may be performed by a first network node or an apparatus communicatively coupled to the first network node. In accordance with an exemplary embodiment, the first network node may comprise a base station (e.g., an eNB, etc.). The first network node may be configured to support DC (e.g. EN-DC, etc.) for a terminal device such as a UE.

According to the exemplary method 410 illustrated in FIG. 4A, the first network node may obtain first information for a terminal device which communicates with the first network node using a first RAT (e.g. 4G/LTE, etc.), as shown in block 412. The first information (e.g. an explicit or implicit indication of whether the "NR Restriction in EPS as Secondary RAT" IE is present or not, etc.) may indicate whether there is a restriction on use of a second RAT (e.g., 5G/NR, etc.) by the terminal device. In accordance with an exemplary embodiment, the first network node may determine whether the terminal device is allowed to use a first resource set which is provided by a second network node (e.g., a gNB, etc.) for the second RAT, according to the first information and whether the first network node has second information (e.g., a restricted NR band list, etc.) to indicate a second resource set for the second RAT, as shown in block 414. The second resource set may be different from the first resource set, and may not be available for the terminal device when there is the restriction on use of the second RAT by the terminal device.

In accordance with an exemplary embodiment, the first resource set may include one or more low-band and/or mid-band frequencies (e.g. FR1, etc.), and the second resource set may include one or more high-band frequencies (e.g. FR2, etc.). According to an embodiment, the first resource set may include one or more radio resources (e.g., time slots, frequency spectrums, carriers and/or codes, etc.) with lower priority than a first threshold, and the second resource set may include one or more radio resources (e.g., time slots, frequency spectrums, carriers and/or codes, etc.) with higher priority than a second threshold. The first threshold and the second threshold may be the same or different.

In accordance with an exemplary embodiment, the first information may indicate that there is the restriction on use of the second RAT by the terminal device. In this case, the first network node, in response to having the second information for the terminal device, may determine that the terminal device is allowed to use the first resource set. For example, the first network node may enable the state of the terminal device to be changed to the 'PartialNrRestrictedState' as described with respect to FIG. 3F and FIG. 3L.

In accordance with an exemplary embodiment, the terminal device may be using a resource in the second resource set to communicate with the second network node. In this case, the first network node may trigger a first procedure (e.g. the SN release procedure as described with respect to FIG. 1C) to release the use of the resource in the second resource set by the terminal device.

In accordance with an exemplary embodiment, the first network node may transmit a first message (e.g. the UE capability enquiry message as described with respect to FIG. 3A, FIG. 3B and FIG. 3F) to the terminal device to enquire first capability information of the terminal device. The first message may include information (e.g., frequency band information, etc.) about the first resource set.

In accordance with an exemplary embodiment, the first network node may receive the first capability information from the terminal device. The first capability information of the terminal device may include capability information about the first resource set while including no capability information about the second resource set.

In accordance with an exemplary embodiment, the first network node may use the first capability information to refresh second capability information of the terminal device at the first network node. The second capability information may include capability information about the second resource set.

In accordance with an exemplary embodiment, the first network node may transmit the first capability information of the terminal device to an MME (as described with respect to FIG. 3C and FIG. 3F).

In accordance with an exemplary embodiment, the first network node may transmit first measurement configuration information to the terminal device, according to the first capability information of the terminal device. Then the first network node may receive first measurement information based on the first measurement configuration information from the terminal device, e.g. as described with respect to FIG. 3F. The first measurement information may include measurement information about the first resource set.

In accordance with an exemplary embodiment, the first network node may trigger a second procedure (e.g., the SN addition procedure as described with FIG. 1B and FIG. 3F) according to the first measurement information. The second procedure may enable the terminal device to communicate with the second network node using a resource in the first resource set.

In accordance with an exemplary embodiment, the first network node may transmit the first capability information of the terminal device to the second network node. According to an embodiment, the first capability information of the terminal device may be transmitted to the second network node during an SN addition procedure, e.g., in an X2AP: SgNBAdditionRequest message as described with respect to FIG. 3F.

In accordance with an exemplary embodiment, the first network node may transmit second measurement configuration information to the terminal device, according to one or more capabilities of the terminal device and/or the second information for the terminal device (e.g., as described with respect to FIG. 3L). Then the first network node may receive second measurement information based on the second measurement configuration information from the terminal device. The second measurement information may include measurement information about the first resource set while including no measurement information about the second resource set.

In accordance with an exemplary embodiment, the first network node may trigger a third procedure (e.g., the SN addition procedure as described with FIG. 1B and FIG. 3G) according to the second measurement information. The third procedure may enable the terminal device to communicate with the second network node using a resource in the first resource set.

In accordance with an exemplary embodiment, the first network node may transmit the second information for the terminal device to the second network node. According to an embodiment, the second information for the terminal device may be transmitted to the second network node during an SN addition procedure, e.g., in an X2AP: SgNBAdditionRequest message as described with respect to FIG. 3L. For example, the second information for the terminal device may be transmitted from the first network node to the second network node in a CG-ConfigInfo message, as described with respect to FIG. 3H.

In accordance with an exemplary embodiment, the first information may indicate that there is no restriction on use of the second RAT by the terminal device. In this case, the first network node (e.g., in response to having the second information for the terminal device, or for the case of having no second information for the terminal device) may determine that the terminal device is allowed to use the first resource set and the second resource set. For example, the first network node may enable the state of the terminal device to be changed to the 'NotRestrictedState' as described with respect to FIG. 3G and FIG. 3M.

In accordance with an exemplary embodiment, the terminal device may be using a resource in the first resource set to communicate with the second network node. In this case, the first network node may trigger a fourth procedure (e.g. the SN release procedure as described with respect to FIG. 1C) to release the use of the resource in the first resource set by the terminal device.

In accordance with an exemplary embodiment, the first network node may transmit a second message (e.g. the UE capability enquiry message as described with respect to FIG. 3A, FIG. 3B and FIG. 3G) to the terminal device to enquire third capability information of the terminal device. The second message may include information (e.g., frequency band information, etc.) about the first and second resource sets.

In accordance with an exemplary embodiment, the first network node may receive the third capability information from the terminal device. The third capability information of the terminal device may include capability information about the first and second resource sets.

In accordance with an exemplary embodiment, the first network node may use the third capability information to refresh fourth capability information of the terminal device at the first network node. The fourth capability information may include no capability information about the second resource set.

In accordance with an exemplary embodiment, the first network node may transmit the third capability information of the terminal device to an MME (as described with respect to FIG. 3C and FIG. 3G).

In accordance with an exemplary embodiment, the first network node may transmit third measurement configuration information to the terminal device, according to the third capability information of the terminal device. Then the first network node may receive third measurement information based on the third measurement configuration information from the terminal device, as described with respect to FIG. 3G. The third measurement information may include measurement information about the first and second resource sets.

In accordance with an exemplary embodiment, the first network node may trigger a fifth procedure (e.g., the SN addition procedure as described with FIG. 1B and FIG. 3G) according to the third measurement information. The fifth procedure may enable the terminal device to communicate with the second network node using a resource in the first or second resource set.

In accordance with an exemplary embodiment, the first network node may transmit the third capability information of the terminal device to the second network node. According to an embodiment, the third capability information of the terminal device may be transmitted to the second network node during an SN addition procedure, e.g., in an X2AP: SgNBAdditionRequest message as described with respect to FIG. 3G.

In accordance with an exemplary embodiment, the first network node may transmit fourth measurement configuration information to the terminal device, according to one or more capabilities of the terminal device and/or the second information for the terminal device (e.g., as described with respect to FIG. 3M). Then the first network node may receive fourth measurement information based on the fourth measurement configuration information from the terminal device. The fourth measurement information may include measurement information about the first and second resource sets.

In accordance with an exemplary embodiment, the first network node may trigger a sixth procedure (e.g., the SN addition procedure as described with FIG. 1B and FIG. 3M) according to the fourth measurement information. The sixth procedure may enable the terminal device to communicate with the second network node using a resource in the first or second resource set.

In accordance with an exemplary embodiment, the first information may indicate that there is the restriction on use of the second RAT by the terminal device. In this case, the first network node, in response to not having the second information for the terminal device, may determine that the terminal device is not allowed to use the first resource set. For example, the first network node may enable the state of the terminal device to be changed to the 'FullNrRestrictedState'.

FIG. 4B is a flowchart illustrating a method 420 according to an embodiment of the present disclosure. The method 420 illustrated in FIG. 4B may be performed by a terminal device or an apparatus communicatively coupled to the terminal device. In accordance with an exemplary embodiment, the terminal device such as a UE may be configured to support DC (e.g., EN-DC, etc.) operations.

According to the exemplary method 420 illustrated in FIG. 4B, the terminal device may receive, from a first network node (e.g. the first network node as described with respect to FIG. 4A) using a first RAT, a message to request information of the terminal device regarding at least a first resource set which is provided by a second network node for a second RAT, as shown in block 422. In accordance with an exemplary embodiment, the terminal device may transmit the requested information of the terminal device to the first network node, as shown in block 424. In accordance with an exemplary embodiment, the message may be based at least in part on first information and second information for the terminal device. The first information may indicate whether there is a restriction on use of the second RAT by the terminal device. The second information may indicate a second resource set for the second RAT. When there is the restriction on use of the second RAT by the terminal device, the terminal device may be allowed to use the first resource set but not allowed to use the second resource set.

It can be appreciated that the steps, operations and related configurations of the method 420 illustrated in FIG. 4B may correspond to the steps, operations and related configurations of the method 410 illustrated in FIG. 4A. Thus, the message received from the first network node by the terminal device according to the method 420 may correspond to the message transmitted to the terminal device by the first network node according to the method 410. In addition, the first resource set and the second resource set as described with respect to FIG. 4B may correspond to the first resource set and the second resource set as described with respect to FIG. 4A, respectively. Thus, the first resource set according to the method 410 and the first resource set according to the method 420 may have the same or similar contents and/or feature elements. Similarly, the second resource set according to the method 410 and the second resource set according to the method 420 may have the same or similar contents and/or feature elements.

In accordance with an exemplary embodiment, the first information may indicate that there is the restriction on use of the second RAT by the terminal device. In this case, the message received from the first network node by the terminal device may include information about the first resource set, e.g., as described with respect to FIG. 3F and FIG. 3L.

In accordance with an exemplary embodiment, the requested information of the terminal device may include capability information about the first resource set while including no capability information about the second resource set (e.g., according to scheme I as described with respect to FIG. 3F).

In accordance with an exemplary embodiment, the requested information of the terminal device may include measurement information about the first resource set while including no measurement information about the second resource set (e.g., according to scheme II described with respect to FIG. 3L).

In accordance with an exemplary embodiment, the first information may indicate that there is no restriction on use of the second RAT by the terminal device. In this case, the message received from the first network node by the terminal device may include information about the first and second resource sets which are both available for the terminal device, e.g., as described with respect to FIG. 3G and FIG. 3M.

In accordance with an exemplary embodiment, the requested information of the terminal device may include capability information about the first and second resource sets (e.g., according to scheme I described with respect to FIG. 3G).

In accordance with an exemplary embodiment, the requested information of the terminal device may include measurement information about the first and second resource sets (e.g., according to scheme II described with respect to FIG. 3M).

FIG. 4C is a flowchart illustrating a method 430 according to an embodiment of the present disclosure. The method 430 illustrated in FIG. 4C may be performed by a second network node or an apparatus communicatively coupled to the second network node. In accordance with an exemplary embodiment, the second network node may comprise a base station (e.g., a gNB, etc.). The second network node may be configured to support DC (e.g. EN-DC, etc.) for a terminal device such as a UE.

According to the exemplary method 430 illustrated in FIG. 4C, the second network node may receive, from a first network node (e.g. the first network node as described with respect to FIG. 4A) supporting a first RAT, a message including information of a terminal device (e.g. the terminal device as described with respect to FIG. 4B) regarding a first resource set and/or a second resource set, as shown in block 432. In accordance with an exemplary embodiment, the second network node may communicate with the terminal device using a second RAT, according to the received message of the terminal device, as shown in block 434. In accordance with an exemplary embodiment, the message may be based at least in part on first information and second information for the terminal device. The first information may indicate whether there is a restriction on use of the second RAT by the terminal device. The second information may indicate the second resource set for the second RAT. When there is the restriction on use of the second RAT by the terminal device, the terminal device may be allowed to use the first resource set which is provided by the second network node for the second RAT, but not allowed to use the second resource set.

It can be appreciated that the steps, operations and related configurations of the method 430 illustrated in FIG. 4C may correspond to the steps, operations and related configurations of the method 410 illustrated in FIG. 4A. Thus, the message/information received from the first network node by the second network node according to the method 430 may correspond to the message/information transmitted to the second network node by the first network node according to the method 410. In addition, the first resource set and the second resource set as described with respect to FIG. 4C may correspond to the first resource set and the second resource set as described with respect to FIG. 4A, respectively. Thus, the first resource set according to the method 410 and the first resource set according to the method 430 may have the same or similar contents and/or feature elements. Similarly, the second resource set according to the method 410 and the second resource set according to the method 430 may have the same or similar contents and/or feature elements.

In accordance with an exemplary embodiment, the first information may indicate that there is the restriction on use of the second RAT by the terminal device. In this case, the message received from the first network node by the second network node may include capability information of the terminal device about the first resource set while including no capability information of the terminal device about the second resource set, e.g., as described with respect to FIG. 3F.

In accordance with an exemplary embodiment, the first information may indicate that there is the restriction on use of the second RAT by the terminal device. In this case, the message received from the first network node by the second network node may include the second information for the terminal device, e.g., as described with respect to FIG. 3L. According to an embodiment, the message including the second information for the terminal device may comprise a CG-ConfigInfo message, e.g., as described with respect to FIG. 3H.

In accordance with an exemplary embodiment, the first information may indicate that there is no restriction on use of the second RAT by the terminal device. In this case, the message received from the first network node by the second network node may include capability information of the terminal device about the first and second resource sets, e.g., as described with respect to FIG. 3G.

Various exemplary embodiments according to the present disclosure may support enhanced NR restriction to enable one or more radio resources (e.g. some specific NR bands, etc.) to be restricted or allowed for one or more specific users. In an embodiment, the enhanced NR restriction may be provided for band-level restriction of FR1 and FR2 resources, for example, by applying new information 'RestrictedBandList-NR' at an eNB and optionally a gNB. There may be two schemes to implement the enhanced NR restriction, including scheme I "UE Capability Refresh" and scheme II "Transferring the restricted NR band list". Both schemes can provide the easy and flexible way to improve resource efficiency for different technologies.

According to an embodiment, scheme I may be only performed once at an eNB when a UE is firstly attached to a network node, and the refreshed UE capability may be stored in a core network until the UE is detached. This is an easy and simple way implemented in the eNB only, so that even if several multi-vendor eNBs and gNBs are deployed in the network, the eNB may be only required to handle the "restricted NR band list". Implementation of scheme I may change UE capability flexibly according to the special configuration on the eNB.

According to another embodiment, the UE capability refresh may not be required when scheme II is implemented. According to scheme II, there may be a new IE defined for transferring the restricted NR band list from the eNB to the gNB, which also can be easily implemented. Implementation of scheme II may add one or more new IEs, e.g. a 'RestrictedBandList-NR' field or parameter in the CG-ConfigInfo message.

In accordance with an exemplary embodiment, the eNB may handle the NR restriction IE as below, depending on whether the enhanced NR restriction is active or not:

Enhanced NR restriction is not active:

UEs without the NR restriction IE may access all NR bands; and

UEs with the NR restriction IE may not access any NR bands.

Enhanced NR restriction is active:

UEs without the NR restriction IE may access all NR band; and

UEs with the NR restriction IE may access EN-DC only on FR1 (low-band and midband) NR carriers, but not on FR2 (high-band) NR carriers.

Application of various exemplary embodiments can support resource restriction in a more flexible and efficient way, e.g. sharing or restricting one or more radio resources for some specific users, so as to enhance network performance and user experience with improved resource utilization and radio spectrum efficiency.

The various blocks shown in FIGS. 4A-4C may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

FIG. 5 is a block diagram illustrating an apparatus 500 according to various embodiments of the present disclosure. As shown in FIG. 5, the apparatus 500 may comprise one or more processors such as processor 501 and one or more memories such as memory 502 storing computer program codes 503. The memory 502 may be non-transitory machine/processor/computer readable storage medium. In accordance with some exemplary embodiments, the apparatus 500 may be implemented as an integrated circuit chip or module that can be plugged or installed into a first network node as described with respect to FIG. 4A, a terminal device as described with respect to FIG. 4B, or a second network node as described with respect to FIG. 4C. In such cases, the apparatus 500 may be implemented as a first network node as described with respect to FIG. 4A, a terminal device as described with respect to FIG. 4B, or a second network node as described with respect to FIG. 4C.

In some implementations, the one or more memories 502 and the computer program codes 503 may be configured to, with the one or more processors 501, cause the apparatus 500 at least to perform any operation of the method as described in connection with FIG. 4A. In some implementations, the one or more memories 502 and the computer program codes 503 may be configured to, with the one or more processors 501, cause the apparatus 500 at least to perform any operation of the method as described in connection with FIG. 4B. In other implementations, the one or more memories 502 and the computer program codes 503 may be configured to, with the one or more processors 501, cause the apparatus 500 at least to perform any operation of the method as described in connection with FIG. 4C. Alternatively or additionally, the one or more memories 502 and the computer program codes 503 may be configured to, with the one or more processors 501, cause the apparatus 500 at least to perform more or less operations to implement the proposed methods according to the exemplary embodiments of the present disclosure.

FIG. 6A is a block diagram illustrating an apparatus 610 according to some embodiments of the present disclosure. As shown in FIG. 6A, the apparatus 610 may comprise an obtaining unit 611 and a determining unit 612. In an exemplary embodiment, the apparatus 610 may be implemented in a first network node such as a base station (e.g. an eNB, etc.). The obtaining unit 611 may be operable to carry out the operation in block 412, and the determining unit 612 may be operable to carry out the operation in block 414. Optionally, the obtaining unit 611 and/or the determining unit 612 may be operable to carry out more or less operations to implement the proposed methods according to the exemplary embodiments of the present disclosure.

FIG. 6B is a block diagram illustrating an apparatus 620 according to some embodiments of the present disclosure. As shown in FIG. 6B, the apparatus 620 may comprise a receiving unit 621 and a transmitting unit 622. In an exemplary embodiment, the apparatus 620 may be implemented in a terminal device such as a UE. The receiving unit 621 may be operable to carry out the operation in block 422, and the transmitting unit 622 may be operable to carry out the operation in block 424. Optionally, the receiving unit 621 and/or the transmitting unit 622 may be operable to carry out more or less operations to implement the proposed methods according to the exemplary embodiments of the present disclosure.

FIG. 6C is a block diagram illustrating an apparatus 630 according to some embodiments of the present disclosure. As shown in FIG. 6C, the apparatus 630 may comprise a receiving unit 631 and a communicating unit 632. In an exemplary embodiment, the apparatus 630 may be implemented in a second network node such as a base station (e.g., a gNB, etc.). The receiving unit 631 may be operable to carry out the operation in block 432, and the communicating unit 632 may be operable to carry out the operation in block 434. Optionally, the receiving unit 631 and/or the communicating unit 632 may be operable to carry out more or less operations to implement the proposed methods according to the exemplary embodiments of the present disclosure.

FIG. 7 is a block diagram illustrating a telecommunication network connected via an intermediate network to a host computer in accordance with some embodiments of the present disclosure.

With reference to FIG. 7, in accordance with an embodiment, a communication system includes a telecommunication network 710, such as a 3GPP-type cellular network, which comprises an access network 711, such as a radio access network, and a core network 714. The access network 711 comprises a plurality of base stations 712a, 712b, 712c, such as NBs, eNBs, gNBs or other types of wireless access points, each defining a corresponding coverage area 713a, 713b, 713c. Each base station 712a, 712b, 712c is connectable to the core network 714 over a wired or wireless connection 715. A first UE 791 located in a coverage area 713c is configured to wirelessly connect to, or be paged by, the corresponding base station 712c. A second UE 792 in a coverage area 713a is wirelessly connectable to the corresponding base station 712a. While a plurality of UEs 791, 792 are illustrated in this example, the disclosed embodiments are equally applicable to a situation where a sole UE is in the coverage area or where a sole UE is connecting to the corresponding base station 712.

The telecommunication network 710 is itself connected to a host computer 730, which may be embodied in the hardware and/or software of a standalone server, a cloud-implemented server, a distributed server or as processing resources in a server farm. The host computer 730 may be under the ownership or control of a service provider, or may be operated by the service provider or on behalf of the service provider. Connections 721 and 722 between the telecommunication network 710 and the host computer 730 may extend directly from the core network 714 to the host computer 730 or may go via an optional intermediate network 720. An intermediate network 720 may be one of, or a combination of more than one of, a public, private or hosted network; the intermediate network 720, if any, may be a backbone network or the Internet; in particular, the intermediate network 720 may comprise two or more sub-networks (not shown).

The communication system of FIG. 7 as a whole enables connectivity between the connected UEs 791, 792 and the host computer 730. The connectivity may be described as an over-the-top (OTT) connection 750. The host computer 730 and the connected UEs 791, 792 are configured to communicate data and/or signaling via the OTT connection 750, using the access network 711, the core network 714, any intermediate network 720 and possible further infrastructure (not shown) as intermediaries. The OTT connection 750 may be transparent in the sense that the participating communication devices through which the OTT connection 750 passes are unaware of routing of uplink and downlink communications. For example, the base station 712 may not or need not be informed about the past routing of an incoming downlink communication with data originating from the host computer 730 to be forwarded (e.g., handed over) to a connected UE 791. Similarly, the base station 712 need not be aware of the future routing of an outgoing uplink communication originating from the UE 791 towards the host computer 730.

FIG. 8 is a block diagram illustrating a host computer communicating via a base station with a UE over a partially wireless connection in accordance with some embodiments of the present disclosure.

Example implementations, in accordance with an embodiment, of the UE, base station and host computer discussed in the preceding paragraphs will now be described with reference to FIG. 8. In a communication system 800, a host computer 810 comprises hardware 815 including a communication interface 816 configured to set up and maintain a wired or wireless connection with an interface of a different communication device of the communication system 800. The host computer 810 further comprises a processing circuitry 818, which may have storage and/or processing capabilities. In particular, the processing circuitry 818 may comprise one or more programmable processors, application-specific integrated circuits, field programmable gate arrays or combinations of these (not shown) adapted to execute instructions. The host computer 810 further comprises software 811, which is stored in or accessible by the host computer 810 and executable by the processing circuitry 818. The software 811 includes a host application 812. The host application 812 may be operable to provide a service to a remote user, such as UE 830 connecting via an OTT connection 850 terminating at the UE 830 and the host computer 810. In providing the service to the remote user, the host application 812 may provide user data which is transmitted using the OTT connection 850.

The communication system 800 further includes a base station 820 provided in a telecommunication system and comprising hardware 825 enabling it to communicate with the host computer 810 and with the UE 830. The hardware 825 may include a communication interface 826 for setting up and maintaining a wired or wireless connection with an interface of a different communication device of the communication system 800, as well as a radio interface 827 for setting up and maintaining at least a wireless connection 870 with the UE 830 located in a coverage area (not shown in FIG. 8) served by the base station 820. The communication interface 826 may be configured to facilitate a connection 860 to the host computer 810. The connection 860 may be direct or it may pass through a core network (not shown in FIG. 8) of the telecommunication system and/or through one or more intermediate networks outside the telecommunication system. In the embodiment shown, the hardware 825 of the base station 820 further includes a processing circuitry 828, which may comprise one or more programmable processors, application-specific integrated circuits, field programmable gate arrays or combinations of these (not shown) adapted to execute instructions. The base station 820 further has software 821 stored internally or accessible via an external connection.

The communication system 800 further includes the UE 830 already referred to. Its hardware 835 may include a radio interface 837 configured to set up and maintain a wireless connection 870 with a base station serving a coverage area in which the UE 830 is currently located. The hardware 835 of the UE 830 further includes a processing circuitry 838, which may comprise one or more programmable processors, application-specific integrated circuits, field programmable gate arrays or combinations of these (not shown) adapted to execute instructions. The UE 830 further comprises software 831, which is stored in or accessible by the UE 830 and executable by the processing circuitry 838. The software 831 includes a client application 832. The client application 832 may be operable to provide a service to a human or non-human user via the UE 830, with the support of the host computer 810. In the host computer 810, an executing host application 812 may communicate with the executing client application 832 via the OTT connection 850 terminating at the UE 830 and the host computer 810. In providing the service to the user, the client application 832 may receive request data from the host application 812 and provide user data in response to the request data. The OTT connection 850 may transfer both the request data and the user data. The client application 832 may interact with the user to generate the user data that it provides.

It is noted that the host computer 810, the base station 820 and the UE 830 illustrated in FIG. 8 may be similar or identical to the host computer 730, one of base stations 712a, 712b, 712c and one of UEs 791, 792 of FIG. 7, respectively. This is to say, the inner workings of these entities may be as shown in FIG. 8 and independently, the surrounding network topology may be that of FIG. 7.

In FIG. 8, the OTT connection 850 has been drawn abstractly to illustrate the communication between the host computer 810 and the UE 830 via the base station 820, without explicit reference to any intermediary devices and the precise routing of messages via these devices. Network infrastructure may determine the routing, which it may be configured to hide from the UE 830 or from the service provider operating the host computer 810, or both. While the OTT connection 850 is active, the network infrastructure may further take decisions by which it dynamically changes the routing (e.g., on the basis of load balancing consideration or reconfiguration of the network).

Wireless connection 870 between the UE 830 and the base station 820 is in accordance with the teachings of the embodiments described throughout this disclosure. One or more of the various embodiments improve the performance of OTT services provided to the UE 830 using the OTT connection 850, in which the wireless connection 870 forms the last segment. More precisely, the teachings of these embodiments may improve the latency and the power consumption, and thereby provide benefits such as lower complexity, reduced time required to access a cell, better responsiveness, extended battery lifetime, etc.

A measurement procedure may be provided for the purpose of monitoring data rate, latency and other factors on which the one or more embodiments improve. There may further be an optional network functionality for reconfiguring the OTT connection 850 between the host computer 810 and the UE 830, in response to variations in the measurement results. The measurement procedure and/or the network functionality for reconfiguring the OTT connection 850 may be implemented in software 811 and hardware 815 of the host computer 810 or in software 831 and hardware 835 of the UE 830, or both. In embodiments, sensors (not shown) may be deployed in or in association with communication devices through which the OTT connection 850 passes; the sensors may participate in the measurement procedure by supplying values of the monitored quantities exemplified above, or supplying values of other physical quantities from which the software 811, 831 may compute or estimate the monitored quantities. The reconfiguring of the OTT connection 850 may include message format, retransmission settings, preferred routing etc.; the reconfiguring need not affect the base station 820, and it may be unknown or imperceptible to the base station 820. Such procedures and functionalities may be known and practiced in the art. In certain embodiments, measurements may involve proprietary UE signaling facilitating the host computer 810's measurements of throughput, propagation times, latency and the like. The measurements may be implemented in that the software 811 and 831 causes messages to be transmitted, in particular empty or 'dummy' messages, using the OTT connection 850 while it monitors propagation times, errors etc.

FIG. 9 is a flowchart illustrating a method implemented in a communication system, in accordance with an embodiment. The communication system includes a host computer, a base station and a UE which may be those described with reference to FIG. 7 and FIG. 8. For simplicity of the present disclosure, only drawing references to FIG. 9 will be included in this section. In step 910, the host computer provides user data. In substep 911 (which may be optional) of step 910, the host computer provides the user data by executing a host application. In step 920, the host computer initiates a transmission carrying the user data to the UE. In step 930 (which may be optional), the base station transmits to the UE the user data which was carried in the transmission that the host computer initiated, in accordance with the teachings of the embodiments described throughout this disclosure. In step 940 (which may also be optional), the UE executes a client application associated with the host application executed by the host computer.

FIG. 10 is a flowchart illustrating a method implemented in a communication system, in accordance with an embodiment. The communication system includes a host computer, a base station and a UE which may be those described with reference to FIG. 7 and FIG. 8. For simplicity of the present disclosure, only drawing references to FIG. 10 will be included in this section. In step 1010 of the method, the host computer provides user data. In an optional substep (not shown) the host computer provides the user data by executing a host application. In step 1020, the host computer initiates a transmission carrying the user data to the UE. The transmission may pass via the base station, in accordance with the teachings of the embodiments described throughout this disclosure. In step 1030 (which may be optional), the UE receives the user data carried in the transmission.

FIG. 11 is a flowchart illustrating a method implemented in a communication system, in accordance with an embodiment. The communication system includes a host computer, a base station and a UE which may be those described with reference to FIG. 7 and FIG. 8. For simplicity of the present disclosure, only drawing references to FIG. 11 will be included in this section. In step 1110 (which may be optional), the UE receives input data provided by the host computer. Additionally or alternatively, in step 1120, the UE provides user data. In substep 1121 (which may be optional) of step 1120, the UE provides the user data by executing a client application. In substep 1111 (which may be optional) of step 1110, the UE executes a client application which provides the user data in reaction to the received input data provided by the host computer. In providing the user data, the executed client application may further consider user input received from the user. Regardless of the specific manner in which the user data was provided, the UE initiates, in substep 1130 (which may be optional), transmission of the user data to the host computer. In step 1140 of the method, the host computer receives the user data transmitted from the UE, in accordance with the teachings of the embodiments described throughout this disclosure.

FIG. 12 is a flowchart illustrating a method implemented in a communication system, in accordance with an embodiment. The communication system includes a host computer, a base station and a UE which may be those described with reference to FIG. 7 and FIG. 8. For simplicity of the present disclosure, only drawing references to FIG. 12 will be included in this section. In step 1210 (which may be optional), in accordance with the teachings of the embodiments described throughout this disclosure, the base station receives user data from the UE. In step 1220 (which may be optional), the base station initiates transmission of the received user data to the host computer. In step 1230 (which may be optional), the host computer receives the user data carried in the transmission initiated by the base station.

According to some exemplary embodiments, there is provided a method implemented in a communication system which may include a host computer, a base station and a UE. The method may comprise providing user data at the host computer. Optionally, the method may comprise, at the host computer, initiating a transmission carrying the user data to the UE via a cellular network comprising the base station which may perform any step of the exemplary method 410 as describe with respect to FIG. 4A or any step of the exemplary method 430 as describe with respect to FIG. 4C.

According to some exemplary embodiments, there is provided a communication system including a host computer. The host computer may comprise processing circuitry configured to provide user data, and a communication interface configured to forward the user data to a cellular network for transmission to a UE. The cellular network may comprise a base station having a radio interface and processing circuitry. The base station's processing circuitry may be configured to perform any step of the exemplary method 410 as describe with respect to FIG. 4A or any step of the exemplary method 430 as describe with respect to FIG. 4C.

According to some exemplary embodiments, there is provided a method implemented in a communication system which may include a host computer, a base station and a UE. The method may comprise providing user data at the host computer. Optionally, the method may comprise, at the host computer, initiating a transmission carrying the user data to the UE via a cellular network comprising the base station. The UE may perform any step of the exemplary method 420 as describe with respect to FIG. 4B.

According to some exemplary embodiments, there is provided a communication system including a host computer. The host computer may comprise processing circuitry configured to provide user data, and a communication interface con-figured to forward user data to a cellular network for transmission to a UE. The UE may comprise a radio interface and processing circuitry. The UE's processing circuitry may be configured to perform any step of the exemplary method 420 as describe with respect to FIG. 4B.

According to some exemplary embodiments, there is provided a method implemented in a communication system which may include a host computer, a base station and a UE. The method may comprise, at the host computer, receiving user data transmitted to the base station from the UE which may perform any step of the exemplary method 420 as describe with respect to FIG. 4B.

According to some exemplary embodiments, there is provided a communication system including a host computer. The host computer may comprise a communication interface configured to receive user data originating from a transmission from a UE to a base station. The UE may comprise a radio interface and processing circuitry. The UE's processing circuitry may be configured to perform any step of the exemplary method 420 as describe with respect to FIG. 4B.

According to some exemplary embodiments, there is provided a method implemented in a communication system which may include a host computer, a base station and a UE. The method may comprise, at the host computer, receiving, from the base station, user data originating from a transmission which the base station has received from the UE. The base station may perform any step of the exemplary method 410 as describe with respect to FIG. 4A or any step of the exemplary method 430 as describe with respect to FIG. 4C.

According to some exemplary embodiments, there is provided a communication system which may include a host computer. The host computer may comprise a communication interface configured to receive user data originating from a transmission from a UE to a base station. The base station may comprise a radio interface and processing circuitry. The base station's processing circuitry may be configured to perform any step of the exemplary method 410 as describe with respect to FIG. 4A or any step of the exemplary method 430 as describe with respect to FIG. 4C.

In general, the various exemplary embodiments may be implemented in hardware or special purpose chips, circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), etc. As will be appreciated by one of skill in the art, the function of the program modules may be combined or distributed as desired in various embodiments. In addition, the function may be embodied in whole or partly in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

The invention claimed is:

1. A method performed by a first network node, comprising:

obtaining first information for a terminal device which communicates with the first network node using a first radio access technology, the first information indicating that there is a restriction on use of a second radio access technology by the terminal device;

determining that the terminal device is allowed to use a first resource set which is provided by a second network node for the second radio access technology, according to the first information and that the first network node has second information to indicate a second resource set for the second radio access technology, the second resource set being different from the first resource set and not available for the terminal device when there is the restriction on use of the second radio access technology by the terminal device; and determining, in response to having the second information for the terminal device, that the terminal device is allowed to use the first resource set.

2. The method according to claim 1, wherein the terminal device is using a resource in the second resource set to communicate with the second network node, and the method further comprises:

triggering a first procedure to release the use of the resource in the second resource set by the terminal device.

3. The method according to claim 1, further comprising:

transmitting a first message to the terminal device to enquire first capability information of the terminal device, wherein the first message includes information about the first resource set.

4. The method according to claim 3, further comprising:

receiving the first capability information from the terminal device, wherein the first capability information of the terminal device includes capability information about the first resource set while including no capability information about the second resource set.

5. The method according to claim 4, further comprising:

using the first capability information to refresh second capability information of the terminal device at the first network node, wherein the second capability information includes capability information about the second resource set.

6. The method according to claim 4, further comprising:

transmitting the first capability information of the terminal device to a mobility management entity.

7. The method according to claim 4, further comprising:

transmitting first measurement configuration information to the terminal device, according to the first capability information of the terminal device;

receiving first measurement information based on the first measurement configuration information from the ter-minal device, wherein the first measurement information includes measurement information about the first resource set;

triggering a second procedure according to the first measurement information, wherein the second procedure enables the terminal device to communicate with the second network node using a resource in the first resource set; and transmitting the first capability information of the terminal device to the second network node.

8. The method according to claim 1, further comprising:

transmitting second measurement configuration information to the terminal device, according to one or more capabilities of the terminal device and the second information for the terminal device;

receiving second measurement information based on the second measurement configuration information from the terminal device, wherein the second measurement information includes measurement information about the first resource set while including no measurement information about the second resource set;

triggering a third procedure according to the second measurement information, wherein the third procedure enables the terminal device to communicate with the second network node using a resource in the first resource set; and transmitting the second information for the terminal device to the second network node, wherein the second information for the terminal device is transmitted from the first network node to the second network node in a CG-ConfigInfo message.

9. The method according to claim 1, wherein the first information indicates that there is no restriction on use of the second radio access technology by the terminal device, and the first network node determines, in response to having the second information for the terminal device, that the terminal device is allowed to use the first resource set and the second resource set.

10. The method according to claim 9, wherein the terminal device is using a resource in the first resource set to communicate with the second network node, and the method further comprises:

triggering a fourth procedure to release the use of the resource in the first resource set by the terminal device;

transmitting a second message to the terminal device to enquire third capability information of the terminal device, wherein the second message includes information about the first and second resource sets; and receiving the third capability information from the terminal device, wherein the third capability information of the terminal device includes capability information about the first and second resource sets;

using the third capability information to refresh fourth capability information of the terminal device at the first network node, wherein the fourth capability information includes no capability information about the second resource set;

transmitting the third capability information of the terminal device to a mobility management entity.

11. The method according to claim 10, further comprising:

transmitting third measurement configuration information to the terminal device, according to the third capability information of the terminal device;

receiving third measurement information based on the third measurement configuration information from the terminal device, wherein the third measurement information includes measurement information about the first and second resource sets;

triggering a fifth procedure according to the third measurement information, wherein the fifth procedure enables the terminal device to communicate with the second network node using a resource in the first or second resource set; and transmitting the third capability information of the terminal device to the second network node.

12. The method according to claim 9, further comprising:

transmitting fourth measurement configuration information to the terminal device, according to one or more capabilities of the terminal device and the second information for the terminal device;

receiving fourth measurement information based on the fourth measurement configuration information from the terminal device, wherein the fourth measurement information includes measurement information about the first and second resource sets; and triggering a sixth procedure according to the fourth measurement information, wherein the sixth procedure enables the terminal device to communicate with the second network node using a resource in the first or second resource set.

13. The method according to claim 1, wherein the first information indicates that there is the restriction on use of the second radio access technology by the terminal device, and the first network node determines, in response to not having the second information for the terminal device, that the terminal device is not allowed to use the first resource set.

14. The method according to claim 1, wherein the first radio access technology is a long term evolution technology, and the first network node is an evolved NodeB;

wherein the second radio access technology is a new radio technology, and the second network node is a next generation NodeB, wherein the first resource set includes one or more low-band and/or mid-band frequencies, and the second resource set includes one or more high-band frequencies.

15. A first network node, comprising:

one or more processors; and one or more memories comprising computer program codes, the one or more memories and the computer program codes configured to, with the one or more processors, cause the first network node at least to:

obtain first information for a terminal device which communicates with the first network node using a first radio access technology, the first information indicating that there is a restriction on use of a second radio access technology by the terminal device;

determine that the terminal device is allowed to use a first resource set which is provided by a second network node for the second radio access technology, according to the first information and that the first network node has second information to indicate a second resource set for the second radio access technology, the second resource set being different from the first resource set and not available for the terminal device when there is the restriction on use of the second radio access technology by the terminal device; and determine, in response to having the second information for the terminal device, that the terminal device is allowed to use the first resource set.

16. A method performed by a terminal device, comprising:

receiving, from a first network node using a first radio access technology, a message to request information of the terminal device regarding at least a first resource set which is provided by a second network node for a second radio access technology; and transmitting the requested information of the terminal device to the first network node, the message being based at least in part on first information and second information for the terminal device, the first information indicating that there is a restriction on use of the second radio access technology by the terminal device, the second information indicating a second resource set for the second radio access technology, and when there is the restriction on use of the second radio access technology by the terminal device, the terminal device is allowed to use the first resource set but not allowed to use the second resource set.

17. The method according to claim 16, wherein the message includes information about the first resource set;

wherein the requested information of the terminal device includes capability information about the first resource set while including no capability information about the second resource set, or the requested information of the terminal device includes measurement information about the first resource set while including no measurement information about the second resource set.

18. The method according to claim 16, wherein the first information indicates that there is no restriction on use of the second radio access technology by the terminal device, and the message includes information about the first and second resource sets which are both available for the terminal device;

wherein the requested information of the terminal device includes capability information about the first and second resource set, or the requested information of the terminal device includes measurement information about the first and second resource sets.

19. The method according to claim 16, wherein the first resource set includes one or more low-band and/or mid-band frequencies, and the second resource set includes one or more high-band frequencies.

* * * * *